(12) United States Patent
Gilbertson et al.

(10) Patent No.: US 10,565,809 B2
(45) Date of Patent: *Feb. 18, 2020

(54) METHOD, SYSTEM AND DEVICE FOR SECURING AND MANAGING ACCESS TO A LOCK AND PROVIDING SURVEILLANCE

(71) Applicant: 3-East, LLC, Coatesville, PA (US)

(72) Inventors: Matthew R. Gilbertson, Downingtown, PA (US); Jeffrey Gilbertson, Honey Brook, PA (US); Timothy A. Freese, Coatesville, PA (US)

(73) Assignee: 3-East, LLC, Coatesville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,910

(22) Filed: Oct. 15, 2018

(65) Prior Publication Data

US 2019/0180533 A1 Jun. 13, 2019

Related U.S. Application Data

(63) Continuation of application No. 15/178,352, filed on Jun. 9, 2016, now Pat. No. 10,109,124, which is a continuation-in-part of application No. 13/668,912, filed on Nov. 5, 2012, now Pat. No. 9,442,466.

(60) Provisional application No. 61/555,042, filed on Nov. 3, 2011.

(51) Int. Cl.
*G07C 9/00* (2006.01)
*G06F 21/32* (2013.01)
*H02J 7/00* (2006.01)

(52) U.S. Cl.
CPC ........ *G07C 9/00087* (2013.01); *G06F 21/32* (2013.01); *G07C 9/00563* (2013.01); *G07C 9/00857* (2013.01); *G07C 9/00912* (2013.01); *H02J 7/00* (2013.01); *G07C 2009/00095* (2013.01); *G07C 2209/02* (2013.01)

(58) Field of Classification Search
CPC ............ G07C 9/00087; G07C 9/00912; G07C 9/00658; G07C 2009/00095; G07C 9/00111; G06K 9/00617; G06K 7/10227; G06F 21/32; E05B 47/0611; H04Q 1/00
See application file for complete search history.

(56) References Cited

U.S. PATENT DOCUMENTS

| | | | |
|---|---|---|---|
| 4,519,228 A | 5/1985 | Somea | |
| 4,811,012 A | 3/1989 | Rollins | |
| 4,972,182 A | 11/1990 | Novik et al. | |
| 5,083,122 A | 1/1992 | Clark | |
| 5,475,376 A | 12/1995 | Chikamitue | |
| 5,625,349 A * | 4/1997 | Disbrow | G07C 9/00309 340/5.25 |

(Continued)

*Primary Examiner* — An T Nguyen
(74) *Attorney, Agent, or Firm* — Bonini IP Law, LLC; Frank J. Bonini, Jr.

(57) ABSTRACT

A method for commissioning a collection of electronic locks by inserting the same electronic key into each of the locks and recording in the electronic key and internal code unique to that lock which identifies the lock and is needed to open the lock and a method for biometrically permitted controlled secure access to a container having one of the commissioned electronic locks. A data processing machine is configured to make biometric identifications, credential identifications and input identifications to verify users using the system and control and regulate user access to locks or electronic cylinders.

18 Claims, 58 Drawing Sheets

(56) References Cited

U.S. PATENT DOCUMENTS

| | | | |
|---|---|---|---|
| 5,838,251 A * | 11/1998 | Brinkmeyer | B60R 25/04 340/5.25 |
| 5,982,295 A * | 11/1999 | Goto | B60R 25/04 235/382.5 |
| 6,177,879 B1 | 1/2001 | Kokubu | |
| 6,331,812 B1 * | 12/2001 | Dawalibi | G07C 9/00817 340/5.2 |
| 6,380,842 B1 * | 4/2002 | Mattes | B60R 25/04 307/10.2 |
| D480,725 S | 10/2003 | Funato | |
| 6,895,241 B2 | 5/2005 | Hara | |
| 6,975,202 B1 | 12/2005 | Rodriguez et al. | |
| 6,980,672 B2 | 12/2005 | Saito et al. | |
| 7,170,998 B2 | 1/2007 | McLintock et al. | |
| 7,176,782 B2 | 2/2007 | Shitan | |
| D616,439 S | 5/2010 | Mujica et al. | |
| D668,251 S | 10/2012 | Morrell | |
| D673,952 S | 1/2013 | Toda et al. | |
| 8,479,982 B1 | 7/2013 | Gromley et al. | |
| 8,581,690 B2 | 11/2013 | Lappalainen et al. | |
| D712,407 S | 9/2014 | Change | |
| D716,815 S | 11/2014 | van Hees | |
| D718,282 S | 11/2014 | Bennett | |
| D720,393 S | 12/2014 | Held | |
| D727,901 S | 4/2015 | Nishimura et al. | |
| D741,298 S | 10/2015 | Lintz et al. | |
| 9,442,466 B2 | 9/2016 | Gilbertson et al. | |
| 9,646,165 B1 * | 5/2017 | Saylor | G06F 21/6209 |
| 9,869,978 B2 | 1/2018 | Gilbertson et al. | |
| 2002/0014950 A1 * | 2/2002 | Ayala | E05B 5/003 340/5.6 |
| 2003/0025589 A1 * | 2/2003 | Koike | G06Q 20/341 340/5.25 |
| 2003/0025590 A1 | 2/2003 | Gokcebay et al. | |
| 2003/0051013 A1 * | 3/2003 | Anthony, Jr. | H04L 41/0806 709/222 |
| 2004/0021552 A1 | 2/2004 | Koo | |
| 2004/0160305 A1 * | 8/2004 | Remenih | G07C 9/00103 340/5.22 |
| 2005/0040931 A1 | 2/2005 | Shitan | |
| 2005/0190037 A1 * | 9/2005 | Shitan | E05B 49/00 340/5.5 |
| 2006/0036868 A1 * | 2/2006 | Cicchitto | G06F 21/305 713/182 |
| 2006/0036968 A1 | 2/2006 | Cicchitto | |
| 2006/0170533 A1 | 8/2006 | Chioiu | |
| 2006/0181392 A1 | 8/2006 | Watson | |
| 2006/0217835 A1 | 9/2006 | Stobbe | |
| 2006/0255910 A1 * | 11/2006 | Fukushima | B60R 25/04 340/5.65 |
| 2007/0096870 A1 | 5/2007 | Fisher | |
| 2007/0256615 A1 | 11/2007 | Delgrosso et al. | |
| 2008/0101163 A1 | 5/2008 | Brunts et al. | |
| 2008/0101613 A1 * | 5/2008 | Brunts | G06F 21/572 380/279 |
| 2008/0170049 A1 | 7/2008 | Larson et al. | |
| 2008/0278325 A1 * | 11/2008 | Zimman | G06F 21/32 340/572.1 |
| 2009/0051489 A1 | 2/2009 | Kim | |
| 2010/0109837 A1 | 5/2010 | Sato | |
| 2010/0225441 A1 | 9/2010 | Fisher | |
| 2011/0084799 A1 | 4/2011 | Ficko | |
| 2011/0174029 A1 | 7/2011 | Lappalainen | |
| 2012/0213362 A1 | 8/2012 | Bliding | |
| 2012/0222461 A1 * | 9/2012 | Sendín Martín et al. | G07C 9/00309 70/277 |
| 2013/0113602 A1 | 5/2013 | Gilbertson et al. | |
| 2013/0127593 A1 | 5/2013 | Kuenzi | |
| 2013/0213100 A1 * | 8/2013 | Cohen | E05B 47/0611 70/283.1 |
| 2014/0325646 A1 * | 10/2014 | Turgeman | G06F 21/316 726/22 |
| 2015/0143461 A1 * | 5/2015 | Uetabira | H04W 4/029 726/3 |
| 2016/0004892 A1 * | 1/2016 | Marsh | G06Q 20/18 340/10.51 |
| 2016/0180615 A1 * | 6/2016 | Gilbertson | G05B 1/01 340/5.73 |
| 2017/0069148 A1 * | 3/2017 | Gilbertson | G07C 9/00087 |

* cited by examiner

SCREEN SHOT A

SCREEN SHOT B
FIG. 11

SCREEN SHOT C

SCREEN SHOT D

SCREEN SHOT E

SCREEN SHOT F
FIG. 15

SCREEN SHOT G

SCREEN SHOT H

FIG. 17 verapass: container renewal

Select Container: Box 275

Container Owner(s): Doe, John

Date Opened: 9/11/2012 21:45:10

Current Expiration Date: 3/11/2013

Renewal Terms: 12 Months

New Expiration Date: 3/11/2014

Save

SCREEN SHOT I
FIG. 18

SCREEN SHOT J

FIG. 19

SCREEN SHOT K

SCREEN SHOT L

FIG. 21

SCREEN SHOT M

SCREEN SHOT N
FIG.23

SCREEN SHOT O

FIG. 24

SCREEN SHOT P

SCREEN SHOT Q

FIG. 26

SCREEN SHOT R

SCREEN SHOT S

SCREEN SHOT T
FIG. 29

SCREEN SHOT U

SCREEN SHOT V

SCREEN SHOT W
FIG.32

SCREEN SHOT X

SCREEN SHOT Y

SCREEN SHOT Z

SCREEN SHOT AA

SCREEN SHOT AB

FIG. 37

SCREEN SHOT AC

SCREEN SHOT AD

SCREEN SHOT AE

FIG. 59

METHOD, SYSTEM AND DEVICE FOR SECURING AND MANAGING ACCESS TO A LOCK AND PROVIDING SURVEILLANCE

CROSS REFERENCE TO RELATED PATENT APPLICATIONS

This patent application claims the benefit of U.S. patent application Ser. No. 15/178,352, entitled "Method, System And Device For Securing And Managing Access To A Lock And Providing Surveillance" filed on Jun. 9, 2016, which claims the benefit under 35 U.S.C. 119 and 35 U.S.C. 120 of U.S. patent application Ser. No. 13/668,912, entitled, "System, Method and Apparatus for Creating and Maintaining Biometric Secure Safe Deposit Boxes, and Similar Containers and Facilities", filed on Nov. 5, 2012, which claims the benefit under 35 U.S.C. 119 and 35 U.S.C. 120 of U.S. provisional application Ser. No. 61/555,042 entitled "Method for Securing and Accessing a Safe," filed Nov. 3, 2011. The disclosures of the '042, '912 and '352 applications are hereby incorporated by reference in their entireties.

BACKGROUND OF THE INVENTION

1. Field of the Invention

This invention relates to methods and apparatus for creating and maintaining biometric secure containers such as safe deposit boxes by requiring a person seeking access to the secure container or facility to have a biometric match with biometric data previously provided by that person stored in a database, before the person can be permitted access to the secure container or facility. This invention also relates to methods and apparatus for creating and maintaining biometric secure locking systems for regulating access to one or more locks, by requiring a person seeking access to the secure container or facility to have matches, such as a biometric match with biometric data previously provided by that person stored in a database, a pin or code, and/or credential enrollment and usage. An electronically readable identifier, such as a card that can be authenticated, entry of a pin or passcode, and a biometric identification match may be required before the person can be permitted access to the lock, and/or the secure facility or component regulated by the lock or electronic cylinder.

2. Description of the Prior Art

Electronic lock cylinders are used to secure access to structures, containers and other areas or objects to which access is to be regulated. One example of an electronic lock cylinder is set forth in German Patent Document DE 8,700, 375.9, which discloses an electronic double-lock cylinder comprising two coaxially rotatable cylinder cores in bores of cylinder sections of its profile housing. The cylinder cores are lockable relative to the profile housing by mechanical tumblers and include a keyway, extending in the direction of the cylinder axis, for a flat key controlling the tumblers. The two cylinder sections of the profile housing are joined by a common root section projecting radially from the cylinder sections, and accommodate a lockable part capable of coupling alternately with the two cylinder cores. In addition to the mechanical locking function of the flat key, means are provided for transmitting control information, e.g., including coding information, between the lock cylinder and the flat key. Specifically, an information detection means responding contactless to control information signals of a control circuit of the flat key is disposed at the profile housing in the region of at least one of the cylinder cores. The information detection means at the profile housing is connected to a control and power-supply circuit disposed with at least some of its circuit components separate from the lock cylinder, i.e., externally, by means of a cable which includes a plug connector. In the known lock cylinder, the plug connector is disposed at the free end of a cable section connected firmly to the lock cylinder by its other end.

Electronic keys and locks are discussed in our prior patent application Ser. No. 13/688,912, where the electronic key has a rechargeable power supply and is electronically programmable to open an electronically programmable lock. There is a discussion of safe deposit boxes employed with the electronic key and locks.

Safe deposit boxes and teller lock boxes have been used in banks and other financial institutions for many years. The typical safe deposit box requires two mechanical keys for the box to be opened. When a customer goes to the bank and seeks access to the customer's safe deposit box, the customer must sign a card indicating that the customer is requesting access to the safe deposit box and the customer must have the customer's key for that particular customer's safe deposit box. A bank employee then obtains the bank's key for the safe deposit box, whereupon the customer and the bank employee enter a secure area, typically within the bank vault, where the safe deposit boxes are located. The customer then inserts the customer's key into one of the lock portions of the safe deposit box and the bank employee inserts the bank's key into a second lock portion of the safe deposit box. When both keys are turned, the two lock portions move the lock to the open position, whereupon the safe deposit box can be removed and the customer may access the box to conduct the customer's business. When the customer is finished with his or her business, the customer must summon the bank employee with the bank's key whereupon the safe deposit box is inserted back into its slot in which the box resides, the door to the safe deposit box is closed, the customer inserts the customer's key into one of the lock portions of the safe deposit box door and the bank employee inserts the bank's key into the other lock portion of the safe deposit box door, the customer and the bank employee then turn their keys thereby locking the safe deposit box door against intrusion by unauthorized personnel.

Similarly to the operation of the traditional safe deposit box, nearly every bank teller has a teller drawer in which cash and perhaps checks, that are processed by that particular teller during the teller's shift of work, are kept. Typically such a teller drawer has a two lock part similarly to a safe deposit box. Currency is typically deposited into the teller's drawer through a slot that is much too small for a human hand to pass through. When it is desired to open the teller's drawer, the teller summons a colleague employed by the bank. The teller and the bank colleague each have a key, with the bank colleague having the bank's so-called master key. The teller and the bank employee insert the respective keys into two separate lock portions that maintain the teller drawer secure. The teller and the bank employee then duplicate the procedure followed by the bank employee and the bank customer as described above, opening the lock using the two keys thereby providing access to the teller drawer so that the currency may be removed, other valuables may be stored in the teller drawer, etc.

These procedures are cumbersome, time-consuming and require a bank employee to participate in each operation.

SUMMARY OF THE INVENTION

In one of its aspects this invention provides a method for commissioning a collection of electronic locks where the method includes the steps of inserting the same electronic key into each of the locks and recording in the electronic key an internal code unique to that lock which identifies the lock and is needed to open the lock. The method proceeds by transferring the internal codes for each of the locks from the electronic key into a data processing machine. The data processing machine maintains the internal codes together with identifying codes for each lock of the collection. As used herein, according to some embodiments, the data processing machine may be embodied in a terminal or kiosk.

Upon request by a potential customer, the data processing machine identifies the internal code for a selected one of the locks, the customer has been previously identified as being authorized to access materials secured by the selected lock. The data processing machine encodes the internal code for the selected lock into an electronic key that is then useable by the identified authorized customer.

In another one of its aspects this invention provides a method for biometrically electronically permitting only simultaneous controlled access to a container secured by an electronic lock where the method commences with the step of electronically biometrically identifying a first customer to be given access on a simultaneous dual access basis to a container secured by the lock. The method proceeds with electronically biometrically identifying a second potential customer to be given access on a simultaneous dual access basis to the container secured by the lock. The method further yet proceeds with the insertion of an activated electronic key into the lock and recording an internal code which is needed to open the lock and which identifies the lock. The internal code for that lock is then transferred into a data-processing machine which maintains the internal code for the lock of interest in the data-processing machine. The method then proceeds by electronically biometrically identifying the first and second potential customers to be given simultaneous access on a dual access basis to the container secured by the lock. The method then proceeds by electronically concurrently comparing the biometrically identified first potential customer and the second biometrically identified potential customer to a previously generated list of biometrically identified customers authorized to have simultaneous access to the secured containers to determine whether the first and second biometrically identified potential customers are authorized to have such simultaneous access. The method then proceeds by providing the internal code in the form of a removable electronic key to the first and second potential customers identified concurrently as being authorized to simultaneously access the container secured by the lock; this is done by encoding the internal code into an electronic key usable by the identified authorized by simultaneous customers.

In the preferred practice of this aspect of the invention the recording of the internal code is performed within the electronic key. A step of electronically biometrically identifying potential customers is preferably performed by electronically sensing fingerprints of the potential customers. Alternatively, the step of electronically biometrically identifying potential customers may be performed by electronically sensing a print of any fingers or thumbs of the potential customers or the palms of the potential customers, or facial recognition of a customer's face. In yet another aspect of the invention, the step of electronically biometrically identifying potential customers may be performed by electronically sensing eye characteristics of the potential customers. In yet another aspect of the invention, the step of electronically biometrically identifying potential customers may be performed by sensing the DNA of the potential customers.

In still another aspect of the invention, there is provided a method for biometrically electronically controlling access to a container secured by an electronic lock. In this aspect of the invention the method commences by inserting an electronic key into the lock and recording an internal code needed to open the lock where the code is recorded within the electronic key. The internal code for that lock is then transferred from the electronic key into a data processing machine. The internal code is maintained together with an identifying code for the lock of interest in the data processing machine. The method then proceeds by electronically biometrically identifying any person seeking to access materials secured by the lock. The method further proceeds by electronically comparing the biometrically identified person to a previously generated list of biometrically identified persons authorized to have access to the secured container to determine whether the identified persons are authorized to have access. If the identified person is found to be authorized to have access, the invention proceeds by providing the internal code to a person identified as authorized to access the container secured by the lock by encoding the internal code into an electronic key useable by the identified authorized person thereby to access the materials secured by the lock.

One of the important aspects of the invention is the incorporation of a personal computer interface, for both touch screen and non-touch screen units, with all necessary hardware and software to provide a deployable and stand-alone, yet enterprise scale all-in-one biometric locking station for programmable electromechanical cores and keys in accordance with the invention.

A further important aspect of the invention are the key retention units which are important because the software of the invention is able to control when the keys are programmed and released, namely made available for the user to remove. This is important because without the key retention units, the keys could become locked up or non-programmable if they are removed or replaced when the software is not expecting them to be removed or replaced. For example, if the software is downloading a schedule into the key and the key is removed before the download is completed, the programming would fail and make the key unusable. Accordingly, the keys in accordance with the invention are locked in place and only released when the software permits them to be released.

A method, system, and device are provided for regulating access to an electronic lock and for providing surveillance of locks and lock usage, as well as surveillance and accounting of lock users and user activity. According to a preferred embodiment, the method may be carried out through a data processing machine. According to preferred embodiments, the data processing machine may be configured as a terminal or other device to carry out provisioning of the keys. A key provisioning device, such as a terminal (also referred to as a kiosk), is configured to store, or communicate with another device that stores access permission data for one or more locks of the system. For example, the data processing machine identifies the internal code for a selected one of the locks, and the user has been previously identified as being authorized to access materials secured by the selected lock. The data processing machine is configured to encode the internal code for the selected lock into an electronic key that is then useable by the identified authorized user. In the case where the user is designated to receive access to more than one lock, the codes for each lock of the system to which the user is entitled to access may be loaded into the key.

According to a preferred embodiment, another aspect of the invention provides a terminal having a plurality of factor authentication mechanisms. For example, one first factor authentication mechanism is a mechanism that provides biometric identification of a user by electronically comparing the biometrically identified user to a previously generated list of biometrically identified users authorized to access to the lock or structure, compartment or facility which the lock secures. The terminal preferably includes a second factor authentication mechanism, which is reception of a pin or code that the user may enter using a suitable input device, such as, for example, the touch screen of the terminal, attached or associated keypad, or other input device. The terminal preferably is configured with a further factor authentication mechanism. According to a preferred embodiment, the further authentication mechanism includes a reader for reading a credential, such as for example, an electronically readable card.

According to preferred embodiments, the terminal may be configured with a key retention mechanism which secures the electronic key to the terminal during the key programming, so as to eliminate the removal of the key until the programming has completed. The key retention mechanism preferably mechanically locks the key and releases the key, as required. This feature may be provided in any of the embodiments shown or described herein.

Embodiments of the terminal also include an anti-tampering mechanism, which, according to some embodiments comprises an anti-tamper switch. The anti-tamper switch is designed to sense a condition where the device is or was prone to tampering. The switch preferably is provided in the device circuitry and upon a triggering event, prevents further usage of the system (until the system is evaluated and placed back into an operation mode by authorized personnel).

According to embodiments of the invention, the terminal preferably has one or more processing components, which may include processors, microprocessors, controllers, microcontrollers, random access memory, a power supply or source, and storage media. The terminal may include one or more ports for linking or communicating with associated accessories, some examples of which are a power cable port, a network jack, one or more USB ports. Preferred embodiments, preferably are configured without wireless connectivity (i.e., preferably without Wi-Fi, Bluetooth, NFC, or other wireless communications).

The system preferably configures, programs, controls and maintains a programmable key and eCylinder lock system. The system, method and device are configured to track users. Embodiments of the system, method and device also may implement controls as to locations that the user may visit and when the user may go, and what a user has access to. The method, system and device preferably are configured to track failed attempts by users to gain access to unauthorized or out of schedule areas.

Embodiments of the system preferably are configured to operate in conjunction with programmable keys and electronic lock cores (such as those provided by Medeco®, e.g., MEDECO XT programmable locks and keys). The system preferably is configured with a plurality of terminals, which also may be referred to as Multi-Factor Programmer (MFP) kiosks, which authenticate user access in connection with the user key and a plurality of authentication mechanisms (such as, biometric identifiers, PIN codes, and/or physical access control credentials).

According to preferred embodiments, the method, system and devices are configured with a survey mechanism comprising a survey engine for evaluating information and reporting information. The survey engine preferably comprises software that is configured with instructions for recording the user data, which provides what the user accessed, when, as well as what a user may have attempted to access.

According to some embodiments, the immediate survey data is provided by the operations of the key.

According to some embodiments, the survey engine may be configured to obtain data from a user. For example, when a user configures the key (e.g., downloading lock codes or permissions from the terminal), the user may be required to respond to prompts or queries. The prompts or queries may be provided to the user on the terminal display (e.g., touch screen), or require the user to input a selection using an input device (e.g., keypad, pen, microphone). If the system manager or company desires to inquire of the key user, the inquiry may be presented to the user so that the user must respond before the key is programmed, or is released from the terminal or both.

According to some implementations, some preferred embodiments, for example, may provide an electronic key for a user who is a driver that drives a route for a company or employer. The electronic key may give the user access to certain facilities or structures on the route or at route locations. The system may be configured to identify when a user profile contains information that the user is required to address. The information may be communicated to the system, or stored within the system and generated as an alert. One example is where the user is a driver whose license expired. Upon placing the key in the terminal for access authorization, the license expiration alert is present in the user profile. The system is configured to determine whether any alerts exist for the user. When the system identifies a condition, such as the expired license alert, the system may be configured to deny the user access to authenticate the key, or to undertake one or more additional steps. In this case, the one additional step may be for the user to enter updated driver license information (if the user has renewed the license). According to some embodiments, the system may operate a check of the user's license to process it against a database or send it for confirmation. When confirmation is received, then the key may be provisioned with the lock codes that the user is authorized to have, and the key may be released to the user. This may take place while the user is logging on and activating the key at the terminal.

The system may be configured with dual-control and dual-custody capabilities. For example, according to one of its aspects, access control to a lock and the structure or facility to which the lock regulates, may be implemented by biometrically electronically permitting only simultaneous controlled access to a structure secured by an electronic lock where the method commences with the step of electronically biometrically identifying a first user to be given access on a simultaneous dual access basis to a structure secured by the lock. According to embodiments, the multi-factor terminal may be utilized to carry out the simultaneous controlled access. The method may proceed with electronically biometrically identifying a second potential user to be given access on a simultaneous dual access basis to the structure secured by the lock, and may include one or more factors to identify the user, including, for example, biometric identification, plus an electronic credential (which the reader may read) and/or a PIN that may be entered (e.g., on the terminal screen display).

The method further yet proceeds with the insertion of an activated electronic key into the lock and recording an internal code which is needed to open the lock and which identifies the lock. The internal code for that lock is then transferred into a data-processing machine which maintains the internal code for the lock of interest in the data-processing machine. The method then proceeds by electronically biometrically identifying the first and second potential users to be given simultaneous access on a dual access basis to the structure secured by the lock. The identification may be done with other factors, including a credential and/or PIN. The method then proceeds by electronically concurrently comparing the biometrically identified first potential user and the second biometrically identified potential user to a previously generated list of biometrically identified users authorized to have simultaneous access to the secured structure to determine whether the first and second biometrically identified potential users are authorized to have such simultaneous access. The identification may be carried out utilizing the terminal, and identification of each user may include biometric identification and one or more other factors (e.g., a credential or PIN). The method, in addition to the biometric identification, may utilize one or more other factors (e.g., credential and/or PIN) to determine authorization of the simultaneous access users. The method then proceeds by providing the internal code in the form of a removable electronic key to the first and second potential users identified concurrently as being authorized to simultaneously access the container secured by the lock; this is done by encoding the internal code into an electronic key usable by the identified authorized by simultaneous users.

The system and device may be configured to carry out different modes of operation. For example, the system and device may carry out locker mode, route mode, and safe deposit box modes. In addition, one or more modes may be combined to provide mixed-use modes.

According to a preferred embodiment, the route mode may be configured to provide the user with a plurality of locks (or eCylinders) that the user is required to and authorized to access during the user's course of carrying out the user's duties. The user may be provided with access, in the form of lock codes provided on the user key for locks that are accessed on the user's route (or other course of duty).

According to a preferred embodiment, the locker mode may be implemented to provide a key that is configured to be programmed with lock codes that are specific to one or more locks associated with an access, such as, for example, a lock identified by number (e.g., lock number 560456 or padlock), a specific containers, or a location (door or drawer). The system may group two or more terminals so that keys may have specific functions when used at particular terminals (such as reduced functions or increased functions). Some terminals may be configured to limit the authorizations that may pass through, while other terminals may permit all types of authorizations. For example, terminals employed in a high-security area may be the only terminals that provide access to certain high-security items or locks, so that even where an authorized user is authorized at the high security access level to access the high security items or locks, if the user attempts to program a key outside of the high security area (e.g., at a terminal not in a high security location), the user will not be provided any high security access on a key programmed on the terminal out of the high security area.

The system may be controlled through a web management arrangement, where a computing device, such as a server, at a location remote from the terminal, is in communication with the terminal. According to some embodiments, the permissions for one or more users may be downloaded to the terminal. This may be done at the time of the request for actuation of an electronic key, or alternately, may be done by the terminal periodically, or at designated time. A web management server may be used to specify permissions for users. The web management server also may provide the terminal with information as to inquiries, surveys and information that is to be obtained from a user, and to receive information from the terminal that a user has provided (or that a key placed into the terminal provides).

System builder applications also may be implemented to functionalize locks and terminals with intended users who are expected or assigned to authenticate keys.

The method, system and device preferably may implement functions with the key and key access. Some examples of the functions include procedural compliance, proactive threat and health monitoring, activity reporting, intuitive system management, operational efficiencies and accountability through biometrics. A user that desires to activate a key through the terminal or kiosk may be made to confirm particular sets of facts or events. For example, in the case of compliance, the user may be required to input compliance information to demonstrate that a requirement has been met or complied with. This may be required prior to the key being activated. Should a user fail to demonstrate compliance, the system may proceed not only to deny activation, but may provide further information, an alert so as to alert a designated person or device to undertake some activity, such as suspending the individual from further activity, investigate the cause of the compliance failure, deactivate other equipment (to which that the user may have access), or take some other action.

The user may be required to provide information about a condition of a location before activation of the key takes place. For example, the user may input a key into the terminal and be required to identify conditions that may be known to that individual and which may pertain to the individual's duties or location. A survey may be displayed on the terminal screen and the individual may be required to respond. For example, if the individual is servicing a facility, questions about the location may be asked, such as whether the location appears clean, how many staff were observed, what other brands were also present at the location, and other information. According to some preferred embodiments, the survey may provide accountability through the factor verifications, including biometric, credentialed, and/or access PIN or code identification. The information may be stored to confirm, when required (e.g., at a subsequent time, or for reporting to an agency, company, department, outside compliance unit, or other resource), that protocols, procedures, and operating requirements were met. The survey may be coordinated with operations undertaken by the user of a key, so that, in addition to survey responses, access data, such as, accesses of the key including successful accesses, denials of access or authorizations, the times, locks, and personnel may be tracked, reported and evaluated, with reporting engines, compliance engines, and other modalities that may linked to utilize the lock, key and survey data to produce related alerts, warnings, and the like.

The method, system and device also may be used to regulate access to structures, which, for example, may include lockers, safes, safe deposit boxes, containers, computer racks, doors, pedestals, cabinets, and other containments. Preferred embodiments feature attributes and advantages of physical keys and mechanical lock cores, but also provide reporting and auditing capabilities. Keys may be activated for particular time periods, and have expirations or durations associated with their activity. For example, the key, or one or more of its functions or codes, may expire after a particular time duration, at a particular time or upon a particular event (one-time use, refill, etc.). In some embodiments, other functions of the key may remain operative, even though some functions are no longer operative. Keys provide controlled access to a containment or other structure, and may be electronically programmed to open only specific locks during a designated schedule. Schedules may also contain an expiration point to completely disable the key until it is audited and reprogrammed.

An accountability feature is provided. The method, system and device may be utilized to record audit information. Audit information may be recorded in both the lock and key, and preferably, the key and lock are configured to retain and provide a time and date-stamped record of every event, including authorized accesses and unauthorized attempts.

The system preferably is configured to provide electronic rekeying and scheduling when required. For example, the configuration of the locks and keys permit quick responses to security threats, lost or stolen keys, or personnel changes without the added cost of changing locks and keys.

The system may be configured as a replacement to existing lock cylinders. Preferred embodiments provide the ability to install the lock cylinders to be used with the keys and features of the keys, without the need for hardwiring of the locks, and where the key is able to provide power to the lock cylinder.

According to preferred embodiments, where a key has already been programmed with a listing of authorized lock access permissions or codes (e.g., for another user who has returned the key, and is not therefore able to use the key), the key, although deactivated for that user, and anyone else that would try to use the key, may be reprogrammed for another user by considering the locks already programmed on that key and providing any additional locks and their respective codes as an update to those already present in the key. The lock codes on the key previously inactive, and the newly added codes, may be made active for the user. Conversely, where a user's permission (lock list) does not include one or more locks listed on the key, then those locks and authorization codes may be deleted from the key. According to some embodiments, deactivation of a key (by expiration of the user's permitted time limit, or by a return of the key to a key retaining location or unit) may render the key unable to open locks, and the key, when deactivated, may continue to contain lock codes that may be present on the key but which require further programming for their use. According to other embodiments, when a key is deactivated, the key does not contain lock codes, and may be wiped or have the programmed information deleted therefrom.

According to preferred embodiments, the key information, lock codes, and information transmitted between the terminal and a remote location (e.g., remote server, web management system, or the like), may be provided in encrypted form to provide additional security.

According to preferred embodiments, the system and devices preferably are configured to integrate with traditional access control systems that already may be in place.

The system, method and devices may be configured with enterprise management software, which may include Microsoft Structured Query Language (SQL) Relational Database Management Software (RDBMS), Microsoft Windows 7 Embedded Operating System (OS), or other suitable software. The system, method and devices are designed to work in both single-use and dual-person applications. The software includes instructions to grant privileges to users based on their unique biometric identifier (who they are), what they know (PIN code), and/or what they have (credential).

The software is implemented as part of or in connection with the terminal and is easy to use and administer, yet is powerful and full-featured to provide a highly secure locking capabilities with enhanced compliance and audit trail reporting. According to preferred embodiments, the system, method and devices combine the attributes and advantages of physical keys and mechanical lock cores with the reporting and auditing capabilities of traditional access control systems.

According to a preferred embodiment, the devices, such as a terminal, may be use with programmable keys and electronic lock cores (also known as eCylinders). Each programmable key holds the operating and expiration schedule and list of authorized lock cores for its intended user. The electronic lock cores may secure virtually any door, cabinet, locker or other device that requires protection and an audit trail. Power from the programmable keys, which are rechargeable, provides the required power to operate the electronic lock cores. According to preferred embodiments, the programmable keys may provide the power without requiring other external power sources to operate the electronic lock cylinders. Other than the rechargeable battery in the key, other batteries or wireless connections are not required for the key and locks cylinders to operate.

In the preferred practice of this aspect of the invention the recording of the internal code is performed within the electronic key. A step of electronically biometrically identifying potential customers is preferably performed by electronically sensing fingerprints of the potential customers, and, according to some preferred embodiments, identification is also carried out by verifying a user's electronic credential and/or PIN. In preferred embodiments, the PIN and/or credential are factor verifications that are used to identify a user in addition to biometric identification, and are carried out at the terminal or kiosk. The biometric identification, for example, may include any of those methods described herein (e.g., electronically sensing a print of finger(s), thumb(s), palm(s), sensing eye characteristics, facial recognition, or sensing DNA).

According to some implementations, when carrying out a method for biometrically electronically controlling access to a container secured by an electronic lock, one or more of an electronic credential and/or PIN also may be required to verify a user and regulate access to an electronic lock. In this aspect of the invention the method commences by inserting an electronic key into the lock and recording an internal code needed to open the lock where the code is recorded within the electronic key. The internal code for that lock is then transferred from the electronic key into a data processing machine. The internal code is maintained together with an identifying code for the lock of interest in the data processing machine. The method then proceeds by identifying any person seeking to access materials secured by the lock e.g., biometrically and one or more other factors, such as a PIN and/or electronic credential. The method further proceeds by electronically comparing the biometrically identified person to a previously generated list of biometrically identified persons authorized to have access to the secured container, and compares the credential and/or PIN to a previously generated list of users matching that respective credential or PIN (or both), to determine whether the identified persons are authorized to have access. If the identified person is found to be authorized to have access, the invention proceeds by providing the internal code to a person identified as authorized to access the container secured by the lock by encoding the internal code into an electronic key useable by the identified authorized person thereby to access the materials secured by the lock.

BRIEF DESCRIPTION OF THE DRAWINGS

In FIG. 1, individual containers are numbered 1 through 8 and "A" and "B" respectively for purposes of identification herein.

FIGS. 10-40 are screenshots A through AE which show depictions of images appearing on the screen of the terminal in the course of practice and operation of various aspects of the invention, as described in Examples 1 through 23 hereinbelow.

FIG. 59 is an exemplary depiction of a screen shot of a management screen for configuring the key usage order, showing an exemplary implementation of sequence order designation for eCylinders to be accessed with a key.

DETAILED DESCRIPTION OF THE PREFERRED EMBODIMENTS

In a preferred embodiment of the invention, there is provided apparatus and methods to provide a comprehensive locking solution intended principally for financial institutions and other industries that are subject to regulatory security requirements. In the preferred embodiments, the apparatus of the invention includes management software, a Microsoft SQL RDBMS, preferable touch screen with end user interfaces, at least one certified biometric reader, and high security programmable keys insertable into corresponding lock cores. In one preferred embodiment of the invention, the high security programmable keys and lock cores are Medico NexGen XT cylinders, cores and keys.

Figures 1, 2:
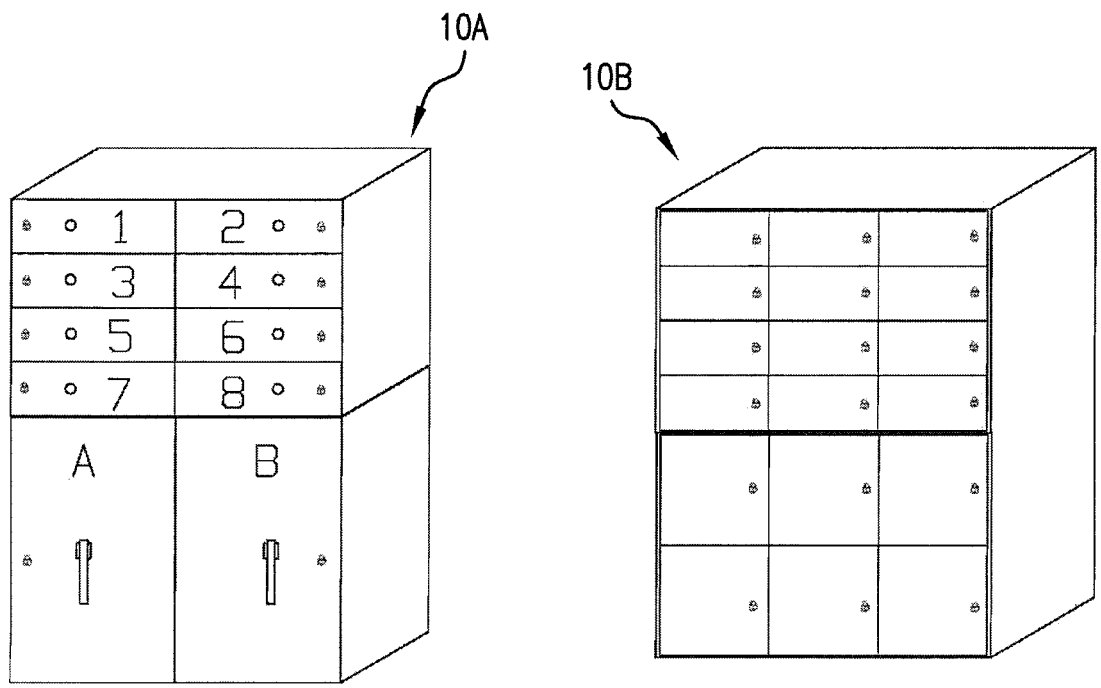
FIG. 1 is a schematic depiction of a collection of containers to which individual customers would desire access after renting the container, with the containers being under the jurisdiction of a supplier and access to the containers being controlled by the method and apparatus of the invention.
FIG. 2 is another schematic depiction of a collection of containers, access to which can be controlled in accordance with the invention.
Figure 3:
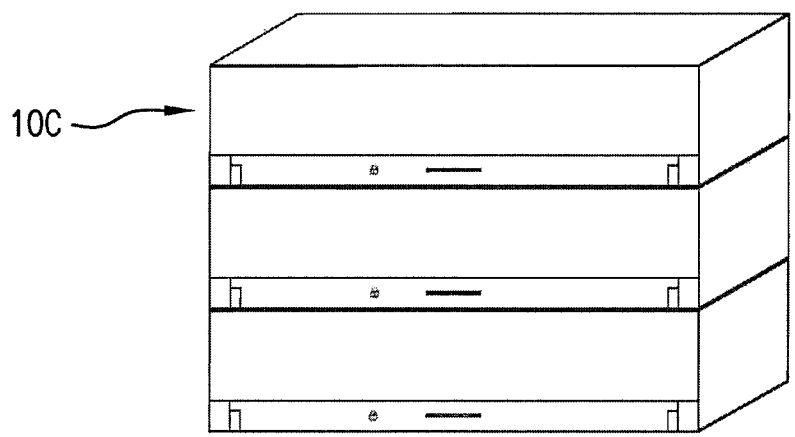
FIG. 3 is a schematic depiction of yet another configuration of containers to which access can be controlled according to this invention.

As used herein, "container", such as container 26, generally refers to a safe deposit box, such as those shown that are housed in collective form in container housings 10A, 10B and 10C in FIGS. 1, 2 and 3. As used herein, "customer" generally refers to an individual or entity renting one of the containers 26. In some instances herein, the word "kiosk" is used in place of the word "terminal." As used herein "terminal", such as terminal 20, generally refers to a kiosk or more preferably a standalone terminal to which a customer goes to obtain access to the customer's rented container 26. In some instances herein the word "kiosk" is used in place of the word "terminal"; no inferences are to be drawn from such usage. As used herein, "supplier" generally denotes the entity, such as a bank, owning the containers 26 and terminals 20, and which rents the containers 26 to customers. As used herein "software" generally refers to the computer programs that process data from a biometric reader or input device, such as a biometric fingerprint reader 34, and from one or more programmable electronic keys, such as electronically programmable keys 18, which operates to achieve the security function of the invention.

Figure 7:
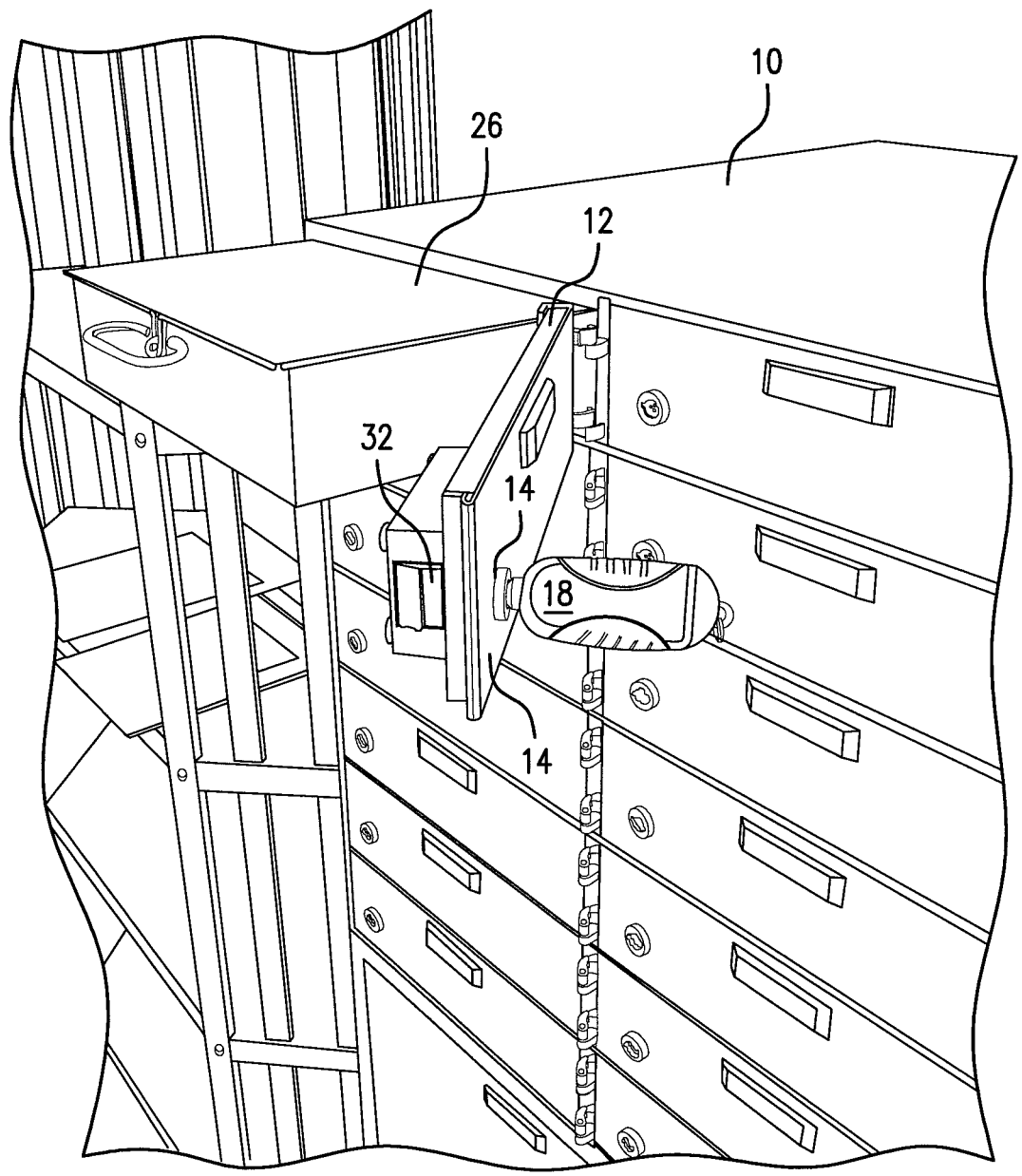
FIG. 7 is a view of an electronic key as shown in FIG. 5 in place after a secured container has been opened using the method of the invention.

Referring to the drawings in general, and to FIGS. 1, 2 and 3 in particular, container housings 10, for housing containers in a secure manner in accordance with the invention, take various configurations, with container housings 10A, 10B and 10C being illustrated in FIGS. 1, 2 and 3, as exemplary configurations of container housings. Each container housing 10 includes a plurality of container housing doors 12, with each container housing door 12 providing access to a container 26 retained within the container housing by closure of container door 12. Container housing 10A, with one door 12 open as illustrated in FIG. 7 with a container 26 being partially removed from the container housing 10A.

Figure 5:
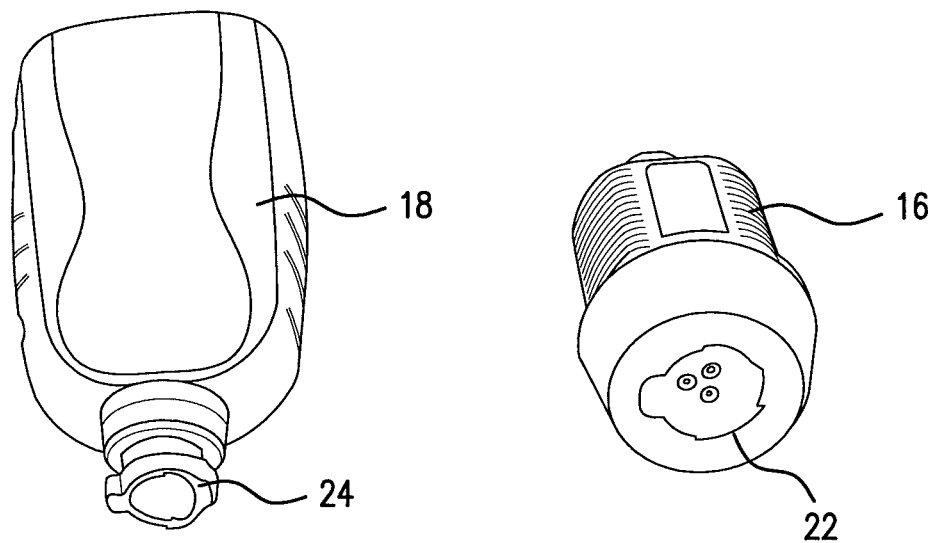
FIG. 5 is an isometric view of an electronic key and corresponding electronic cylinder used in the course of practice of the invention.
Figure 8:
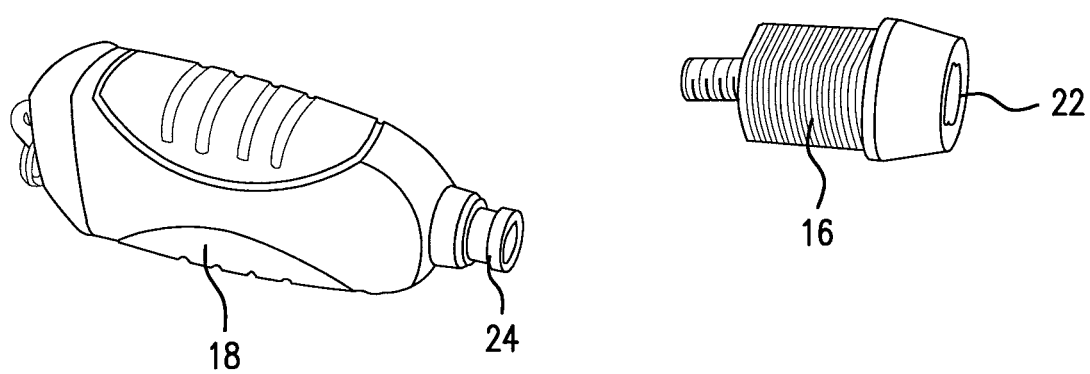
FIG. 8 is an isometric view, taken from a different perspective, of the electronic key and corresponding electronic cylinder illustrated in FIG. 5.

An electronically programmable lock 14 is illustrated generally in FIG. 5 and in FIG. 8, together with an electronically programmable key 18 in those two Figures. Each electronically programmable lock includes a cylinder portion as illustrated in FIGS. 5 and 8, where the cylinder portion is numbered generally 16, and includes a receptacle formed in one end of the cylinder portion where the receptacle is numbered 22 and serves as a female portion of the electronically programmable lock 14. Receptacle 22 receives a plug portion 24 of an electronically programmable key 18, where plug portion 24 serves as the male portion to mate with female portion 22 when an electronically programmable key 18 is used to open an electronically programmable lock 14.

Figure 4:
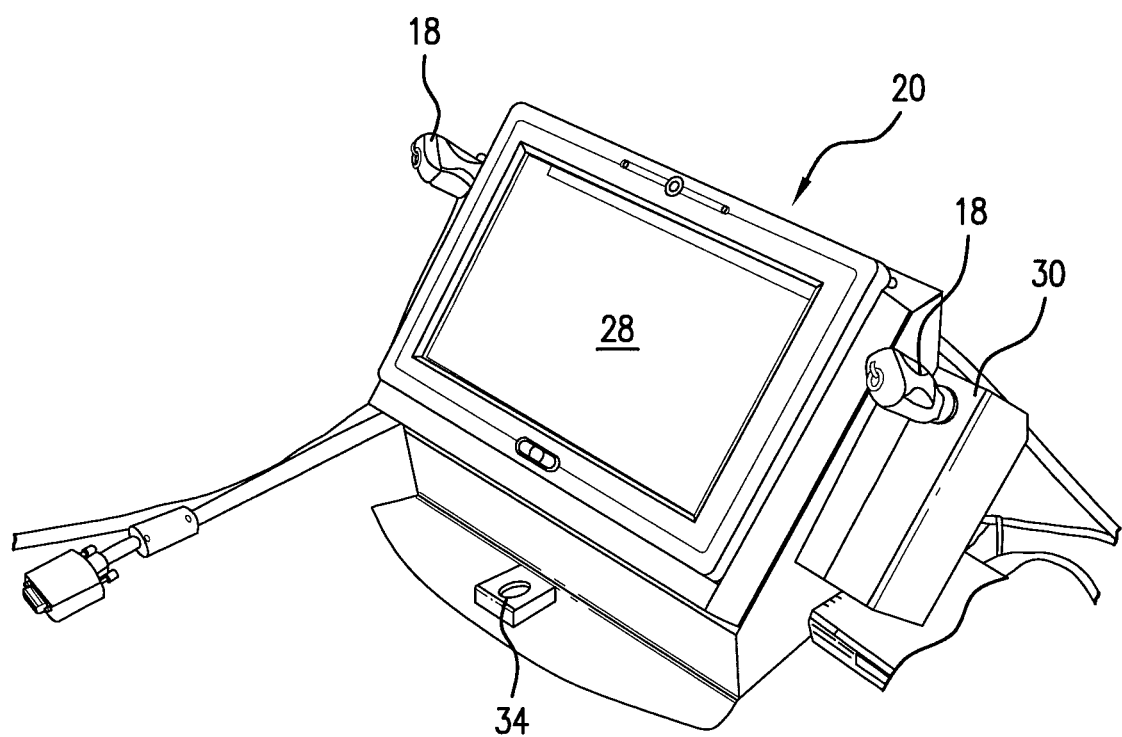
FIG. 4 is an isometric view of a terminal manifesting aspects of the invention and used in the course of practice of the invention.
Figure 6:
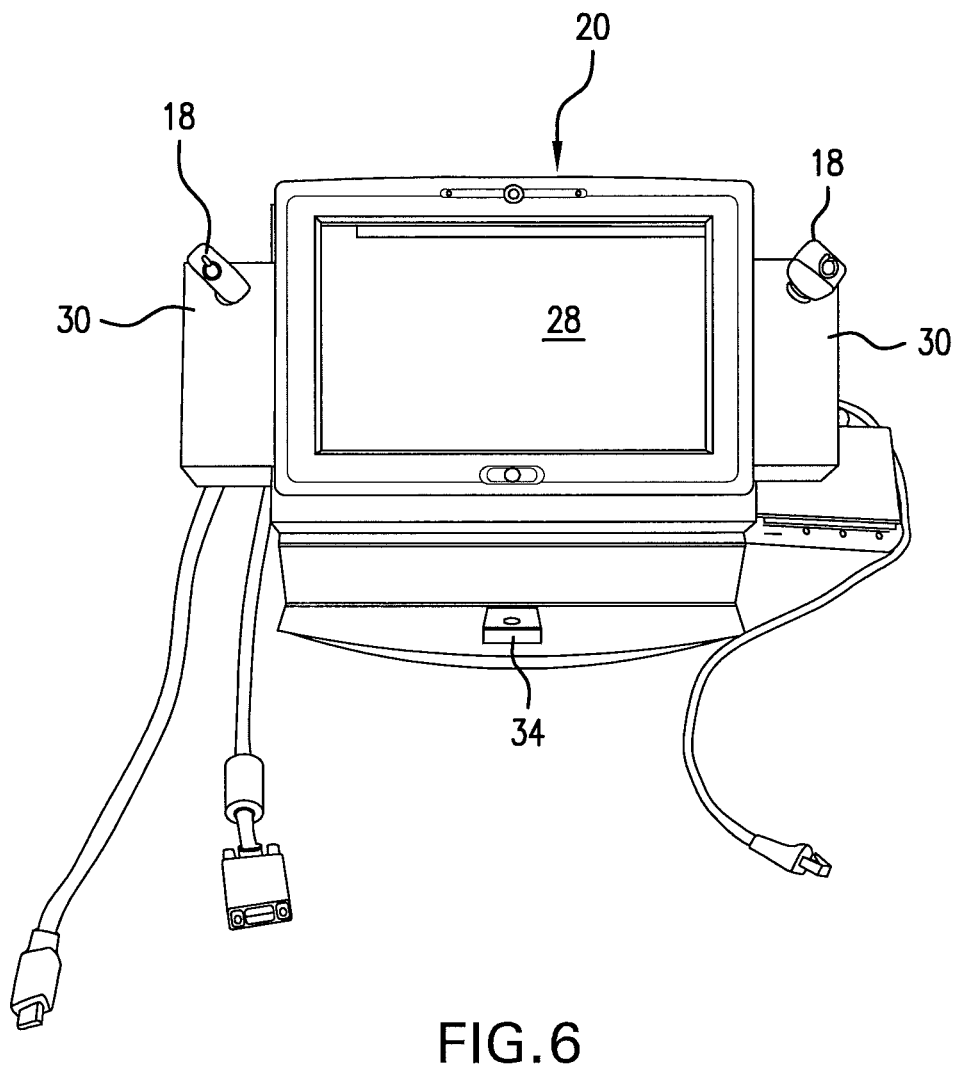
FIG. 6 is a front view of the terminal illustrated in FIG. 4, with two electronic keys as illustrated in FIG. 5 in place in key retention units that are preferably component parts of the terminal.

A terminal 20 in accordance with the invention is illustrated in FIGS. 4 and 6, and includes a screen 28 and at least one key retention unit 30. In the particular terminal illustrated in FIGS. 4 and 6, two key retention units 30 are provided as a part of the terminal 20. In FIGS. 4 and 6, electronically programmable keys 18 are illustrated resident within key retention units 30 of terminal 20.

Terminal 20 further includes a biometric sensor, preferably a fingerprint sensor, which may be positioned as illustrated at 34 in FIGS. 4 and 6. Alternatively, the fingerprint sensor may be a separate unit, removed from screen 28 of terminal 20, but located in close proximity thereto and electronically connected to the software as is terminal 20 for display of the relevant screens provided by the software on screen 28 of terminal 20.

Terminal 20 preferably includes a key retention unit 30 having receptacles for one or more programmable electronic keys 18. When a customer goes to the terminal 20 and identifies himself or herself by some biometric means, preferably by supplying a fingerprint read by the fingerprint reader part 34 of terminal 20, an electronic key 18 is released and the customer is permitted use of the key 18 to open the customer's container 26.

The preferred programmable electronic key 18 fits into terminal 20 and specifically into the key retention unit 30 where the key 18 is charged whenever it is in place within the terminal 20. A rechargeable battery within the key 18 assures that the key 18 is always fully charged. One key 18 can perform up to 800 container openings on a single charge after being removed from the terminal 20. Preferably the terminal can house a plurality of keys 18 simultaneously.

Authorized customers and authorized employees of the supplier must present their previously enrolled biometric identifier, typically a fingerprint, in order to activate and use the key 18 provided at the terminal 20. Once activated, the key 18 may be removed from the key retention unit 30 of the terminal 20 by the customer (or by an authorized employee) in order to gain access to the container(s) 26 to which that customer is authorized to have access. The key 18 remains programmed for a predetermined amount of time and is rendered inactive after returned to the terminal 20 or after the predetermined amount of time expires. When the key 18 is rendered inactive, it is rendered inactive for that particular customer. For the customer to reactivate the key 18, the customer must place the key 18 back into the key retention unit 30 of the terminal 20 and reenter the customer's biometric identifier for identification of the customer by the software. The software permits access only by a specific customer to a container 26 based on that customer's biometric identifier. The software does not permit access to a container 26 by a customer using the programmable electronic key 18 based on what the customer might have in the customer's possession, such as a key fob or card, or what the customer might know, such as a personal identification number code. While fingerprint is the preferred biometric identifier, hand geometry, facial recognition, eye iris characteristics or DNA characteristics may also be used.

The software may be configured for use with many types of containers such as self-serve safe deposit boxes, lockers in educational institutions, vending machines on a sales route, and the like. Once the software is set and the terminal configured for a given application, that mode of application may not be changed.

The preferred fingerprint reader portion of the terminal is preferably supplied by Digital Persona.

One of the functions performed by the software of the invention is to enroll new customers into the system. Initially, the customer provides the customer's name, including the first name, the middle initial, and the last name, the customer's address, the customer's city, state and zip code, the customer's telephone number and type of telephone. The customer preferably supplies, but is not required to supply, an e-mail address, an identification number and a personal identification or PIN number.

The customer then places the customer's appropriate finger on the fingerprint reader 34, whereupon an image of the finger is put into the system and stored by the software. The customer may enroll up to all ten of his or her fingers the software using the fingerprint reader 34. When a desired finger or fingers are selected, the desired finger must be presented to the reader 34 a number of times, preferably four times.

If the fingerprint is read correctly, the appropriate number of the finger is preferably highlighted on the screen 28 of terminal 20, preferably in blue. The screen 28 is preferably an integral portion of the terminal 20. If the finger is not read correctly as to the fingerprint, a failure notice appears on the screen portion 28 of the terminal 20 and the finger must be presented again. After successfully presenting the finger four times, this success is displayed as feedback on the screen 28 of the terminal 20. The option is provided for the customer to present additional fingers as desired and in each case, the finger must be presented four times for the fingerprint to be read and verified correctly.

Once the fingerprint enrollment process has been completed for a given customer, the next step is to select a container 26 to be rented by that customer and to define a rental term, in months, for the selected container 26. Selecting a container 26 is optional, in that the customer may be entered into the software to become a co-owner of an already rented container 26 or an authorized user of a container 26 already rented by another customer.

Once the customer enrollment process is completed, the customer preferably clicks on a "Finish" button, which is preferably on a touch screen portion of terminal 20, to save the information into the software. If a container has been selected for the customer, the selected container is ready to be "commissioned." The customer must present the customer's fingerprint to the sensor of terminal 20, remove one of the electronic keys 18 from terminal 20, and access container 26 using the appropriate electronic key. After opening container 26 and re-docking electronic key 18 at terminal 20, container 26 is considered to be rented. Of course, container 26 to be rented by the customer may be selected for the customer by an employee of the supplier, who must also supply his or her fingerprint information before the software will permit that individual to participate in the selection process, if this optional feature is included in the software.

Each container has a state variable associated with it. The state variable may be that the container is ready to be rented, or that the container may be awaiting commission, in which case the rental process has begun and the customer must access the container for the first time; or that the container state variable may be rented, in which case the rental process is active and the customer has accessed the container at least one time; or that the container state variable may also be that of awaiting decommission, in which case the rental process is ending and the customer must access their container one final time.

Customers may edit their information, such as when a customer's address changes. In such case, the customer again presents the customer's fingerprint for verification. Once the fingerprint has been verified, a screen page preferably appears permitting the customer to change the relevant information, such as the customer's address. The screen page preferably appears on screen 28 of terminal 20. Upon completion of editing the information, the touch screen may be touched and the "Save" function activated, whereupon the customer must again present the customer's finger to verify that the correct customer is saving the information that has been changed.

When a customer desires to renew the rental term for an existing container that is rented, the customer may present the customer's fingerprint to fingerprint reader portion 34 of terminal 20, whereupon the "Edit Customer Information" appears, and the customer may click or press a touch screen a code for "Renew Container", which brings up information and a screen via which the customer may select the appropriate container 26 if the customer has rented more than one container 26. The customer may define the new renewal term, in months, and thereupon may instruct that that information be saved by pressing the appropriate "Save" portion of the touch screen. If the customer has rented more than one container, the rentals of the additional containers may be renewed by selecting another container 26 from the information presented on screen 28 at terminal 20 and repeating the process as set forth hereinabove.

When a customer wishes to surrender their container 26, the supplier may decommission the container. The supplier employee, after presenting his or her finger for verification at the terminal, clicks on an "Edit Customer" button, or preferably a touch screen indicator, and thereafter identifies the customer by clicking on or touching a "Retrieve User" indicator. At this point, the collection of currently assigned containers is populated in a grid. To decommission the relevant container, the supplier employee clicks on or touches a "Decommission" indicator within an appropriate row of the grid of currently assigned containers. Next, the supplier representative or employee clicks on or touches a "Decommission Lock" indicator on the touch screen. The customer then presents his or her finger for verification of the customer identity again, and the status of the container is changed to "Awaiting Decommission." The customer then removes the appropriate electronic key 18 from terminal 20 and accesses the customer's container 26 one last time. Once the customer has done this and electronic key 18 is returned and docked at terminal 20, the customer's container is placed back into the "Available" state, whereupon container 26 may be rented to another customer.

When the need arises to halt access to a container and nevertheless keep the container in a rented state, the container may be put into a "Suspended" status. The software does not permit a customer to put the container into "Suspended" status; only personnel of the supplier may suspend or unsuspend a container.

To start the process of suspending a container, a representative of the supplier whose identity has been fingerprint verified clicks on a "Configuration" button or preferably a touch screen indicator and selects a tab labeled "Container Management." To suspend the container, the identity verified representative of the supplier selects the container from a drop-down list, using the keyboard of the terminal, types a brief reason as to why the container is being suspended, and then clicks or preferably touches a "Suspend" indictor on the touch screen.

To put the container back into an active state, a fingerprint identity verified representative of the supplier on the drop-down menu places a checkmark in an area on the preferable touch screen for "All Containers," whereupon a drop-down list of the containers appears and the container may be selected by the fingerprint identity verified representative of the supplier. The representative of the supplier then types a brief reason as to why the container is being resumed and been placed back into an active state and clicks or touches the "Resume" key or area of the preferable touch screen to place the container back into active status.

In the event a container must be forcibly closed and deactivated without the customer present, the lock within the container must be deactivated and the container must be forced open, whereupon the current lock in the container will no longer function. To start the process using the software of the invention, the representative of the supplier clicks on a "Configuration" tab or portion of the touch screen from the main menu and selects a tab labeled "Container Management." At this point, the representative of the supplier selects a container from the drop-down list and provides a reason for the deactivation. Fingerprint identity verification must be made by the supplier representative, as described above, before deactivating any container.

The software of the invention further provides the capability to add a co-owner or co-customer associated with an existing container that is already rented. In such case, the customer, who is the original customer, must be present and the new co-owner or co-customer must be already enrolled, having presented the co-customer's fingerprint and identifying information as described above. To then add the co-customer, from the main menu, one clicks or presses on the "Edit Customer" indicator, whereupon the customer is identified by clicking or preferably touching on the "Retrieve User" indicator, and when identification has been made, one clicks on the "Co-Owner" indicator on the preferred touch screen. A grid of currently assigned containers appears on the screen and is populated with the containers that are currently assigned to the customer. The co-customer or co-owner may be added to one or more containers by selecting the tab or preferable touch screen indicator of "Add Co-Owner" for the appropriate container, whereupon one clicks on the "Add Co-Owner" button or touches the preferable touch screen, and fingerprint identification verification must be performed again, as set forth above.

The software of the invention further provides for removal of a customer if a container is indicated to have multiple customers or owners. At least one customer must be present to remove another customer. For this process, the customer, from the main menu, touches or clicks on the "Edit Customer" indicator, whereupon the customer is identified by clicking on or touching the "Retrieve User" indicator. After identification of the customer has been made, the "Co-Owner" tab is clicked on or touched, whereupon the currently assigned container grid appears on the terminal screen and is populated with the containers assigned to that particular customer.

Removing a customer must be performed on one container at a time, but removing multiple owners may be performed all at once for a single container. A customer clicks on or touches the appropriate row within the currently assigned containers grid. The customer or owner grid automatically populates with the existing customers or owners. The customer then selects which customer to remove by placing a check in the "Remove Co-Owner" column, and clicks or touches the "Remove Co-Owner" button or area on the touch screen. In all cases, fingerprint verification must be made again, as described above, before a customer may be removed from a container.

The software further facilitates addition of an authorized user to an existing container. The add an authorized user to an existing container, the customer for that container must be present and the authorized user must be enrolled, having submitted the authorized user's fingerprint and identifying information as described above for the customer.

To add the authorized user, from a main menu, one clicks on the "Edit Customer" button or portion of the touch screen. The customer is then identified by clicking on the "Retrieve User" button or portion of the touch screen. Once fingerprint verification identification has been made, the authorized user tab or portion of the touch screen is activated. The currently assigned container grid appears on the screen and is populated with the containers assigned to the customer. An authorized user may be added to one or more of the containers for that customer. The authorized user is added by selected the "Add Authorized User" container in the grid for the appropriate containers, whereupon the customer clicks on the "Add Authorized User" button or portion of the preferable touch screen. In all cases, fingerprint identification verification must be performed first, as described above.

The software further provides capability to remove an authorized user from a container, in which case the customer for the container must be present. Fingerprint identification verification must be performed as indicated above.

Once that has been done, from the main menu, the customer clicks or touches on the "Edit Customer" area of the screen and identifies himself or herself by clicking on the "Retrieve User" area and then after fingerprint verification identification has been made, clicks on the "Authorized User" area. A currently assigned container grid appears and is populated with the containers assigned to that customer. Removing an authorized user from a container must be performed on one container at a time. However, removing multiple authorized users may be performed all at once, on a single container. This is done by clicking on the appropriate row within the grid of currently assigned containers. The authorized user grid appears and automatically populates with existing authorized users. At that point, the fingerprint verification identified customer selects which users to remove by placing a check in the "Remove User" column, and then clicks on the "Remove Authorized User" button or area of the preferred touch screen.

When another new container is to be rented to an existing customer, from the main menu the "Edit Customer" selection is made. The customer is then identified using the "Retrieve User" button or area on the preferred touch screen and after identification has been made, the customer or a representative of the supplier clicks on the "Containers" tab or an area of the preferred touch screen.

The software then displays two grids, namely the grid of "Currently Assigned Containers" and a grid of "Available Containers." In order to assign an available container to the customer, the supplier employee or representative clicks on "Select" within the appropriate row of available containers, whereupon the container defined by that particular row is added to the customer's profile. At that point, the employee or representative of the supplier clicks on the "Assign Container" button or area of the preferred touch screen, whereupon fingerprint identification verification must be made again by the customer. Renewal terms must be defined. After that information has been saved, the mode for the particular container selected is set to "Awaiting Commission." The customer must then proceed by retrieving the key from the terminal and accessing the container of interest in order to commission the container.

The software of the invention allows customers to update their fingerprint template at any time. To begin from the main menu, a customer clicks on the "Edit Customer" button or portion of the preferred touch screen, and the customer is identified using the "Retrieve User" function. After fingerprint identification verification has been made, the fingerprint tab is selected. To remove data for an existing fingerprint, the customer clicks on the highlighted finger. To add a fingerprint, the customer clicks on any finger and follows the enrollment process described above.

Once this procedure has been finished, the customer clicks on the "Save" button or portion of the preferred touch screen.

The software deals with new employees of the supplier and permits enrollment of them by providing a screen for insertion of information for a new employee. Specifically, the new employee's first name, middle initial and last name are required, as is the principal name of the supplier. An optional field is provided for an employee number, as is an optional field provided for a PIN number for the employee and an e-mail address for the employee.

An option is provided to designate the supplier employee as an administrator within the software of the invention. There is further provided an indicator for the supplier employee if that employee is to be authorized to perform maintenance at the terminal. Furthermore, if that employee is to have the ability to add further employees to this system, or to maintain existing employees by editing their information, those indicators are also provided on a new employee permission screen. The software further provides for flagging the employee as a temporary employee, and if the employee is indicated to be a temporary employee, the date that the employee's access to the system is to expire is entered into the system. The new employee is required to provide his fingerprint in order to enroll, following the procedure as set forth above for enrollment and identification of customers by their fingerprints. As with the customer identification, once an appropriate finger is selected by the employee, it must be presented to the fingerprint reader four times. If the fingerprint is read correctly, the appropriate number of the finger is highlighted on a screen of the terminal. Otherwise, a failure notice appears and the finger must be presented to the fingerprint reader again. After successfully presenting the finger four times for fingerprint reading, a successful dialogue feedback is displayed on a screen of the terminal. Additional fingers may be entered as required or desired.

To assign responsibility for given containers to an employee of the supplier, a checkmark is placed in a selected column in the container listing. Containers need not be assigned at that time. To complete the employee's enrollment process, one clicks on or presses the preferred touch screen indicator for "Next" and then a "Finish" button or touch screen indicator on the screen of the terminal.

To edit an existing employee, one selects a name from a drop-down list of employees. Afterwards, the appropriate field for that employee is populated. For example, the employee may be one flagged as an administrator with terminal access. The employee may be a temporary employee, having a key duration of 500 minutes, and not having access to any containers.

The software and the terminal require time synchronization service to insure the date and time are accurate. Preferably five public time sync servers are defined within the database. Depending on local firewall rules however, use of public time sync servers may not be allowed. Accordingly, the supplier's time sync server may optionally be permitted to coordinate with the software of the invention. For time synchronization, a tab or touch screen indicator of the same is selected. The software allows activation of an existing inactive time sync server and allows insertion of a new time sync server once the host name or IP address, port number, and any comments are entered. Once this has been done, the next time the watchdog service tries to perform time synchronization, the newly added time sync server will be used. Only one time sync server must be active at any one time in connection with operating the software of the invention. Software and database update functions are performed using conventional security tokens and conventional updating and storage procedures.

Keys may be added to the software of the invention. The key serial number and encryption data from the dealer and a short description of the key are required. Only administrators designated by the supplier can add and deactivate keys from the software of the invention.

The false acceptance rate (FAR), also known as the security level, is the proportion of fingerprint verification operations by authorized users that incorrectly return a comparison decision of "a match." The FAR is typically stated as the ratio of the expected number of false accept errors divided by the total number of verification attempts, or the probability that a biometric system will falsely accept an unauthorized user. A probability of 0.001 (or 0.1%) means that out of 1,000 verification operations by authorized users, a system is expected to return one (1) incorrect match decision. Increasing the probability to 0.0001 (or 0.01%) changes this ratio from 1 in 1,000 to 1 in 10,000.

Increasing or decreasing the FAR has the opposition effect on the false reject rate (FRR). Specifically, decreasing the rate of false accepts increases the rate of false rejects and vice versa. Therefore, a high security level may be appropriate for an access system dealing with a secured area, but may not be acceptable for a system for an area where convenience or easy access is more significant than security. The preferred default value of the software in accordance with the invention is set at 4,295, which equals a FAR probability of 1 in 500,000.

The following examples illustrate operation of the invention. The examples are presented to provide the reader with a clear appreciation and understanding of the invention. The presented examples are all non-limiting. No inference should be drawn from the examples respecting any limitations associated with or inherent in the invention. The scope and breadth of the legal rights of exclusivity to which the invention is entitled are defined by the appended claims when construed in accordance with applicable law.

EXAMPLE 1

Add New Customer

Figure 10:
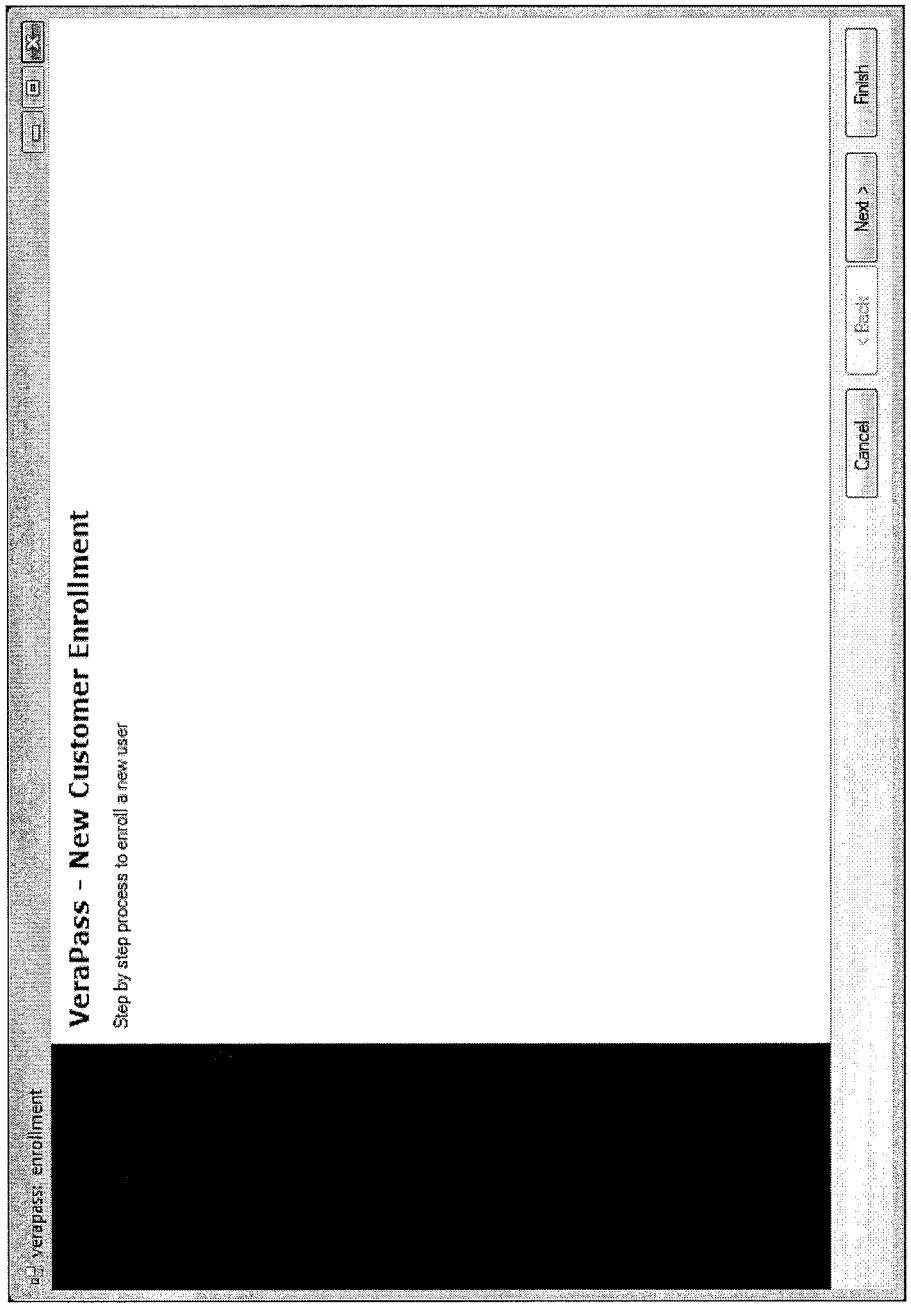

After clicking the button on the main menu labeled New Customer, the customer enrollment wizard is displayed (see SCREEN SHOT A, FIG. 10).

The wizard is a step-by-step process to enroll a new customer into VeraPass. To start, click the "Next" button.

Figure 11:
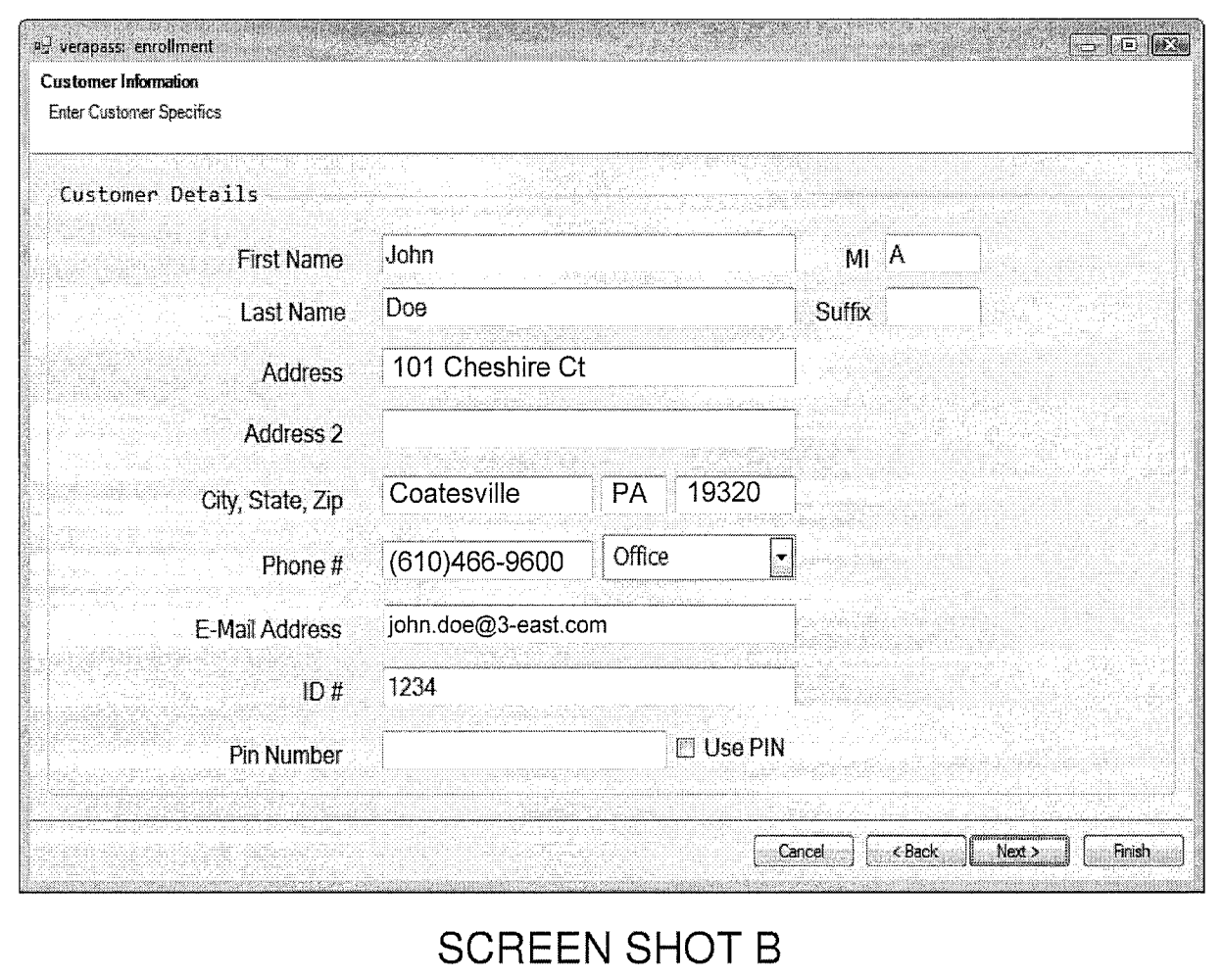

The customer details form contains the following fields (see SCREEN SHOT B, FIG. 11):
  Name: First, Middle Initial, Last, and Suffix
  Address Lines
  City, State, and Zip Code
  Phone Number and Type of Phone
  Email Address
  ID Number
  Pin Number (if a PIN is desired, ensure "Use Pin" is checked).

Middle initial, name suffix, email address, ID number and PIN number are all optional fields.

Figure 12:
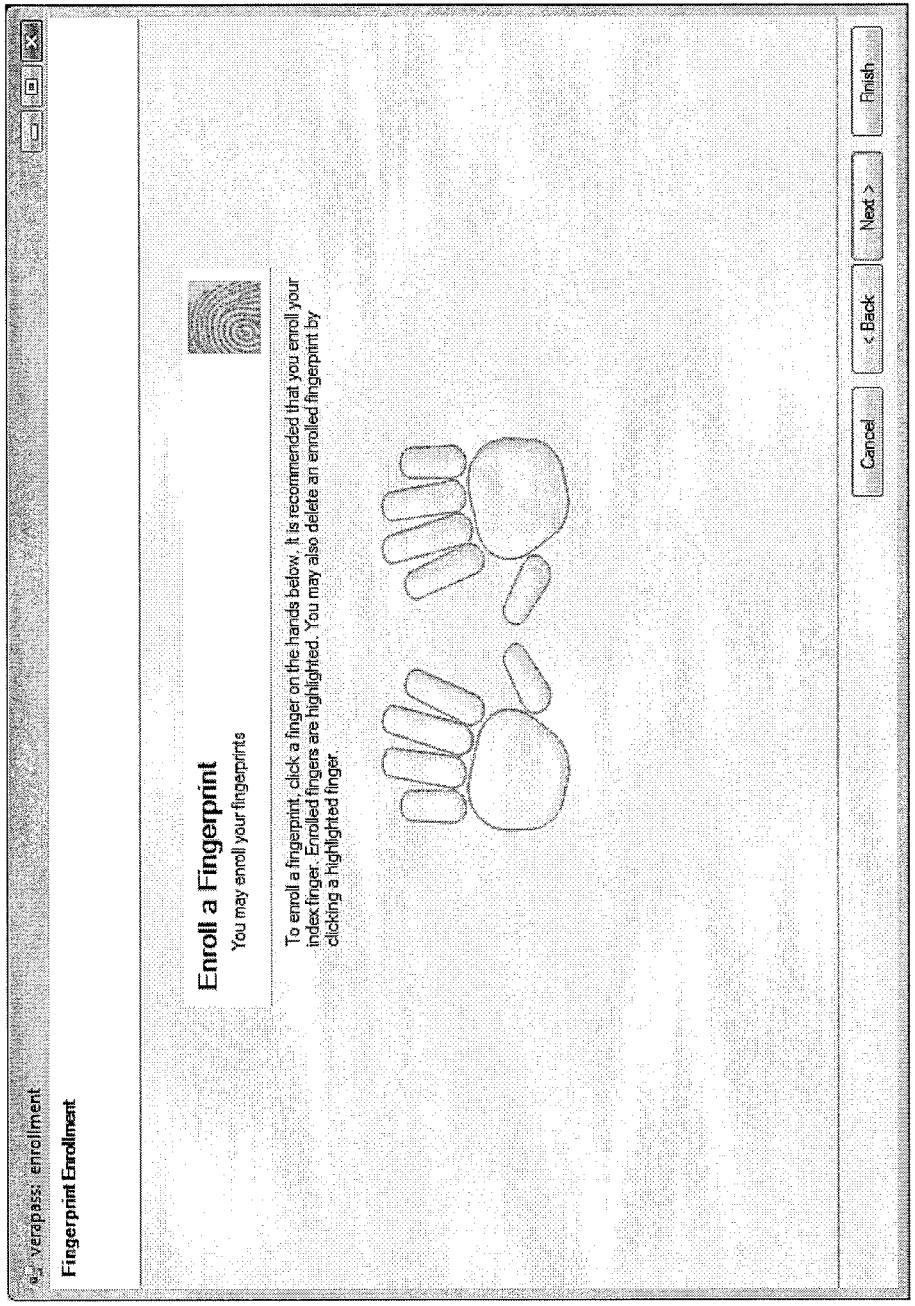

To enroll a fingerprint, click on the appropriate finger to enroll (SCREEN SHOT C, FIG. 12). Up to ten (10) fingers may be enrolled. A minimum of two (2) fingers per customer is recommended.

Figure 13:
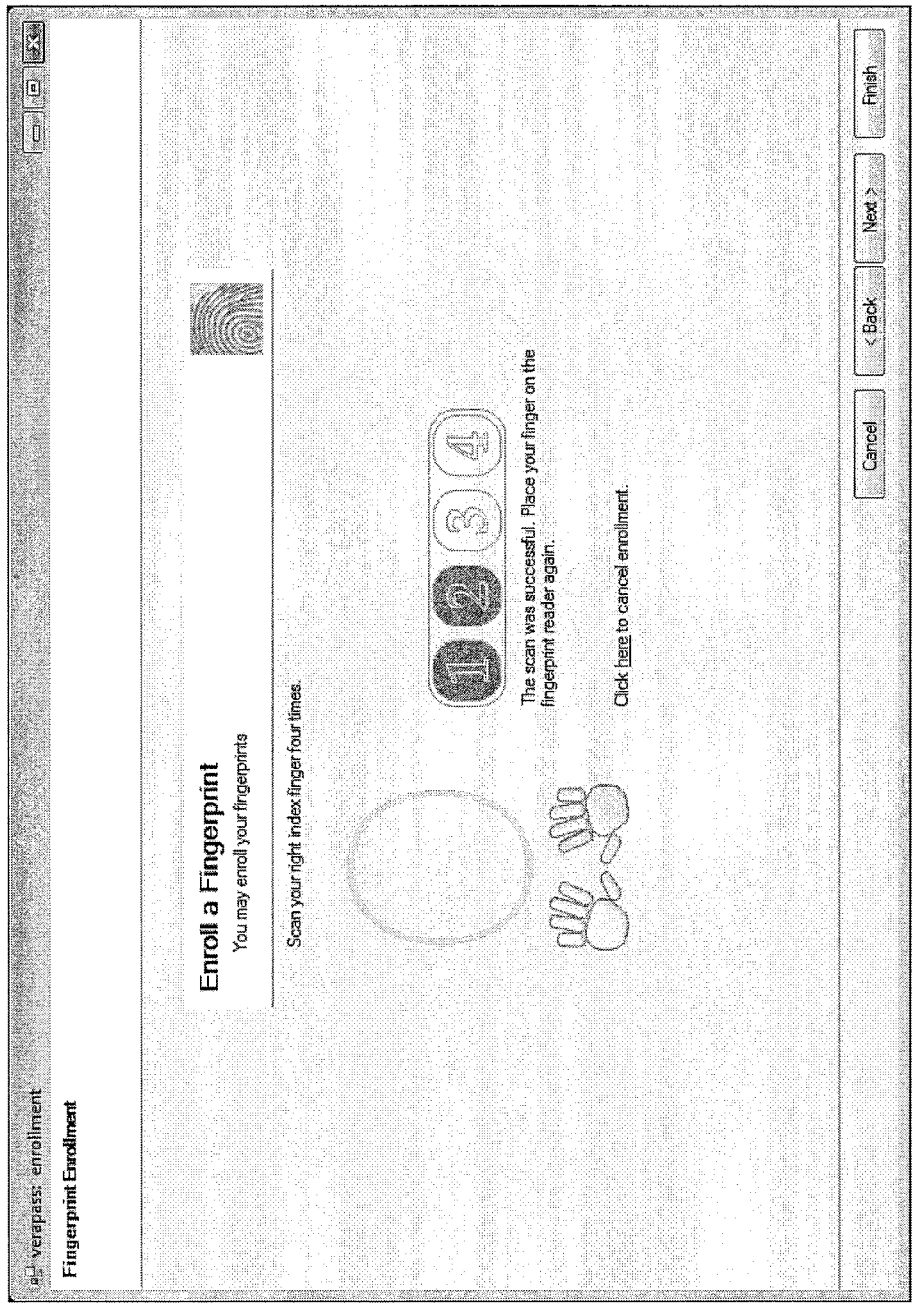
Figure 14:
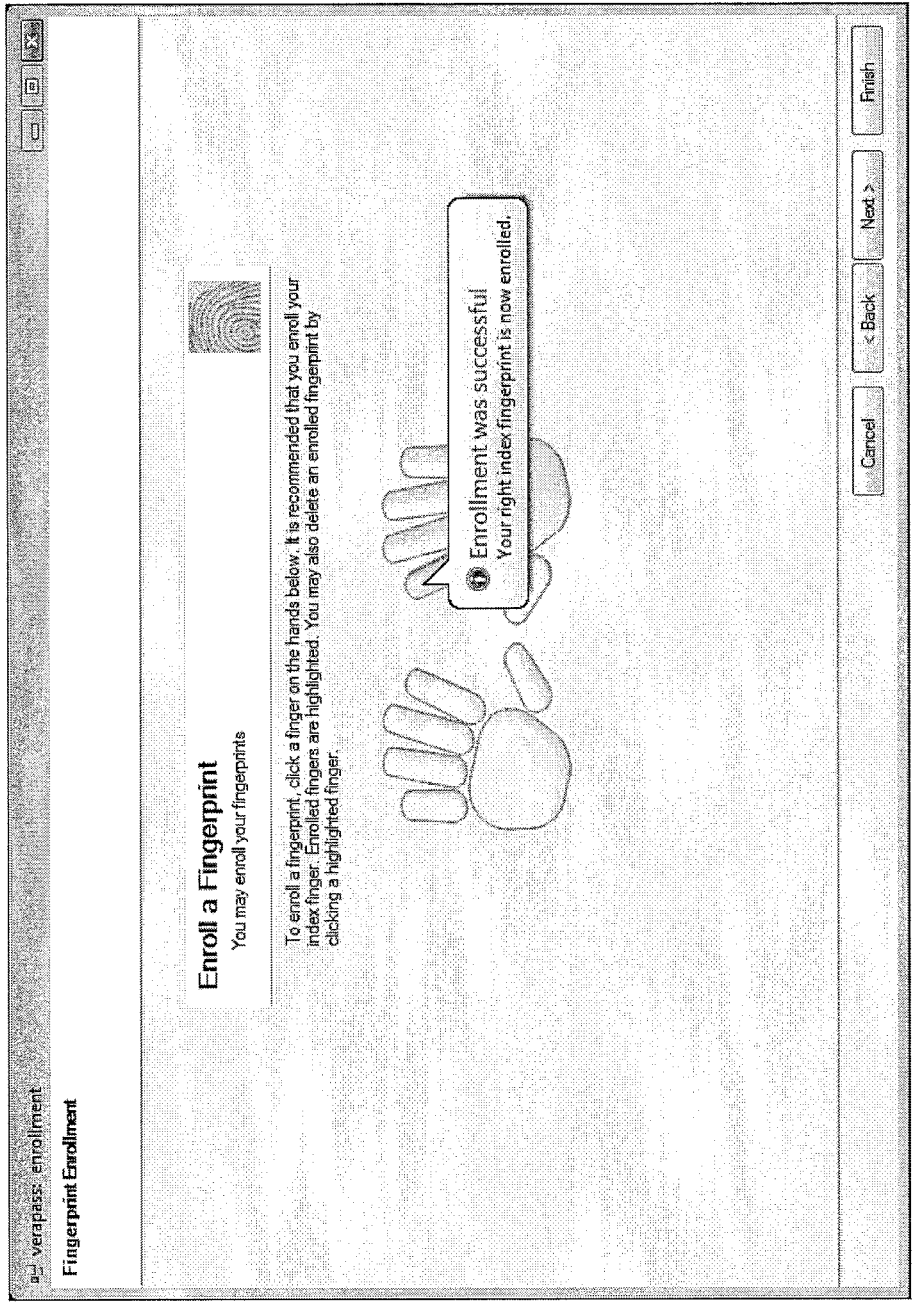

Once the desired finger is selected, it must be presented four (4) times. If the fingerprint is read correctly, the appropriate number is highlighted in blue (SCREEN SHOT D, FIG. 13). Otherwise, a failure notice appears and the finger must be presented again. After successfully presenting the finger four times, the successful feedback is displayed (SCREEN SHOT E, FIG. 14). Click on additional fingers as needed. Hit "Next" when this step is completed.

After the fingerprint enrollment process is completed, the next step is selecting a container and defining a rental term, in months. Please note, selecting a container is optional—the customer may be entered into VeraPass to become a co-owner of an existing container or an authorized user of another customer—refer to the appropriate section for details. The container(s) is selected by placing a check in the "select" container and entering the number of months agreed upon for the rental in the column entitled "Term (in Months).

Figure 15:
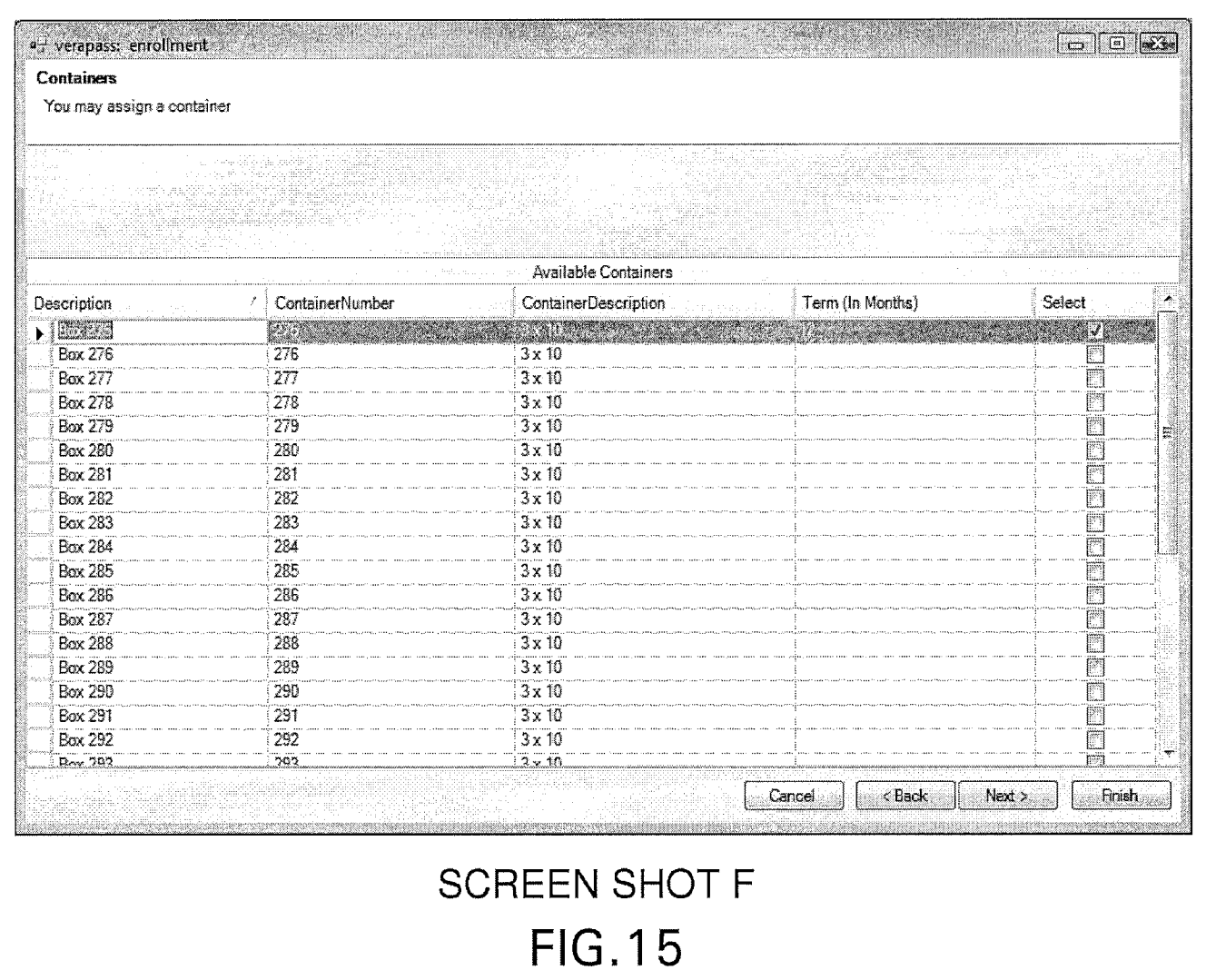

Once the customer enrollment process is completed, click the "Finish" button to save the information into VeraPass (see SCREEN SHOT F, FIG. 15).

Figure 16:
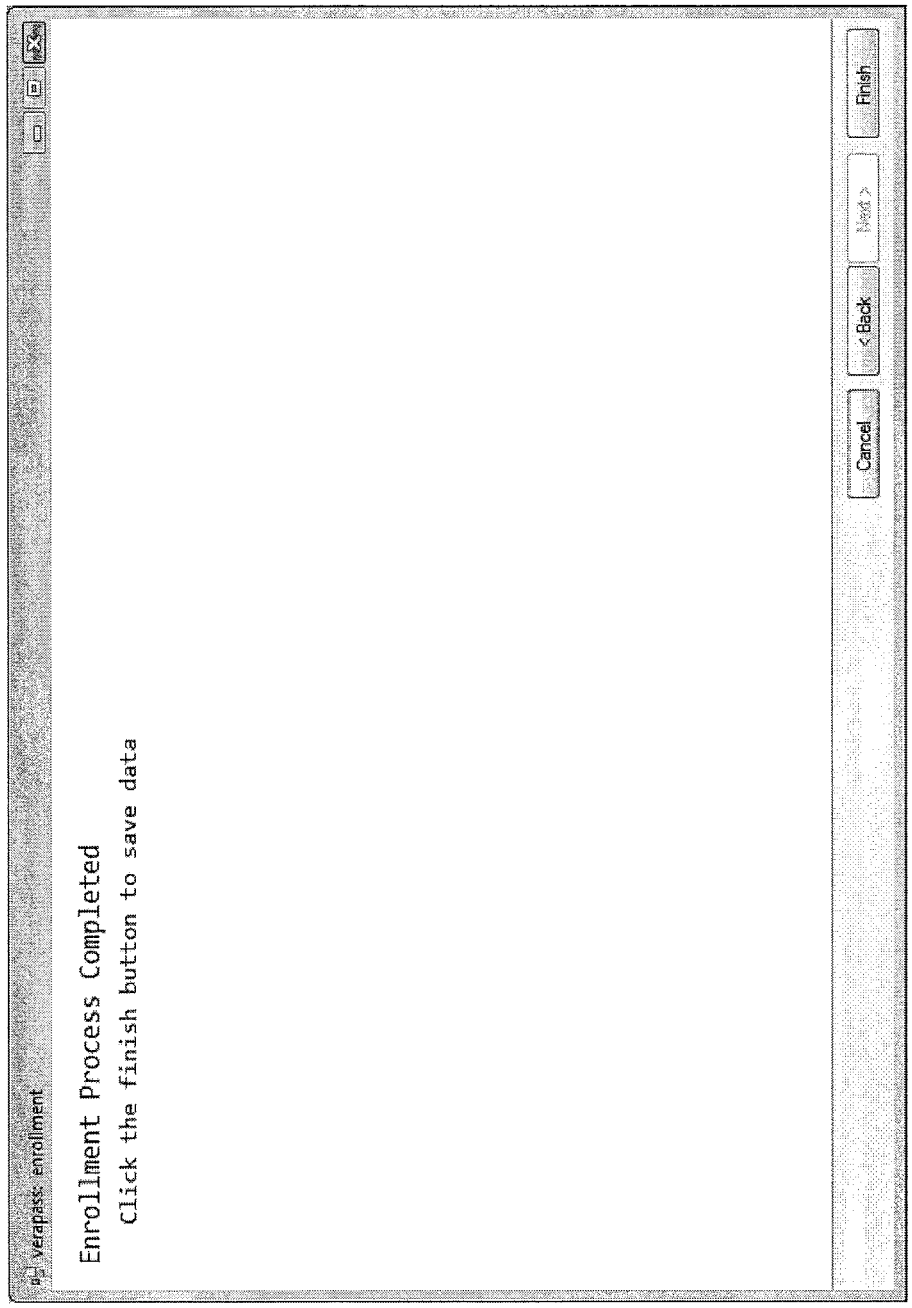

If a container was selected for the customer, it is ready to be commissioned. The customer must present their fingerprint to the kiosk, remove the appropriate key, and access the container. After opening the container and docking the key at the kiosk, the container is considered to be rented (see SCREEN SHOT G, FIG. 16).

Container States
  Available
  Ready to be rented
  Awaiting Commission
  Rental process has begun; customer must access their container for the first time
  Rented
  Rental process is active; customer has accessed their container at least one time
  Awaiting Decommission
  Rental process is ending; customer must access their container one last time

EXAMPLE 2

Editing Customer

From the main menu, select "Edit Customer." Once the maintenance form appears, select "Retrieve User." Afterwards, the customer must present their fingerprint for verification.

Figure 17:
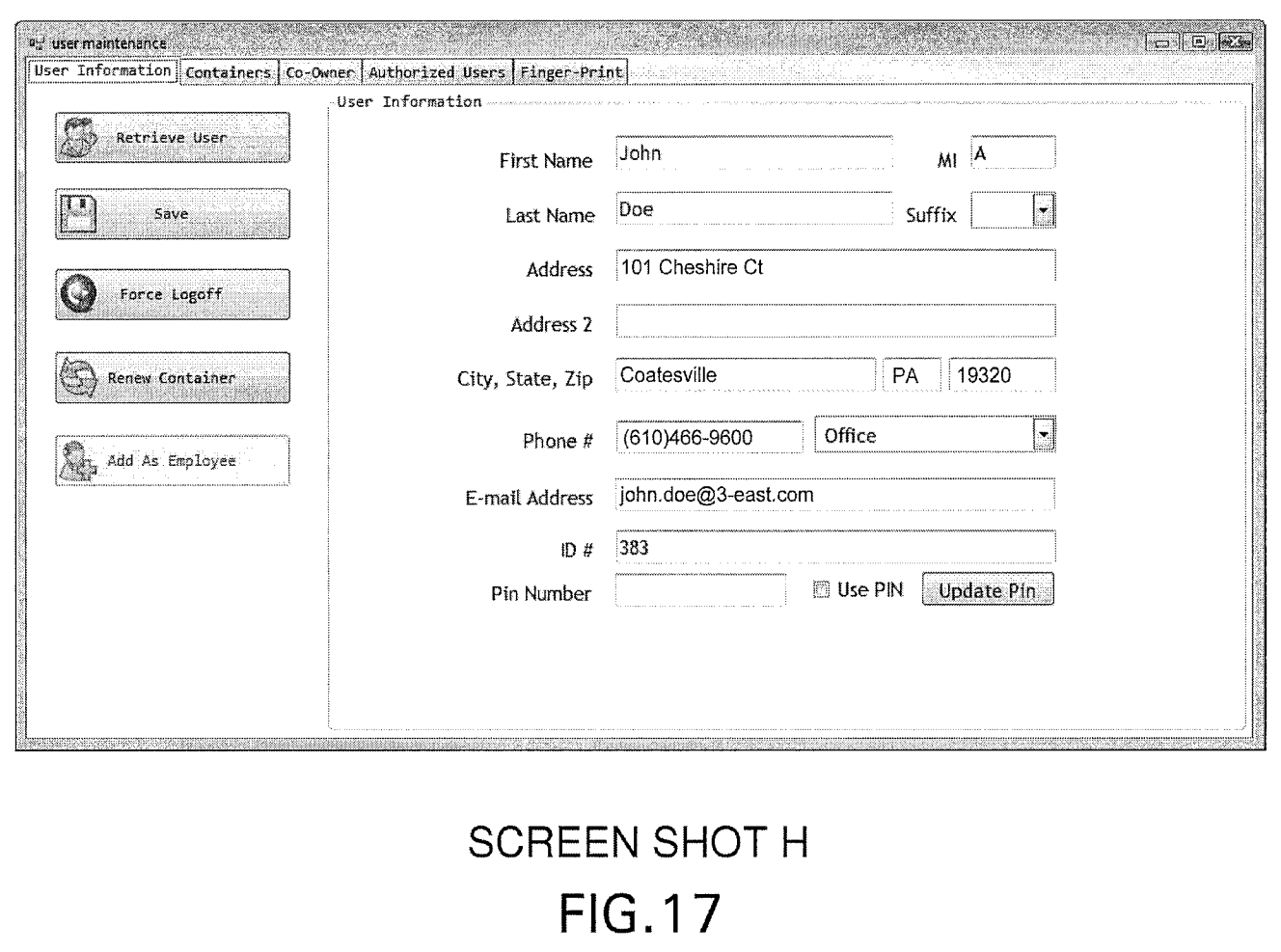

Any of the fields may be changed (see SCREEN SHOT H, FIG. 17). Once changed, click the "Save" button. The application prompts you for a fingerprint as verification.

EXAMPLE 3

Renew Container Rental Term

To renew a rental term for an existing container rental, select "Edit Customer" from the main menu. Next, click on the "Renew Container" button. Customer identification via fingerprint is not required to renew the rental term.

Select the appropriate container from the drop down list. The owner's name(s) appear along with the date opened and current expiration date. Define the new renewal terms, in months, and click the "Save" button (SCREEN SHOT I, FIG. 18).

Additional containers may be renewed by selecting another container and repeating the process outlined above.

EXAMPLE 4

Surrender Container
Voluntarily

When a customer wants to surrender their container, you may decommission their container. To start, click on the "Edit Customer" button from the main menu. Next, the customer must be identified by clicking on the "Retrieve User" button.

Figure 19:
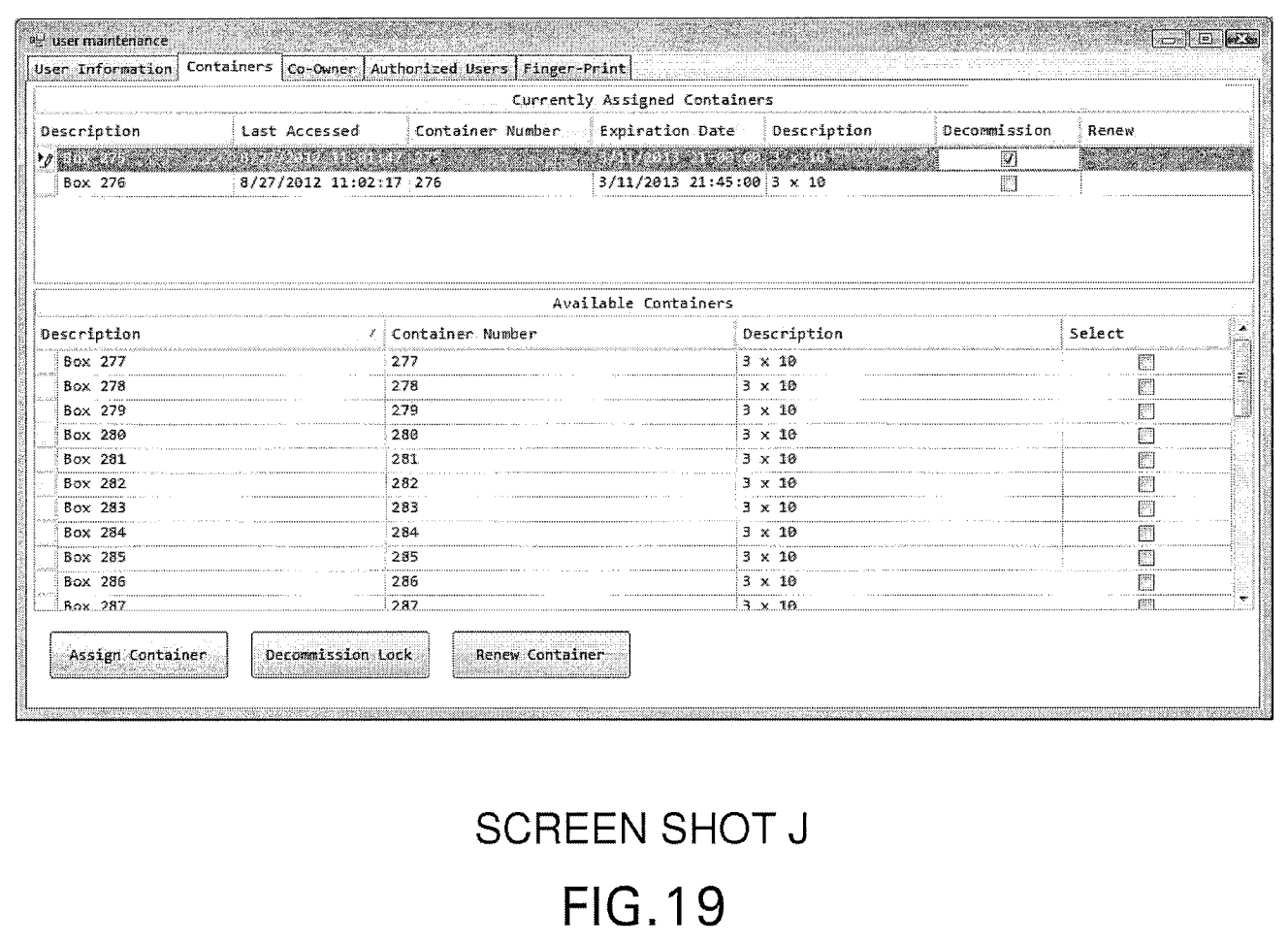

Within the Containers tab, the currently assigned containers grid is populated. To decommission the container, click on the "Decommission" field within the appropriate row. Next, click the "Decommission Lock" button (SCREEN SHOT J, FIG. 19).

Fingerprint verification must be made again. Follow the prompts as needed. At this point, the status of the container is placed into the Awaiting Decommission state. The customer must go to the kiosk and present their finger, remove the key, and access their container one last time. Once that is completed and the key is docked at the kiosk, the container is placed back into the Available state.

EXAMPLE 5

Suspending and Resuming a Container

When the need arises to halt access to a container and keep it in the Rented state, the container may be suspended. The customer does not need to be present in order to suspend a container. Only administrators may suspend or resume a container.

Figure 20:
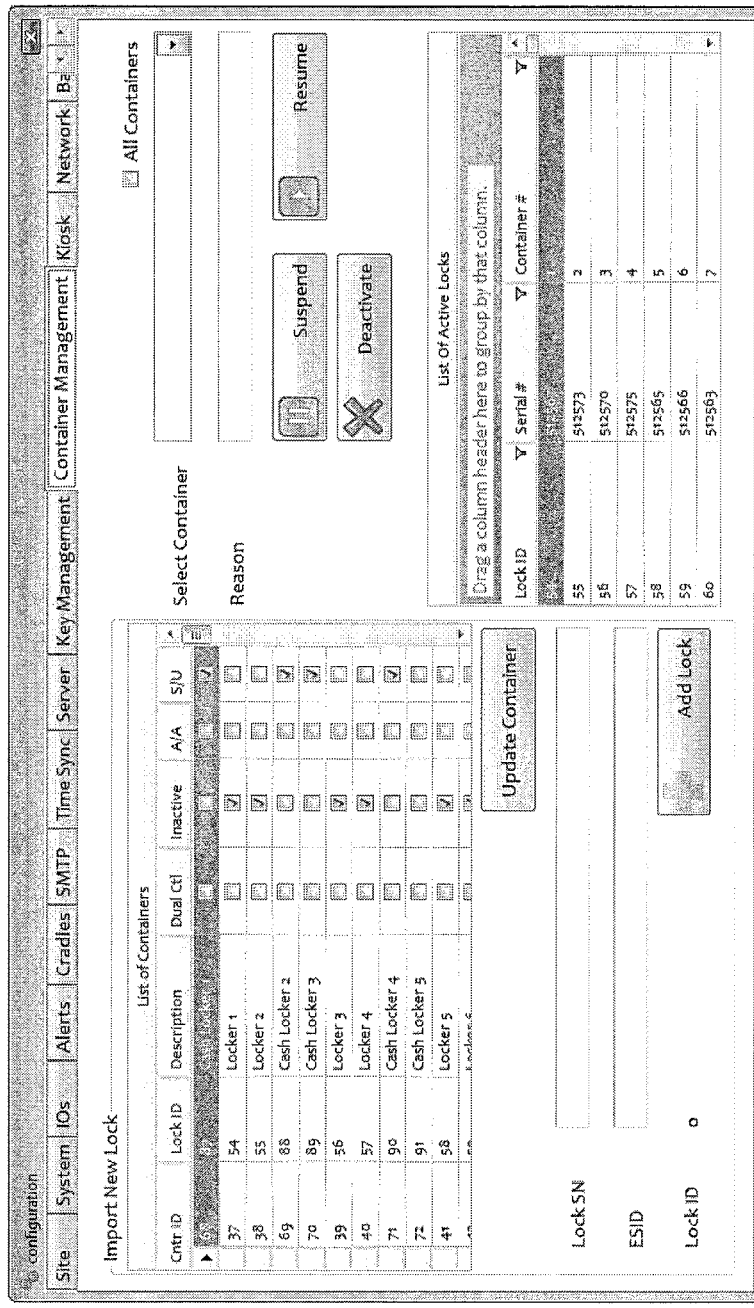

To start the process, click "Configuration" from the main menu and select the tab labeled Container Management.
Suspending
Select a container from the drop-down list
Type a brief reason as to why the container is being suspended
Click the "Suspend" button
Resuming
Place a checkmark in "All Containers"
Select a container from the drop-down list
Type a brief reason as to why the container is being resumed
Click the "Resume" button
See SCREEN SHOT K, FIG. 20.

EXAMPLE 6

Deactivating Container

In the event a container must be forcibly closed without the customer being present, the lock within the container must be deactivated. The container will have to be forced open and the current lock will no longer function. This process cannot be reversed. The container must be forcibly opened and a new lock will have to be installed.

To start the process, click "Configuration" from the main menu and select the tab labeled Container Management.

Select a container from the drop-down list and provide a reason for the deactivation. Before you click on the "Deactivate" button.

Figure 21:
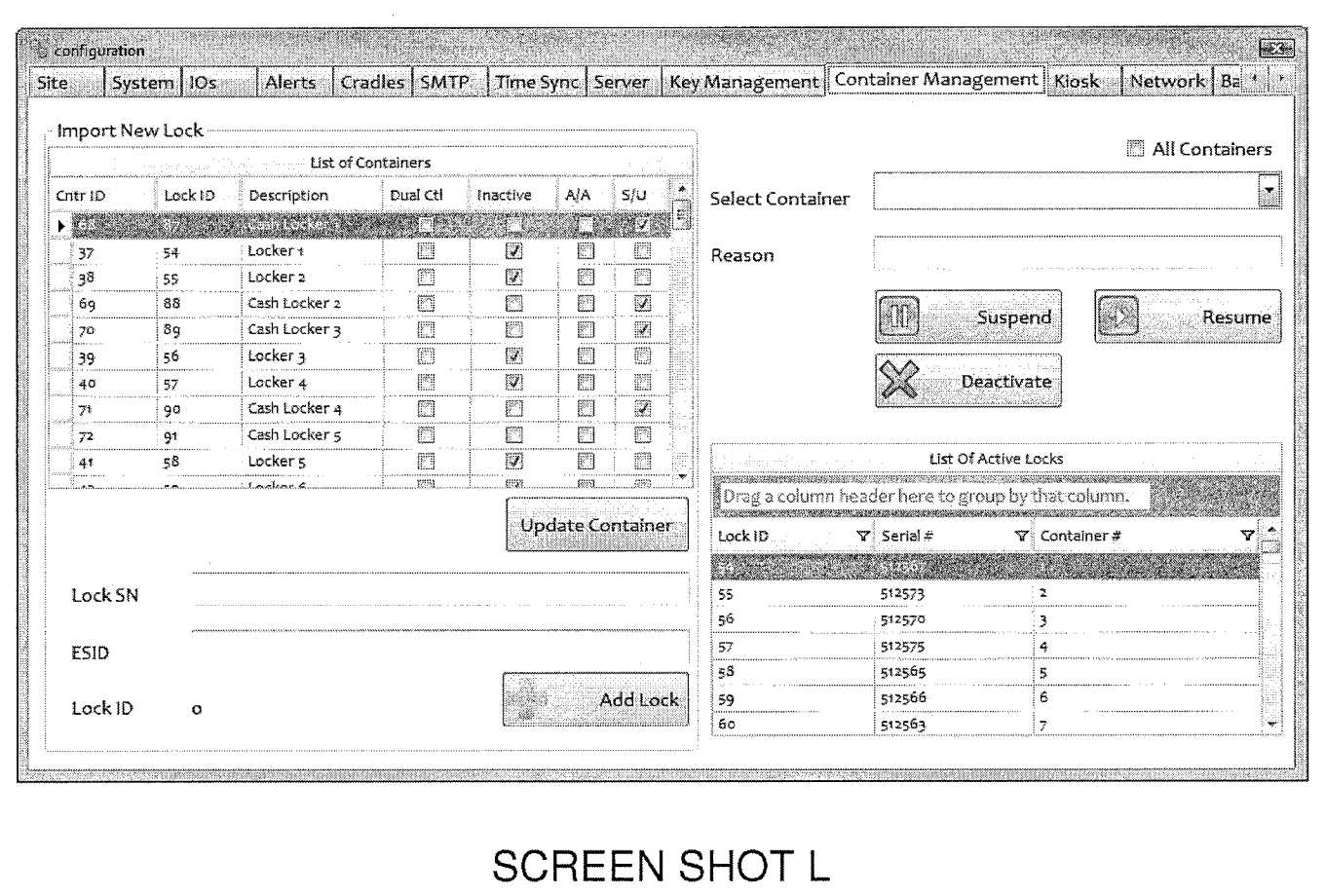

Fingerprint verification must be made again. Follow the prompts as needed (SCREEN SHOT L, FIG. 21).

EXAMPLE 7

Adding a Co-Owner

In order to add a co-owner to an existing container, the owner must be present, and the co-owner must be already enrolled.

To begin, from the main menu click on the "Edit Customer" button. Next, the customer must be identified by clicking on the "Retrieve User" button. After identification has been made, click the Co-Owner tab.

The Currently Assigned Containers grid is populated with the containers assigned to the owner. Adding a co-owner may be performed on one or more containers. Select the "Add Co-Owner" container for the appropriate container(s). Afterwards, click on the "Add Co-Owner" button.

Figure 22:
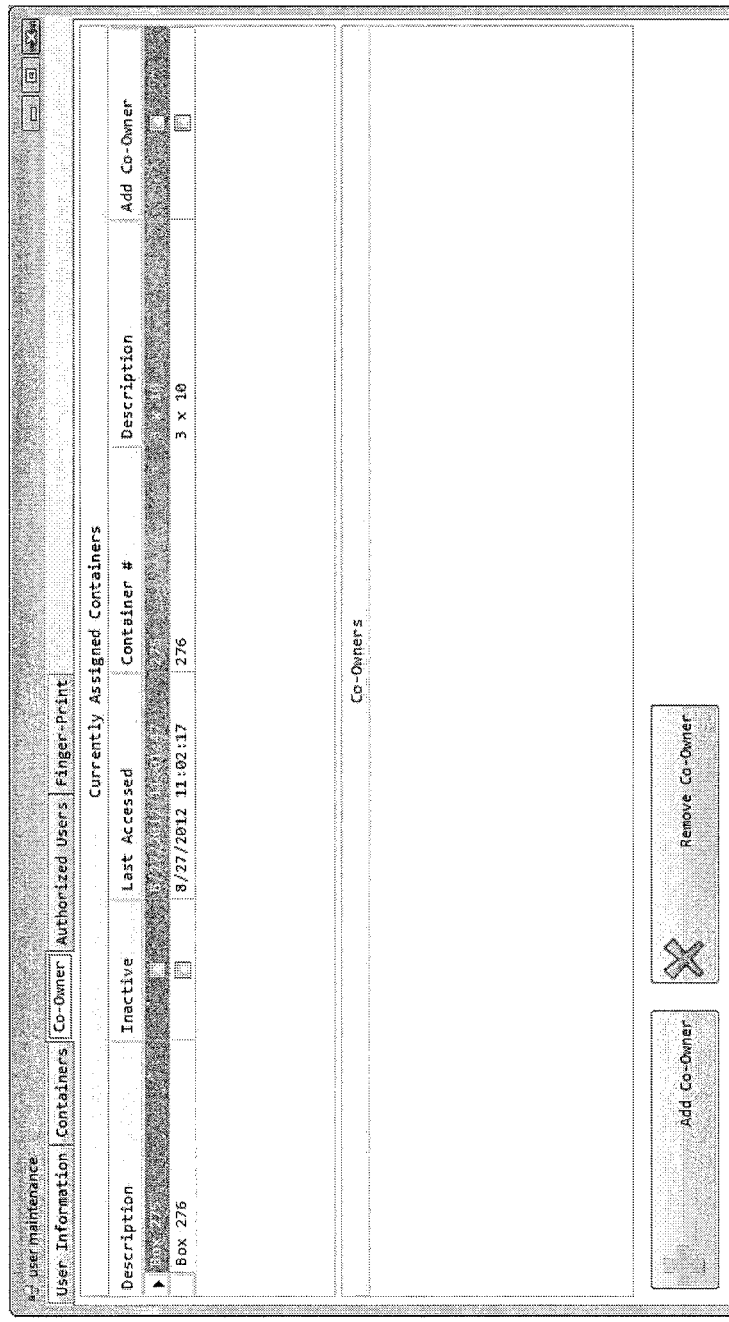

Fingerprint verification must be made again. Follow the prompts as needed (SCREEN SHOT M, FIG. 22).

EXAMPLE 8

Removing an Owner

To begin, from the main menu click on the "Edit Customer" button. Next, the customer must be identified by clicking on the "Retrieve User" button. After identification has been made, click the Co-Owner tab.

Figure 23:
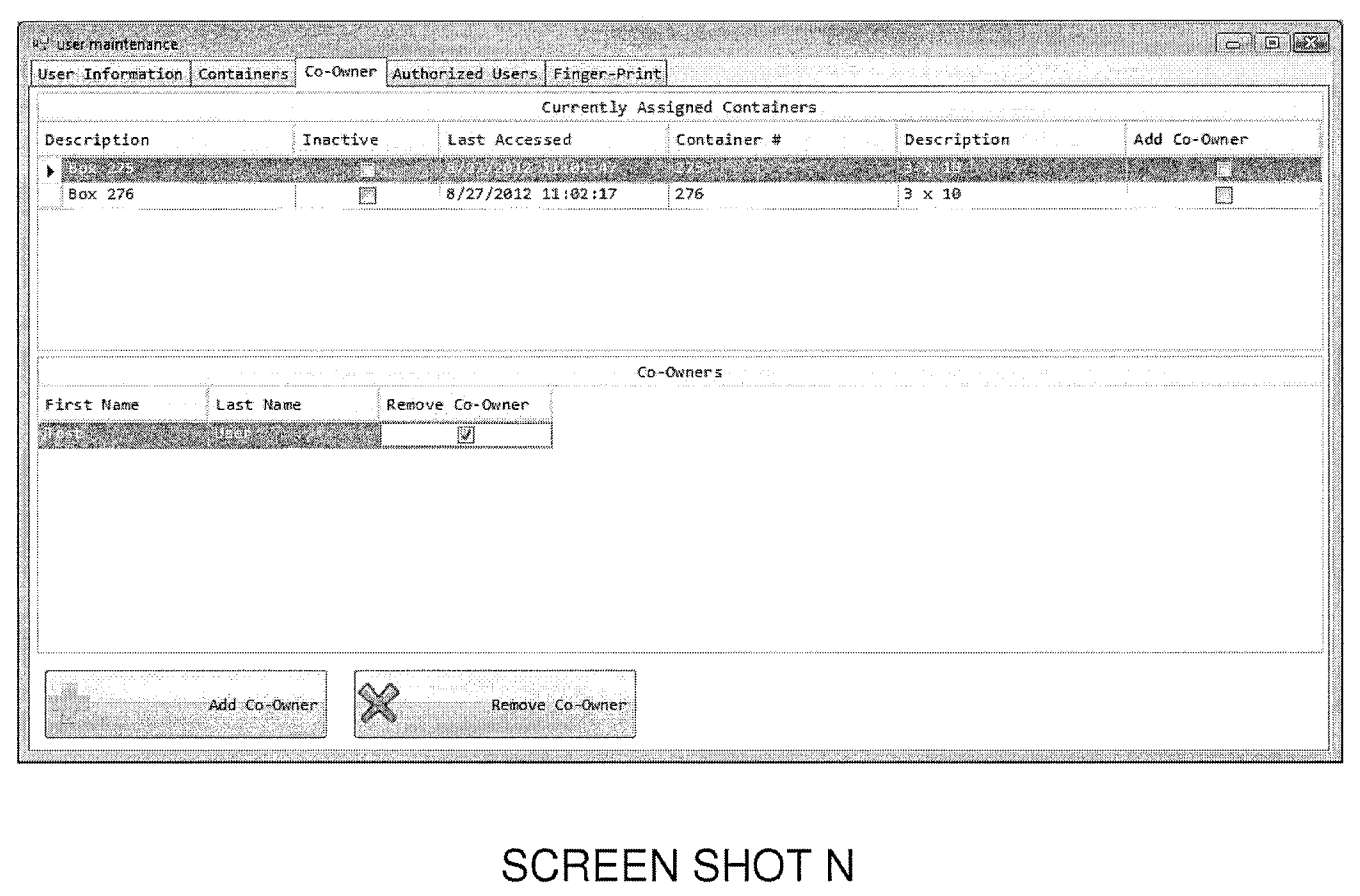

The Currently Assigned Containers grid is populated with the containers assigned to the owner. Removing an owner must be performed on one (1) container at a time. However, removing multiple owners may be performed all at once. Click on the appropriate row within the Currently Assigned Containers grid. The co-owner's grid automatically populates with the existing owners. Select which owner(s) to remove by placing a check in the Remove Co-Owner column. Next, click the "Remove Co-Owner" button. (SCREEN SHOT N, FIG. 23).

Fingerprint verification must be made again. Follow the prompts as needed. If the container has multiple owners, at least one (1) owner must be present to remove another owner.

EXAMPLE 9

Adding an Authorized User

In order to add an authorized user to an existing container, the owner must be present, and the authorized user must be already enrolled.

From the main menu click on the "Edit Customer" button. Next, the customer must be identified by clicking on the "Retrieve User" button. After identification has been made, click the Authorized Users tab.

Figure 24:
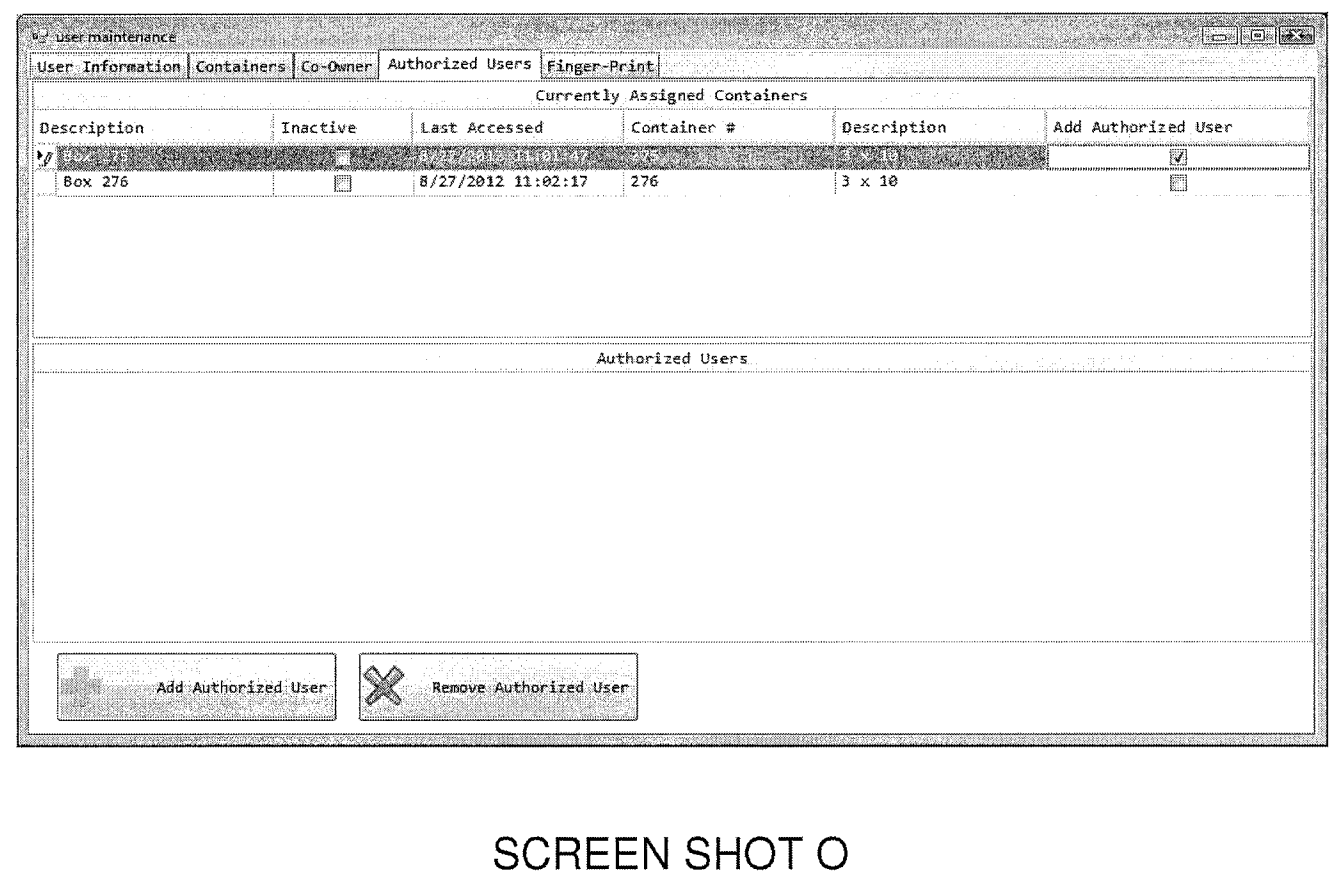

The Currently Assigned Containers grid is populated with the containers assigned to the owner. Adding an authorized user may be performed on one or more containers. Select the "Add Authorized User" container for the appropriate container(s). Afterwards, click on the "Add Authorized User" button. (See SCREEN SHOT 0, FIG. 24.)

Fingerprint verification must be made again. Follow the prompts as needed.

EXAMPLE 10

Removing an Authorized User

In order to remove an authorized user, the owner must be present.

To begin, from the main menu click on the "Edit Customer" button. Next, the customer must be identified by clicking on the "Retrieve User" button. After identification has been made, click the Authorized Users tab.

Figure 25:
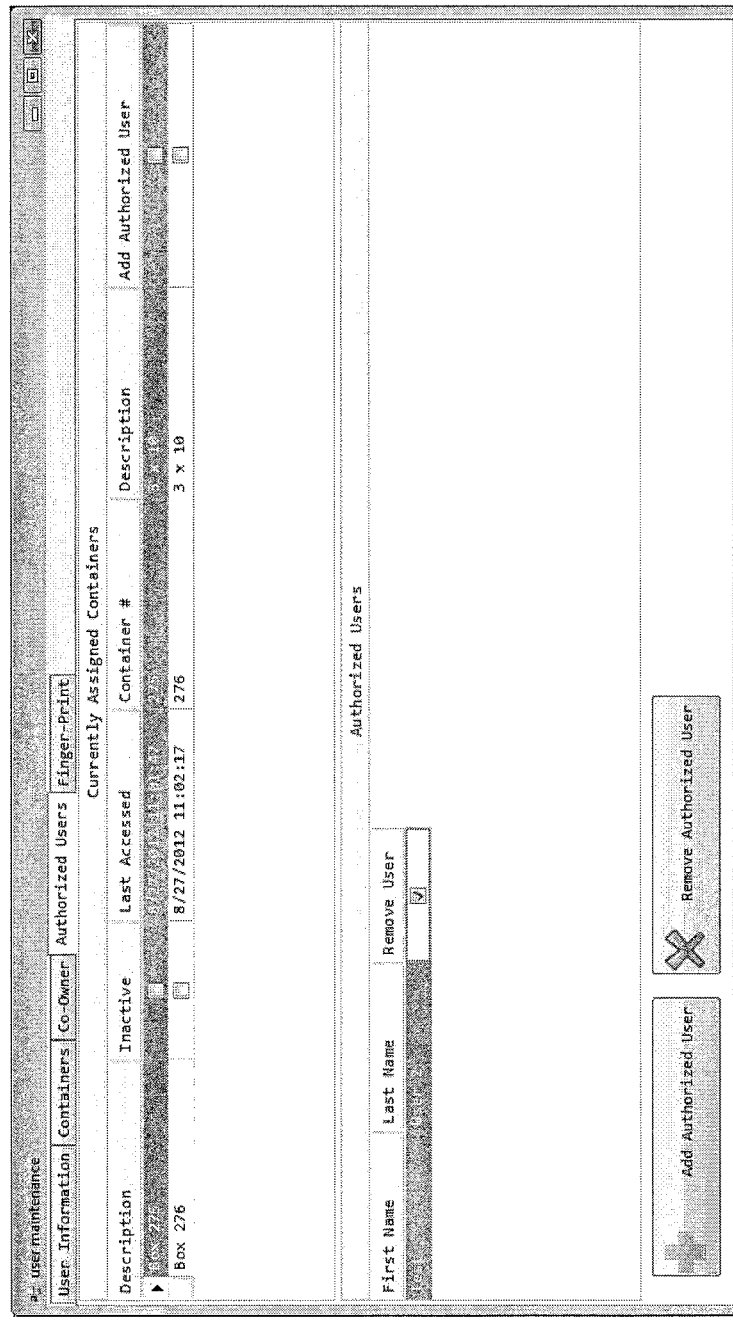

The Currently Assigned Containers grid is populated with the containers assigned to the owner. Removing an authorized user must be performed on one (1) container at a time. However, removing multiple authorized users may be performed all at once. Click on the appropriate row within the Currently Assigned Containers grid. The Authorized User's grid automatically populates with the existing authorized users. Select which user(s) to remove by placing a check in the "Remove User" column. Next, click the "Remove Authorized User" button. (See SCREEN SHOT P, FIG. 25.)

Fingerprint verification must be made again. Follow the prompts as needed.

EXAMPLE 11

Renting a New Container to an Existing Customer

From the main menu click on the "Edit Customer" button. Next, the customer must be identified by clicking on the "Retrieve User" button. After identification has been made, click the Containers tab.

Two grids are displayed: Currently Assigned Containers and Available Containers.

Figure 26:
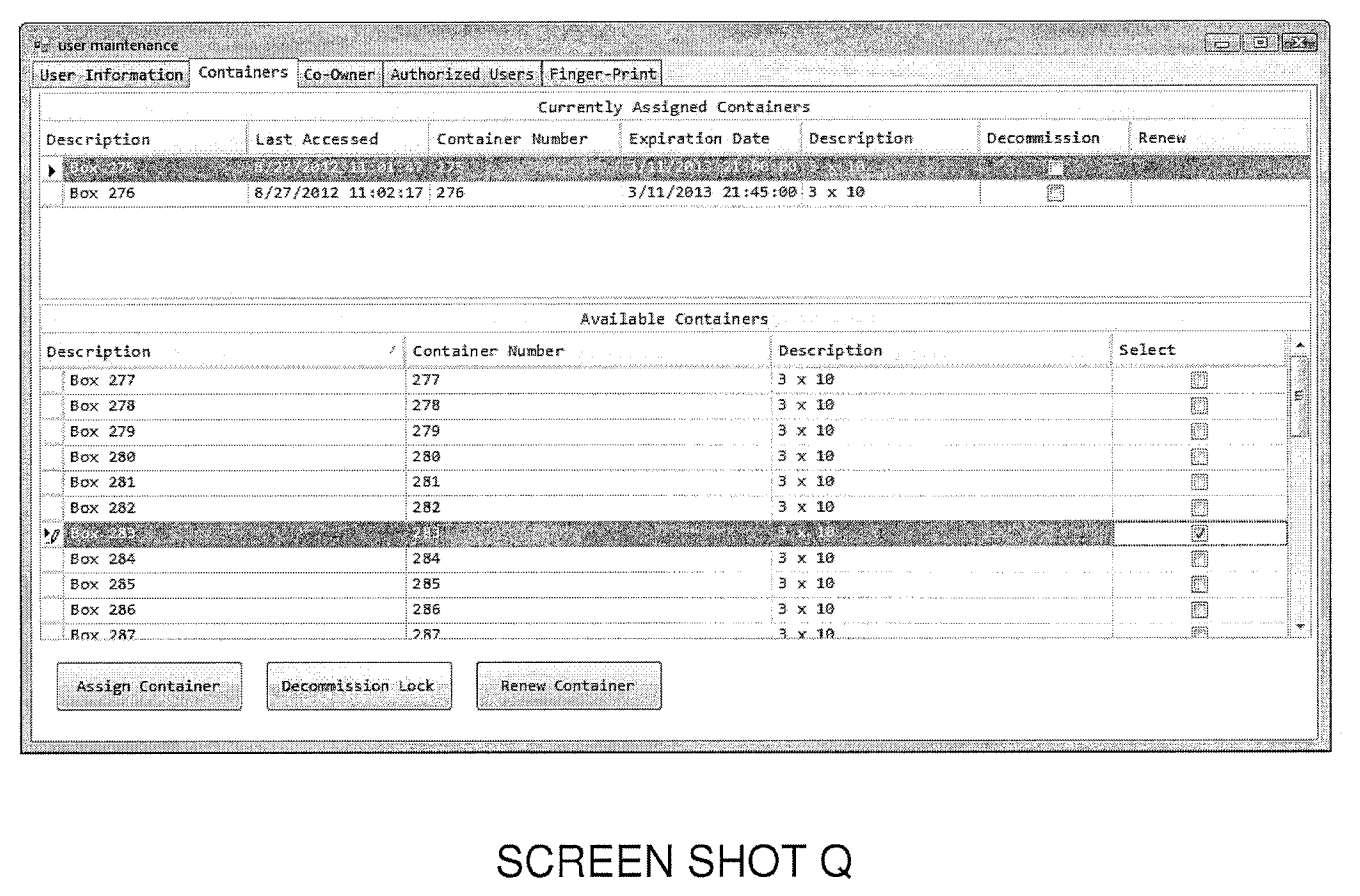

To assign an available container to the customer, click "Select" within the appropriate row. As shown in SCREEN SHOT Q, FIG. 26, "Container 283" will be added to the customer's profile.

Click on the "Assign Container" button—fingerprint verification must be made again by the customer. Afterwards, renewal terms must be defined. After the information is saved, Container 283's mode is set to Awaiting Commission. The customer must proceed to the kiosk, retrieve a key, and access the container.

EXAMPLE 12

Updating Existing Fingerprint(s)

Customers may update their fingerprint templates at any time.

From the main menu click on the "Edit Customer" button. Next, the customer must be identified by clicking on the "Retrieve User" button. After identification has been made, click the Fingerprint tab.

To remove an existing fingerprint, click on the highlighted finger. To add a fingerprint, click on any finger and follow the standard enrollment process. Please refer to the Fingerprint Enrollment section for details.

Figure 27:
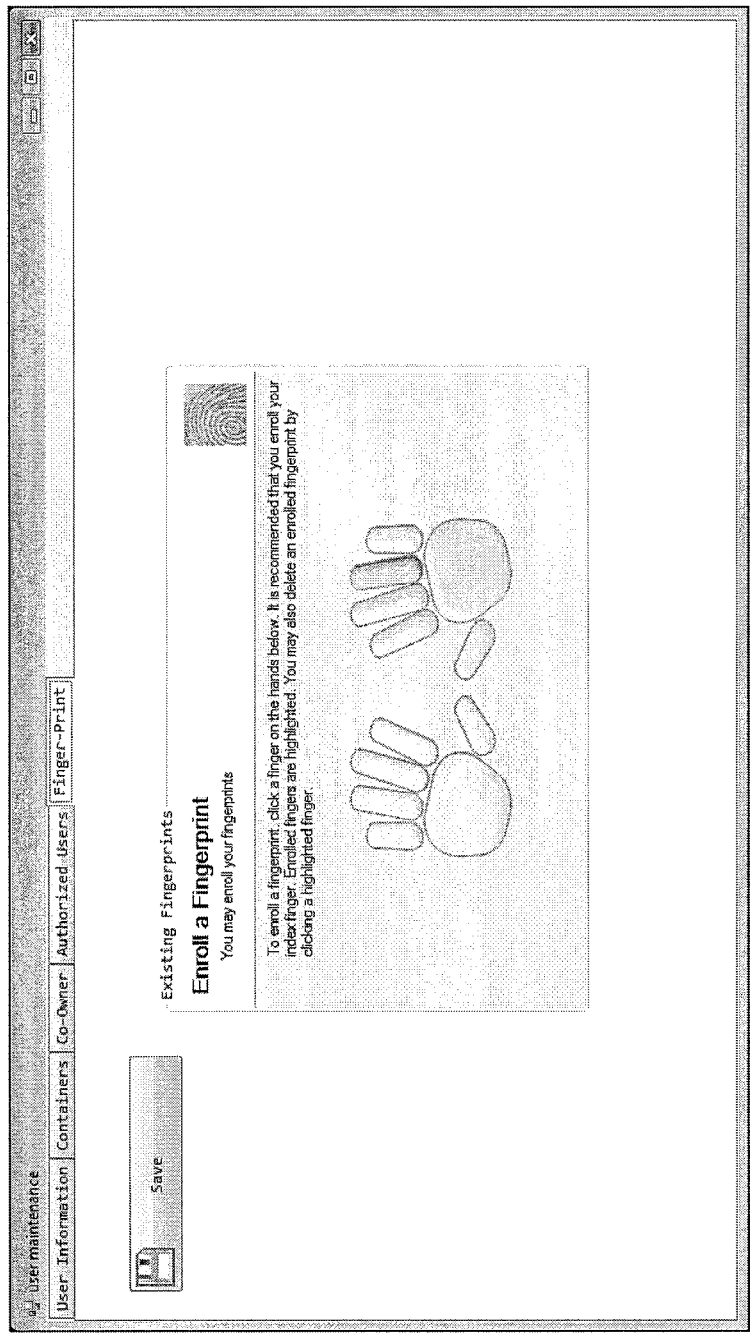

Once completed, click the "Save" button. See SCREEN SHOT R, FIG. 27.

EXAMPLE 13

Adding a New Employee

After clicking the button on the main menu labeled New Employee, the employee enrollment wizard is displayed.

Figure 28:
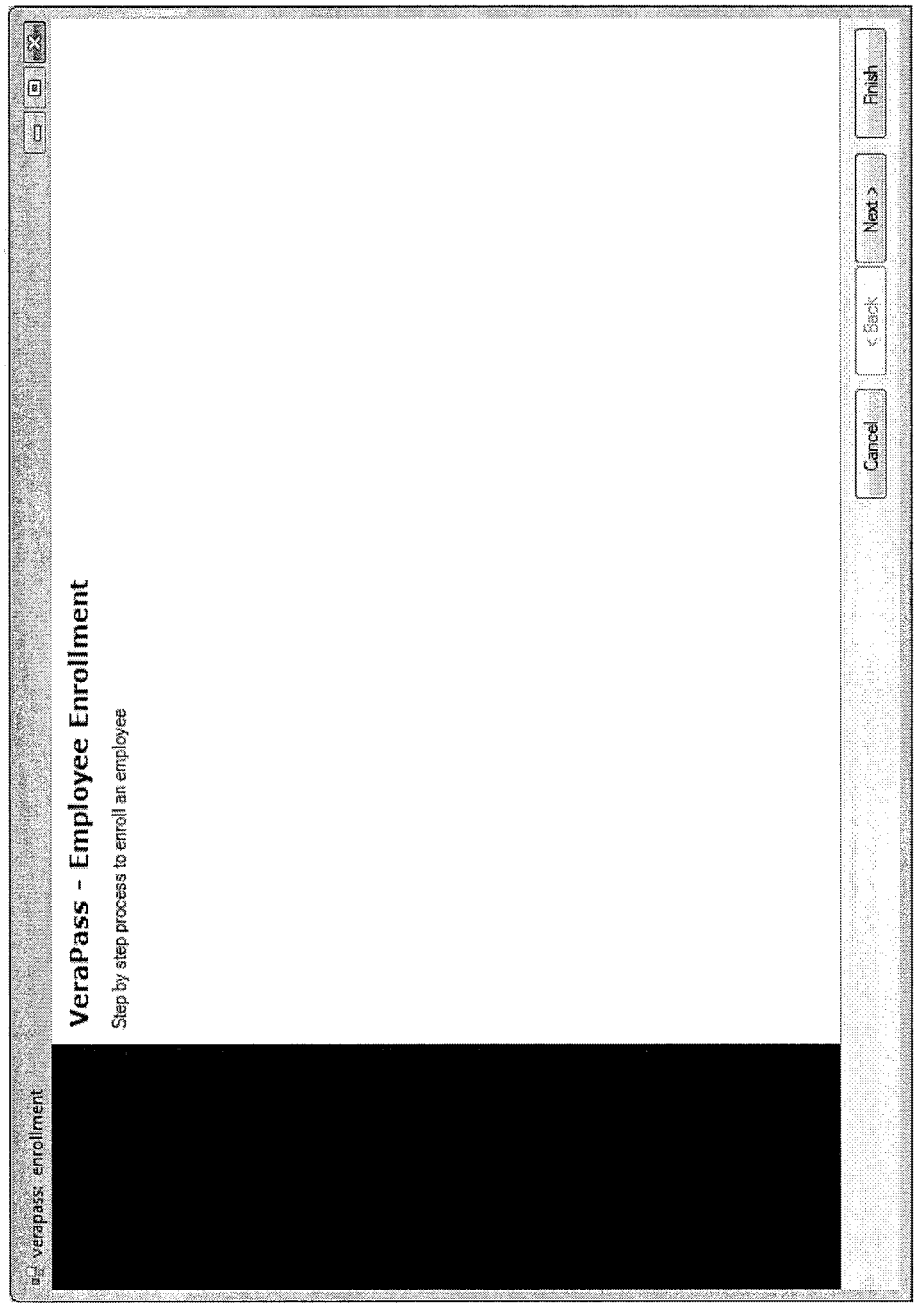

Click the "Next" button to proceed with the enrollment process. See SCREEN SHOT S, FIG. 28.

Figure 29:
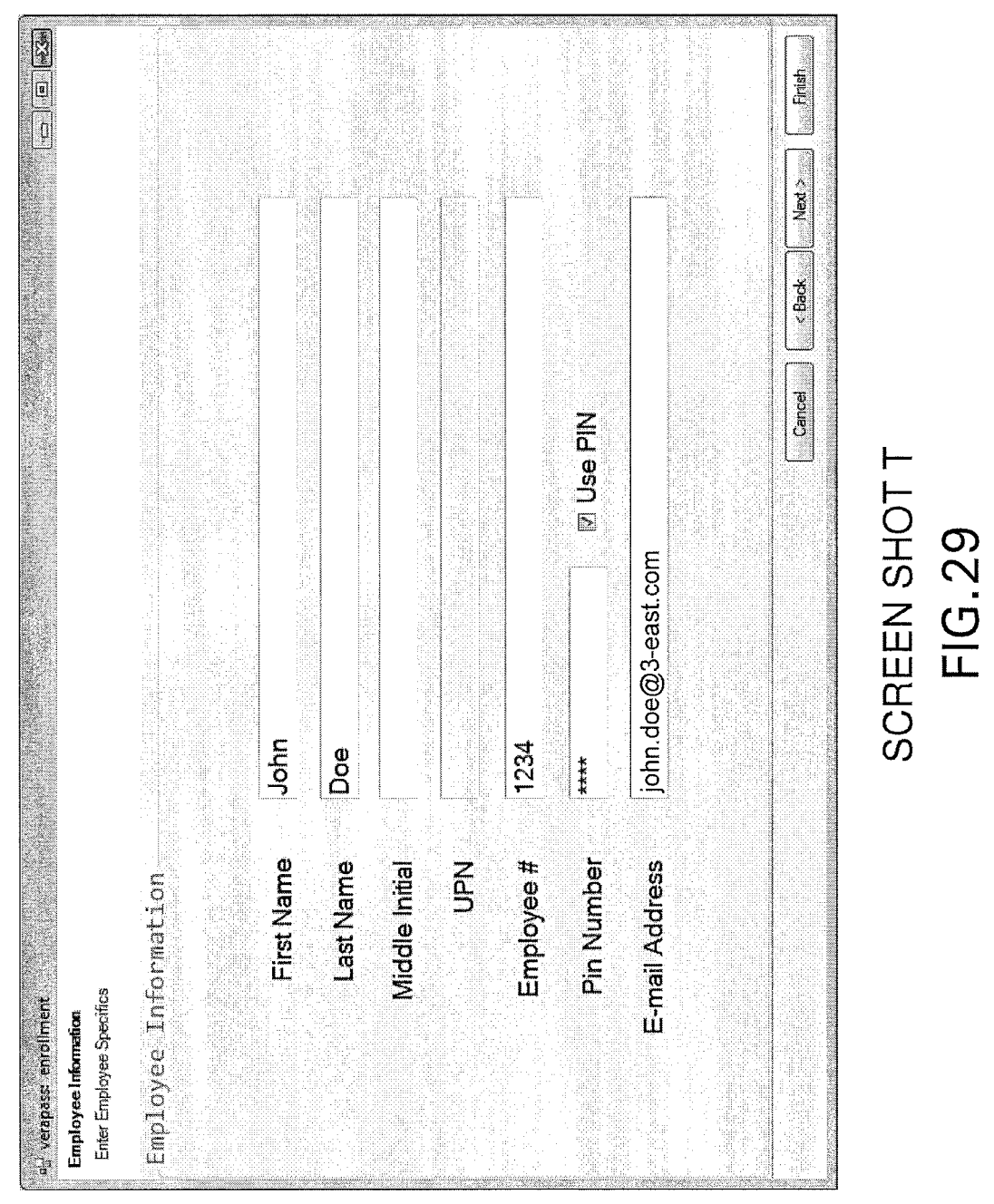

The following fields are available. See SCREEN SHOT T, FIG. 29.

Name: First, Middle Initial, Last
Universal Principal Name (UPN)
For Active Directory Integration
This field is read only
Employee Number
Pin Number
If a pin is desired, ensure "Use Pin" is checked
E-mail Address
Middle initial, employee number, email address, PIN number are all optional fields.

Figure 30:

The following permissions may also be designated when adding a new employee (see SCREEN SHOT U, FIG. 30):

Administrator
Select this if an employee is to be an administrator within the VeraPass Management Software
Kiosk Access
Select this if an employee is to perform maintenance functionality at the kiosk
Add Employees
Determines the ability to add new employees
Edit Employees
Determines the ability to maintain existing employees
Temp Worker
Flags the employee as a temporary employee
Expires On
If the employee is a temporary employee, this is the date that the employee's access is to expire on.
Key Duration (Minutes)
The number of minutes the key will operate before having to be reprogrammed. Not applicable in safe-deposit container mode.

To enroll a new employee's fingerprint, click on the appropriate finger to enroll. You may enroll up to ten (10) fingers. Typical employees should have at least two (2) fingers enrolled. If the new employee is going to be granted Administrator permission, it is strongly recommended that all ten fingers be enrolled. See SCREEN SHOT D, FIG. 13.

Once the appropriate finger is selected, it must be presented four (4) times. If the fingerprint is read correctly, the appropriate number is highlighted in blue (see SCREEN SHOT E, FIG. 14). Otherwise, a failure notice appears and the finger must be presented again. After successfully presenting the finger four times, the successful dialog feedback is displayed. Click on additional fingers as needed.

Figure 31:
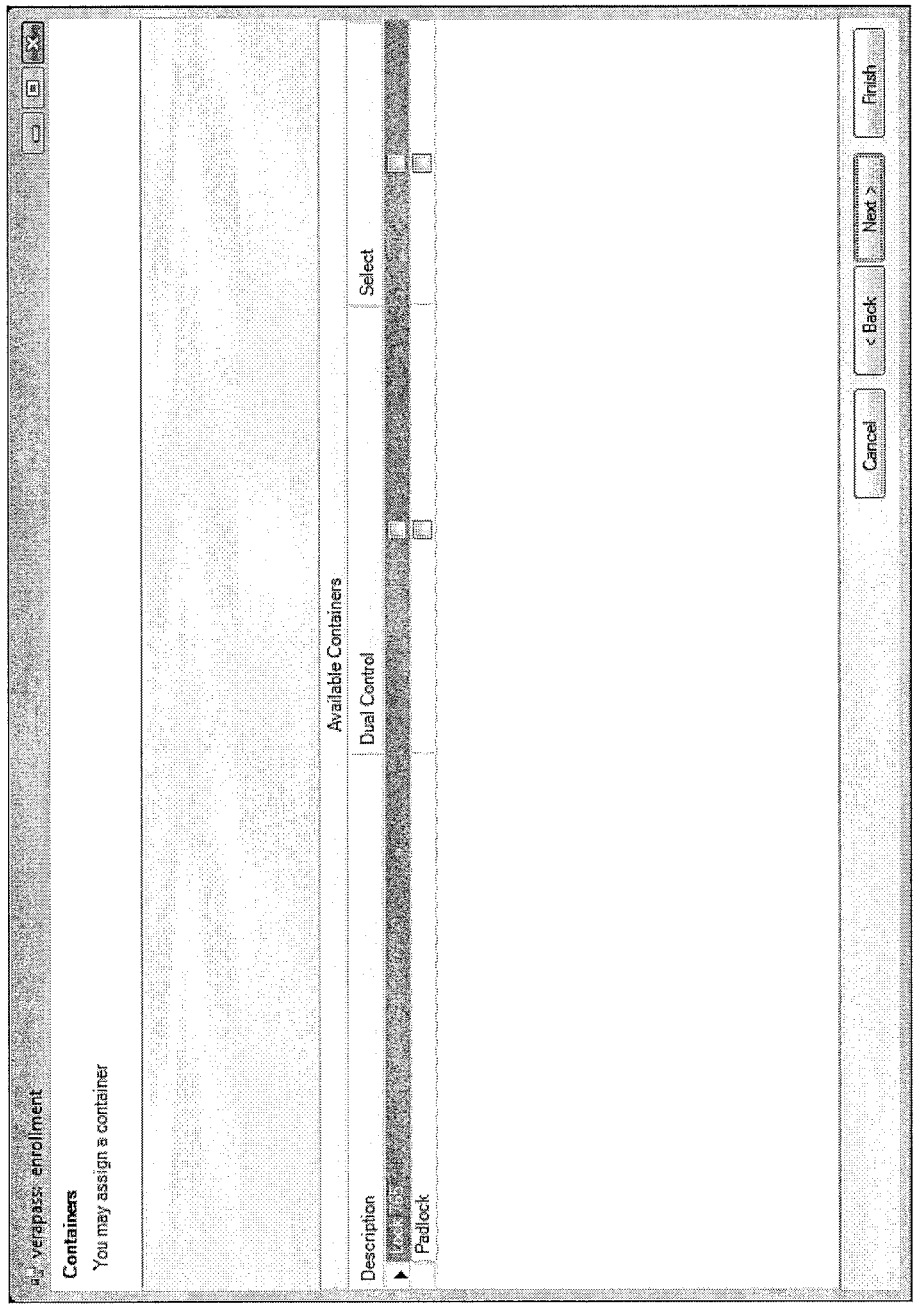

To assign containers to the employee, place a checkmark in the Select column within the container listing (see SCREEN SHOT V, FIG. 31). Containers do not have to be assigned at this time. To complete the enrollment process, click on "Next" and then the "Finish" button on the following screen (see SCREEN SHOT G, FIG. 16).

EXAMPLE 14

Edit Existing Employee

Figure 32:
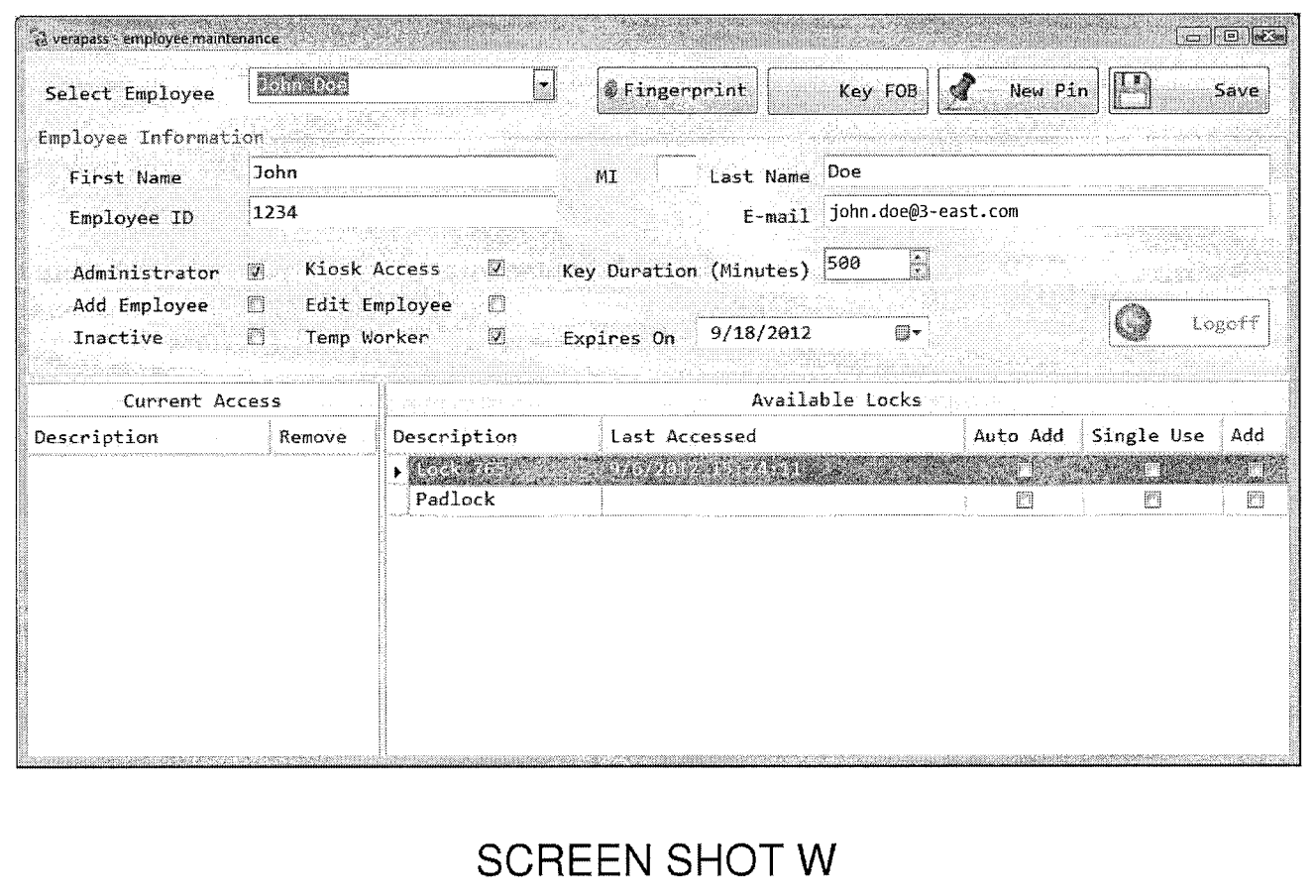

To edit an existing employee, select a name from the drop-down list. Afterwards, the appropriate fields are populated. In SCREEN SHOT W, FIG. 32, John Doe is loaded who is flagged as an administrator with kiosk access. He is a temporary employee due to expire on Sep. 18, 2012. His key duration is 500 minutes. He currently does not have access to any containers as the Current Access grid is blank.

EXAMPLE 15

Configuration Area
Time Sync
The VeraPass kiosk requires a time sync server to ensure the date and time are accurate.

Five (5) public time sync servers are defined within the database; however, depending on local firewall rules, use of public time servers may not be allowed. Therefore, adding the institution's time sync server is allowed. From the configuration menu, select the Time Sync tab.

To activate an existing inactive server, double click on the appropriate row and change the desired fields below in the Details area. Click the "Save" button.

Figure 33:
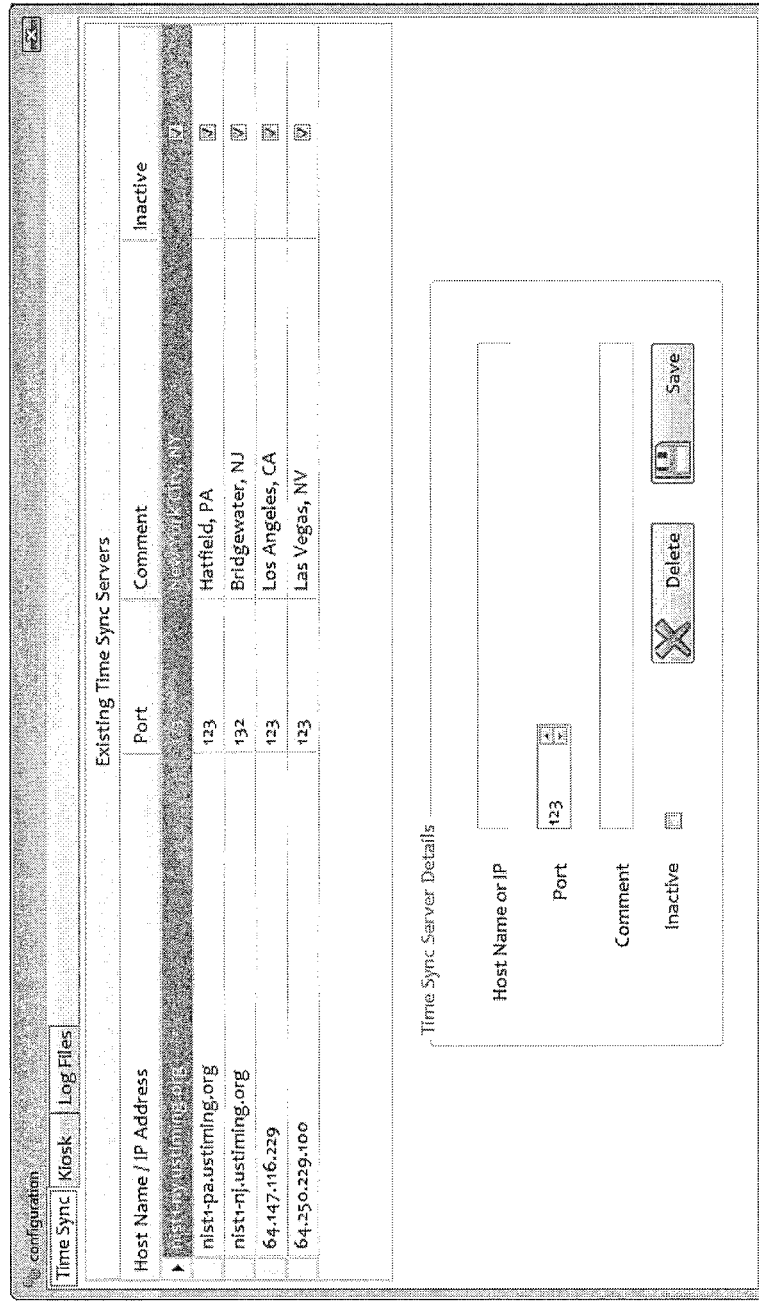

To insert a new time sync server, provide the host name (or IP address), port number (123 is standard), and a comment. Click the "Save" button. The next time the watchdog service tries to perform a time sync, the newly added server will be used. Ensure only one (1) time sync server is active in the system. See SCREEN SHOT X, FIG. 33.

EXAMPLE 16

Configuration Area
Update Kiosk Software
Before starting the update process, you must have a security token issued by your installing supplier before starting the update process.

To remotely update the kiosk software, click the "Configuration" button from the main menu. On the Configuration page, select the Kiosk tab.

First, click on the "Stop Watchdog" button. Second, click on the "Stop Kiosk App" button. At this point, the kiosk is no longer running the application and will not accept fingerprint data from customers or employees.

Figure 34:
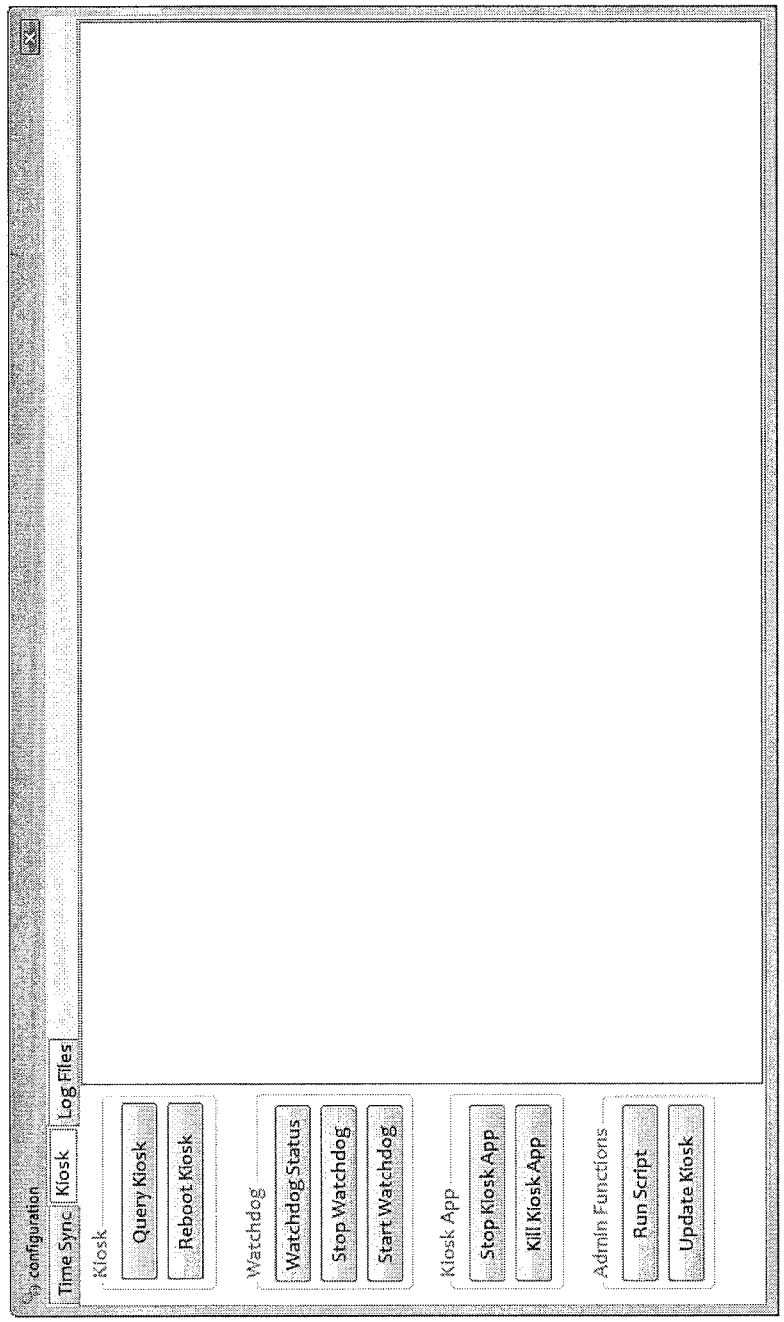

To begin the update process, click the "Update Kiosk" button. You'll be prompted to supply the security token and navigate to the new VeraPass application. Once the application has been updated, click the "Reboot Kiosk" button. The kiosk will reboot and automatically launch the new version of software. See SCREEN SHOT Y, FIG. 34.

EXAMPLE 17

Configuration Area
Update Database
Before starting the database update process, you must have valid database scripts issued by your installing supplier.

From time to time, updates to the database are necessary as the application evolves. As such, changes to tables and/or stored procedures are required.

Click on the "Run Script" button. The application prompts you for the location of the script files to be executed. Once the script has been executed, results are displayed. Once all scripts have been executed, it is recommended to restart the kiosk. You should refer to the section Restarting the Kiosk for detailed instructions. See SCREEN SHOT Y, FIG. 34.

EXAMPLE 18

Configuration Area
Restarting the Kiosk
To begin the restart process, click the "Configuration" button from the main menu. On the Configuration page, select the Kiosk tab.

First, click on the "Stop Watchdog" button. Second, click on the "Stop Kiosk App" button. At this point, the kiosk is no longer running the application and will not accept fingerprint data from customers or employees.

The next step is to click on the "Reboot Kiosk" button.

Figure 35:
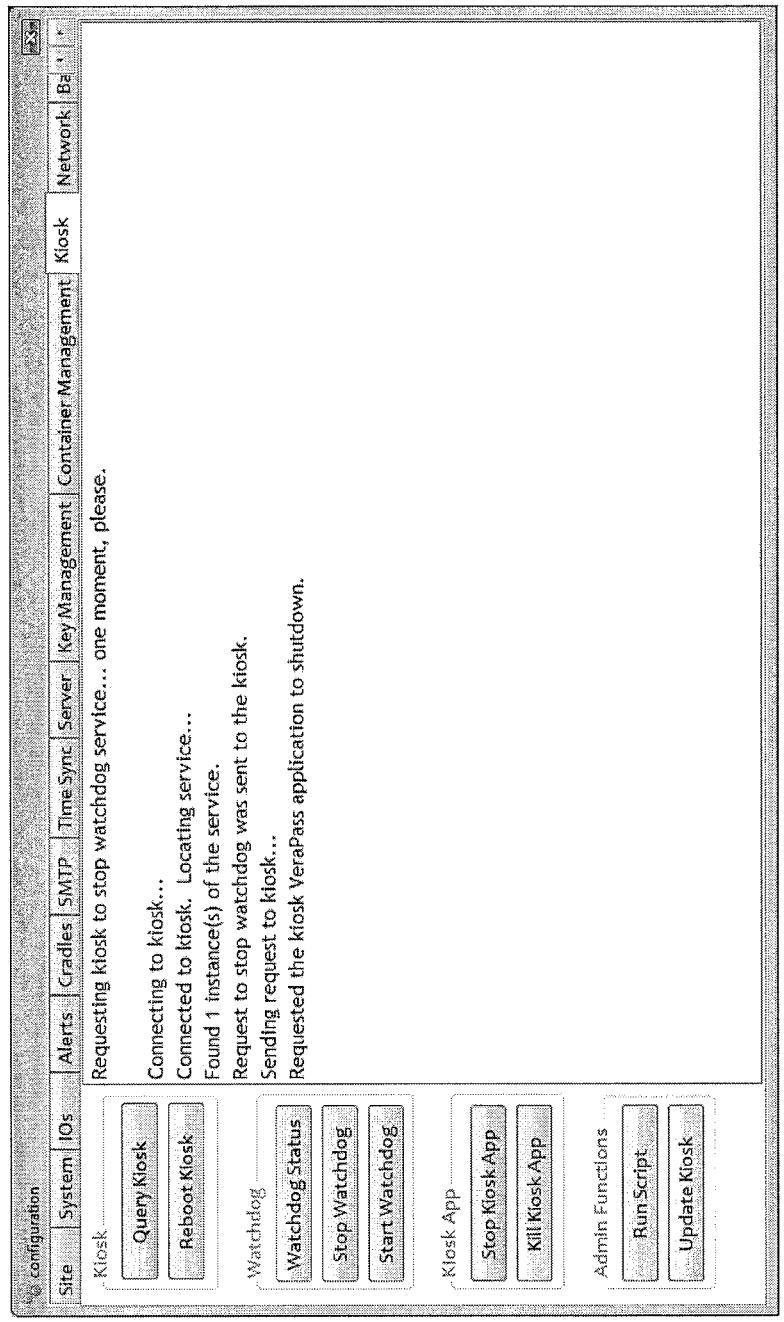

Once the request to restart the kiosk is accepted, the management software will automatically close. The kiosk automatically starts the VeraPass application upon a successful reboot. See SCREEN SHOT Z, FIG. 35.

EXAMPLE 19

Figure 36:
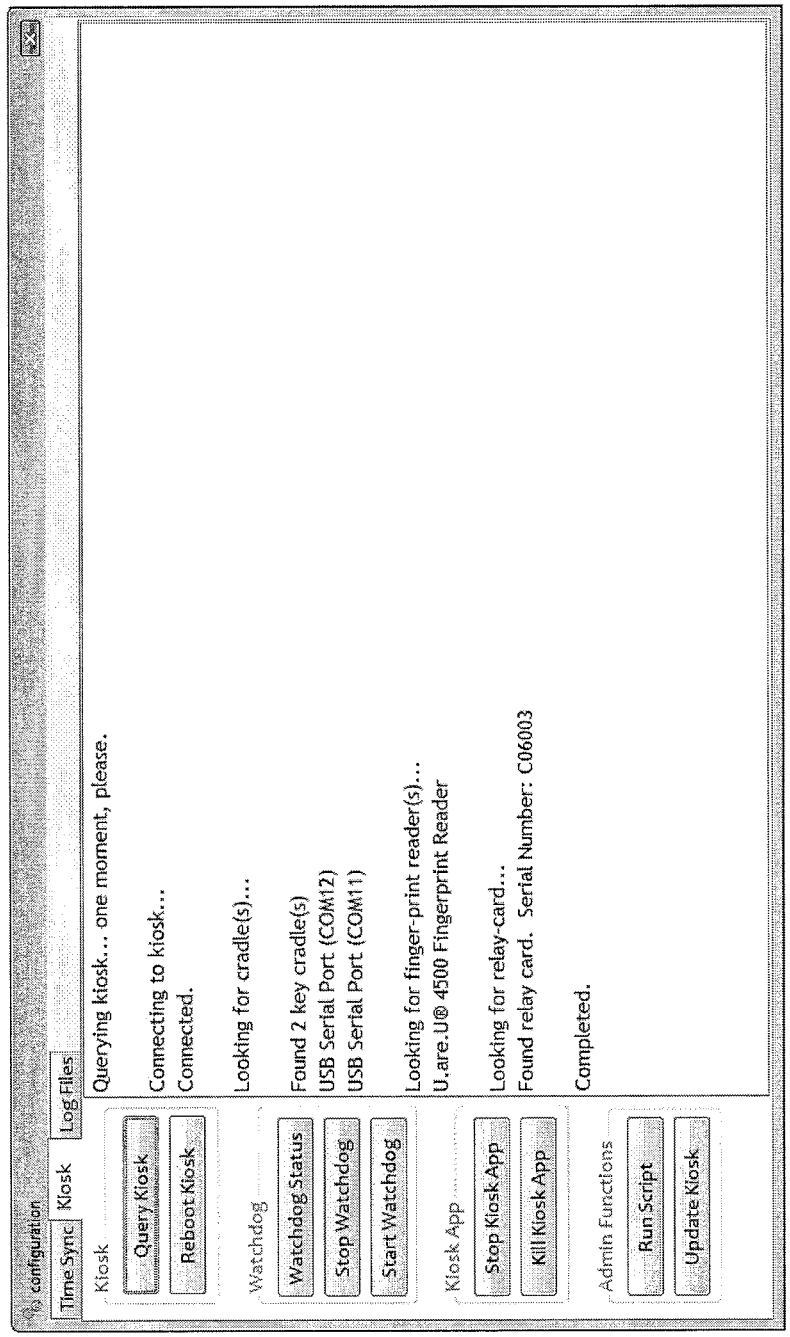

Configuration Area
General Kiosk Commands
Various troubleshooting items are available within the Kiosk tab. See SCREEN SHOT AA, FIG. 36.
Query Kiosk
The kiosk searches for installed components
Relay card
Serial Ports
Fingerprint Reader
Relay Card
Provides feedback for devices found
Watchdog Status
Provides feedback as to whether or not the watchdog service is running
Stop/Start Watchdog
Stops or starts the watchdog service
Kill Kiosk App
Only use this command if the "Stop Kiosk App" fails to stop the application.
Run Script, Update Kiosk, Reboot Kiosk
Please refer to the appropriate section outlining the use of each command

EXAMPLE 20

Configuration Area
Kiosk Log Files
For troubleshooting needs, the log files contain diagnostic data and general feedback from the kiosk application. The log files do not contain sensitive data—neither customer data nor encryption data are displayed.

Within the "Configuration" form, clicking on the Log Files tab brings the area into view. Next, click the "Retrieve Available Logs" button to retrieve the log files from the kiosk.

Figure 37:
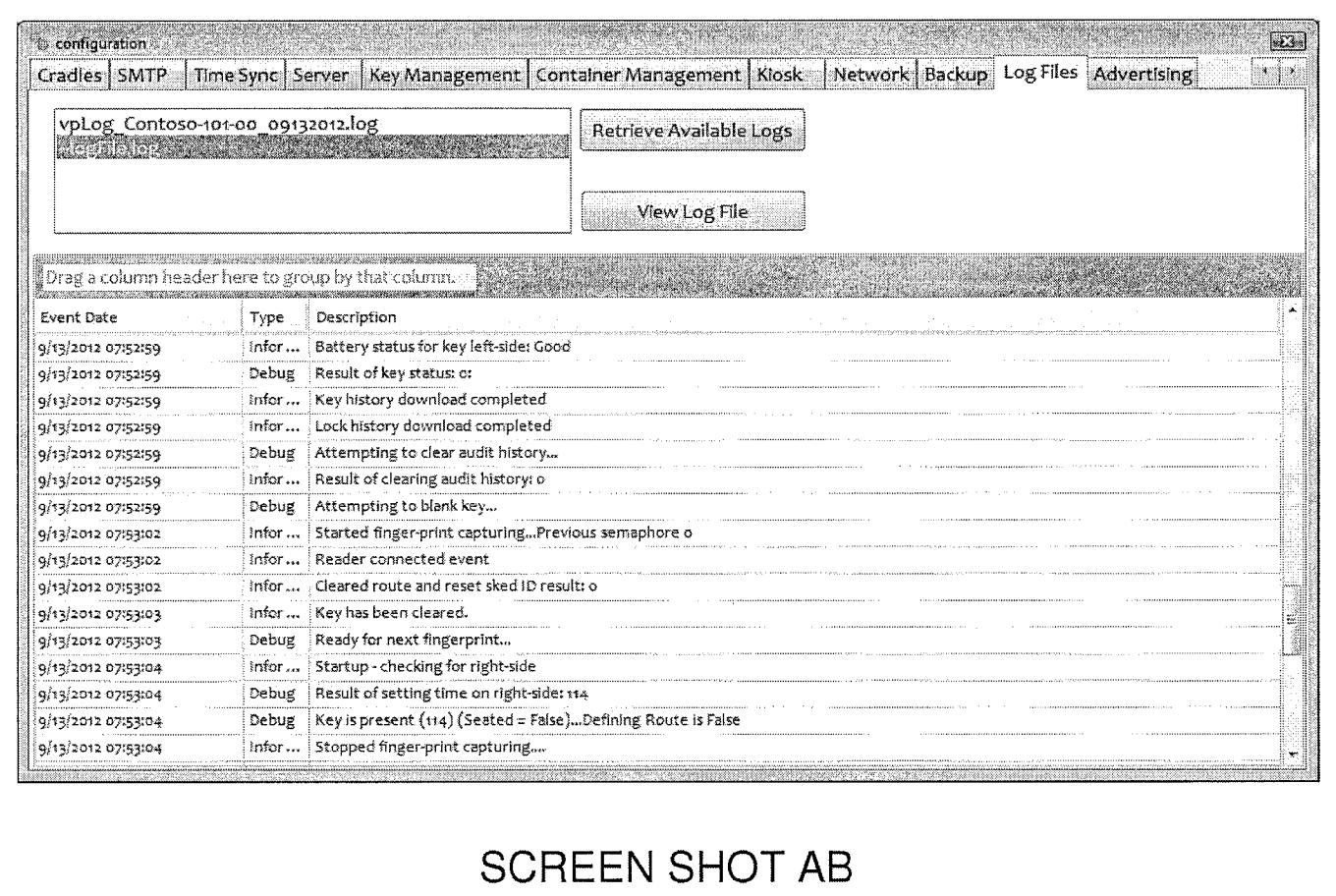

After the log file names are displayed, highlight the appropriate log to view and click the "View Log File" button. The current log file begins with a tilde character "~." See SCREEN SHOT AB, FIG. 37.

EXAMPLE 21

Configuration Area
Kiosk Advertising
The advertising pictures displayed on the kiosk may be updated at any time. From within the "Configuration" form, click on the Advertising tab to display the picture controls.

Click on "Retrieve Images" to download the titles currently on the kiosk. To view the image, highlight the file and click the "Preview Image" button. The preview is located on the right hand side.

To add a picture, click "Upload Image" and select a valid JPEG file from your workstation. At present time, only JPEG photos are supported.

Figure 38:
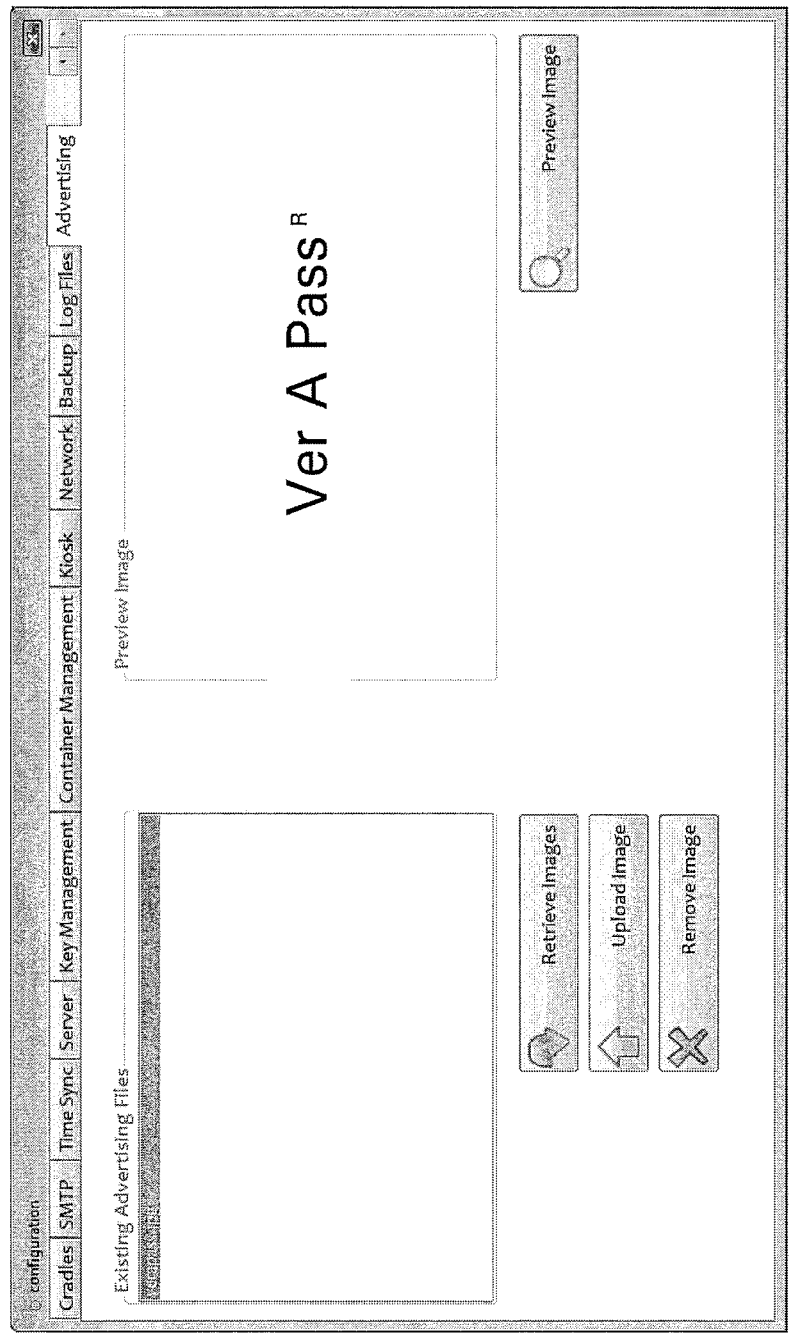

To remove a picture, highlight the name and click the "Remove Image" button. See SCREEN SHOT AC, FIG. 38.

EXAMPLE 22

Figure 39:
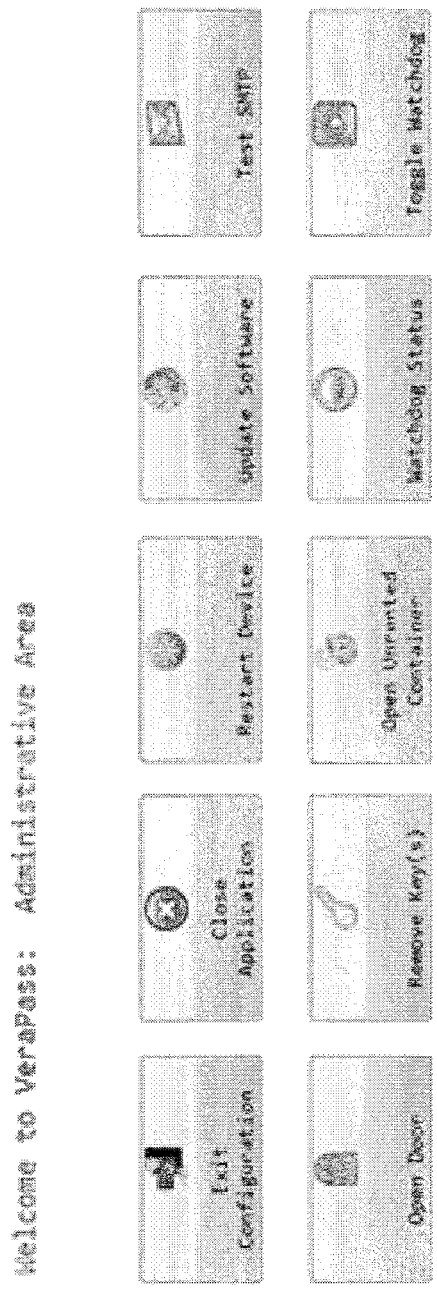

Kiosk Functionality
Administrative Functions
The kiosk's administrative functions are:
Exit Configuration
Places kiosk back into service
Close Application
Closes VeraPass application
Restart Device
Restarts the kiosk
Update Software
Provides ability to update software. Recommended procedure is to follow the "Update Kiosk Software" within the EMS software.
Test SMTP
Sends a test message via SMTP for diagnostic purposes
Open Door
Only available within the SDB mode
Opens the day-gate into the SDB area
Remove Key
Unlocks the key retention unit, KRU
Open Unrented Container
Only available within the SDB mode
Watchdog Status
Provides feedback on the status of the watchdog service
Toggle Watchdog
If the watchdog service is stopped, it starts it. If the service is started, a request to stop the service is sent.
See SCREEN SHOT AD, FIG. 39.

EXAMPLE 23

Figure 40:
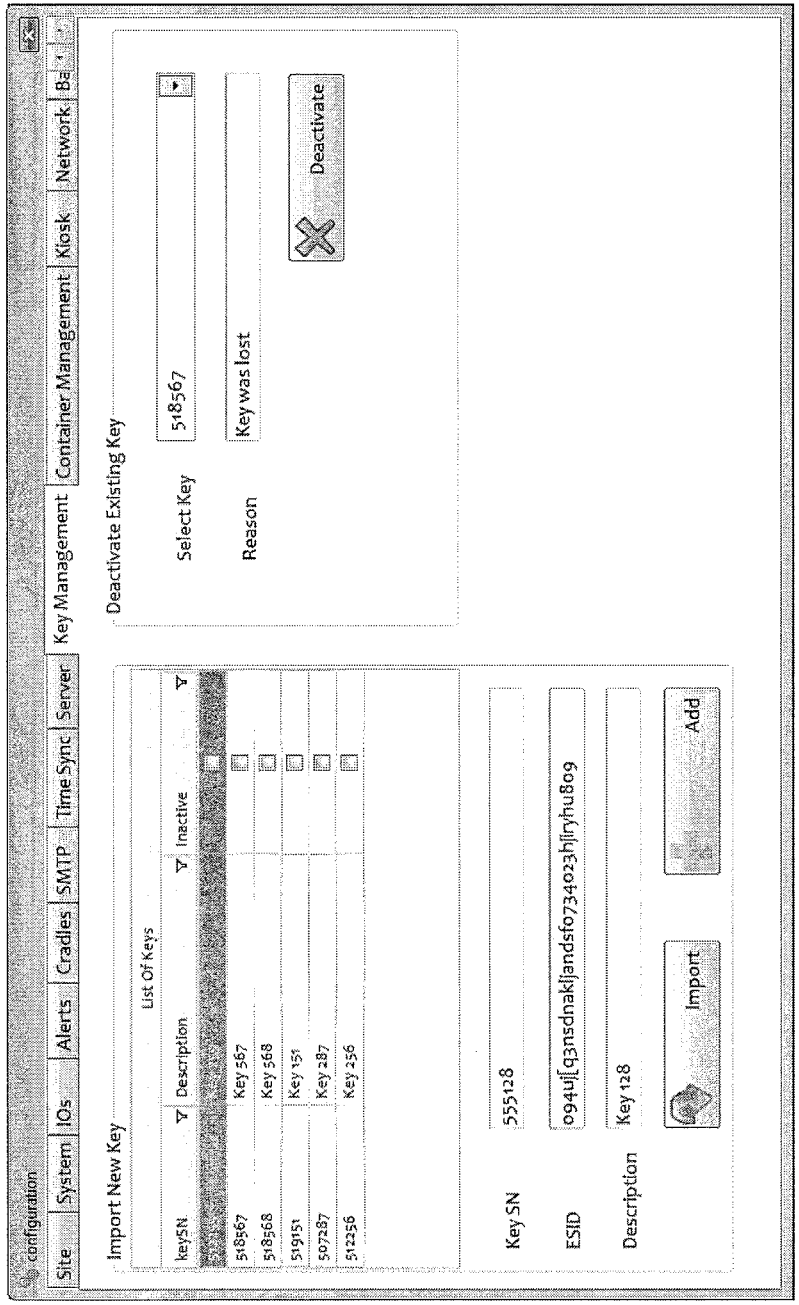

Miscellaneous Items
Key Management
Adding a key to the VeraPass system requires the key and encryption data from the installing supplier.
Only administrators can add and deactivate keys from the system.
Add New Key
Provide Key Serial Number, SN
ESID
Encryption data from supplier
Short Description of key
Click "Add" once the information is provided
If the supplier provides the encryption data within an external file, the file may be imported by selecting the "Import" button.
Deactivating a Key
Select a key from the drop-down list on the left-hand side
Provide a reason for the deactivation
Click on the "Deactivate" button. This process is not reversible. See SCREEN SHOT AE, FIG. 40.

Preferred embodiments of the invention provide a method and apparatus for securing access to a securable item. The secured area may be a container, safe, control, or other item. According to some preferred embodiments, the apparatus and system may include software, such as management software, a Microsoft SQL RDBMS, a display screen (preferably a touch screen with end user interfaces), at least one certified biometric reader, high security programmable keys insertable into corresponding lock cores, and at least one additional reader for reading a credential, such as for example, an electronically readable card. In one preferred embodiment of the invention, the high security programmable keys and lock cores are Medico NexGen XT cylinders, cores and keys. According to these embodiments, the "software" may comprise computer programs that process data from one or more of a biometric reader or input device, such as a biometric fingerprint reader, an electronic reader, an input such as an input of a PIN, and one or more programmable electronic keys, such as electronically programmable keys 18, which operates to achieve the security function of the invention.

Referring to FIGS. 41-44, an alternate embodiment of a terminal 120 manifesting aspects of the invention and used in the course of practice of the invention is shown in a perspective view. The terminal 120, which also may be referred to as a kiosk or data processing machine, is shown configured with a fingerprint reader 134, and an electronic reader 140. The terminal 120 includes a screen 128 and a key retention component, such as, the port 130. Although preferred embodiments of the terminal 120 are not shown with a key retention unit for housing a plurality of keys as part of the device, according to some alternate embodiments a key retention unit for housing keys may be provided (as shown in FIGS. 4 and 6 in regard to the terminal 20). According to preferred embodiments, a key retention unit may be separately provided. In the particular terminal 120 illustrated in FIGS. 41-44, a key retention port 130 is provided as a part of the terminal 120. The key retention port 130 preferably is configured to accept keys, such as electronically programmable keys 18 shown in FIGS. 5 and 8. The terminal 120 also is shown with a plurality of feet 129 provided at the bottom of the unit to facilitate stabilization on a surface.

Figure 41:
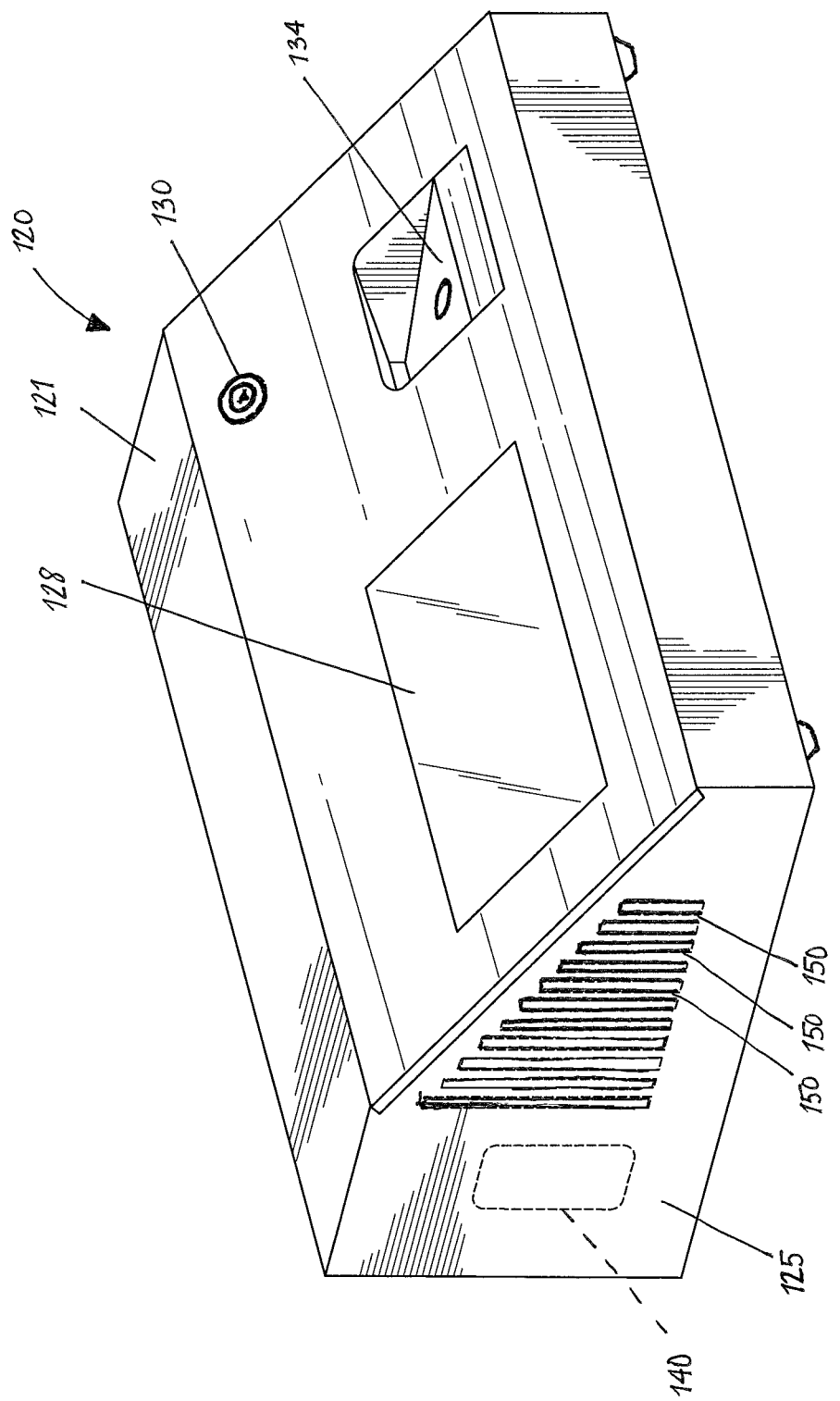
FIG. 41 is a perspective view of an alternate embodiment of a terminal manifesting aspects of the invention and used in the course of practice of the invention, configured with a fingerprint reader portion, a key port, and an electronic reader.
Figure 43:
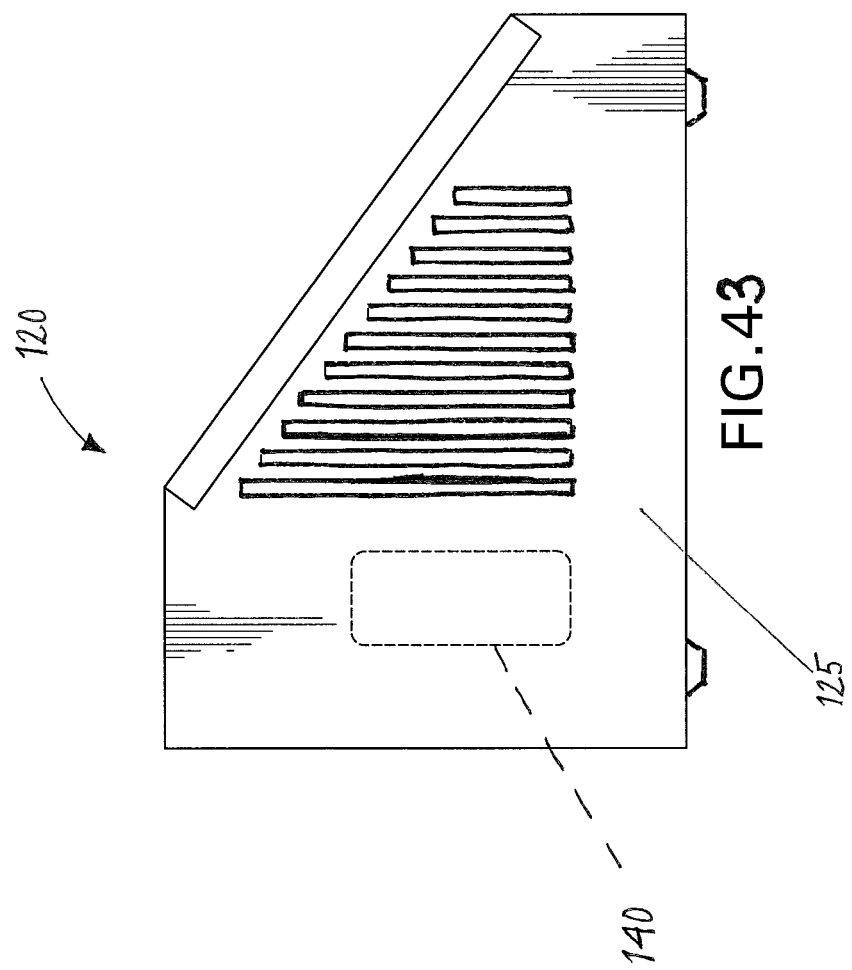
FIG. 43 is a left side elevation view of the terminal of FIG. 41.

Terminal 120 further includes a biometric sensor, preferably a fingerprint sensor, which may be positioned as illustrated at 134 in FIG. 43. Alternatively, the biometric sensor, such as the fingerprint sensor 134, may be configured as a separate unit, removed or removable from the terminal 120, but located in close proximity thereto and electronically connected to the software as is terminal 120 for display of the relevant screens provided by the software on screen 128 of terminal 120. The biometric sensor 134 is illustrated according to one embodiment, configured to sense a fingerprint through a reading window 134a (FIG. 41).

Terminal 120 preferably includes a further authentication mechanism comprising an electronic mechanism 140. The electronic mechanism 140 is configured for reading a credential, such as, for example, an electronically readable identifier or card that can be authenticated. The electronic mechanism 140 preferably comprises an electronic reader.

Figure 45:
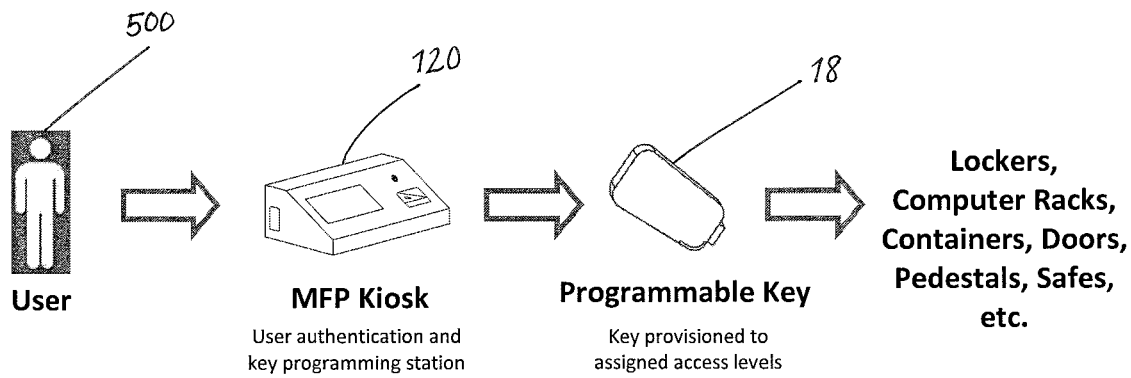
FIG. 45 is a schematic diagram showing sequences for a method of implementing the system and apparatus.
Figure 46:
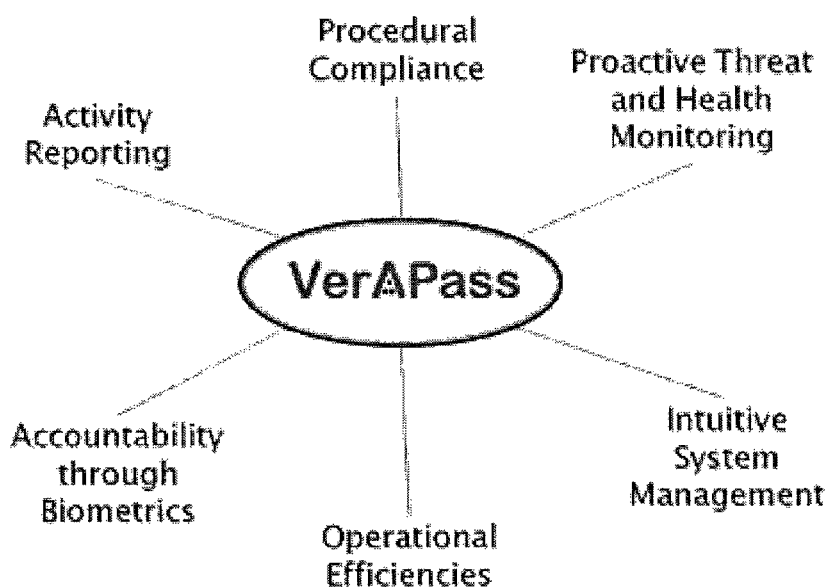
FIG. 46 is a diagram showing examples of monitoring and other operations that may be carried out with the system and apparatus.

Terminal 120 preferably includes a key retention port 130 comprising a receptacle for at least one programmable electronic key 18. A user goes to the terminal 120 and places an electronic key 18 into the port 130. When the user identifies himself or herself by some biometric means at the terminal 120, preferably by supplying a fingerprint read by the fingerprint reader part 134 of terminal 120, the electronic key 18 placed within the port 130 is programmed to have the user access permissions thereon and is released. The user is permitted to use the key 18 to open a lock that is secured with the user's electronic key 18. According to a preferred embodiment, a schematic illustration of a system for managing access to a secured structure is illustrated in FIG. 45. A user 500 is represented and accesses the terminal 120, which, in this illustration, is referred to as a kiosk (designated as an "MFP™ kiosk"). The terminal 120 is shown as the hardware that carries out the user authentication key programming. Once the user is verified with the biometric identification, and possibly one or more additional factors, such as a PIN and/or credential, the key 18' is programmed at the terminal 120, and, upon completion of the programming, is released from the terminal 120 to the user 500. The key 18' is provisioned to access the designated levels of access of that user. In this example, the user 500 may use the provisioned key 18' to access structures which may include lockers, computer racks, containers, doors, pedestals, safes, and other items and objects.

Figure 42:
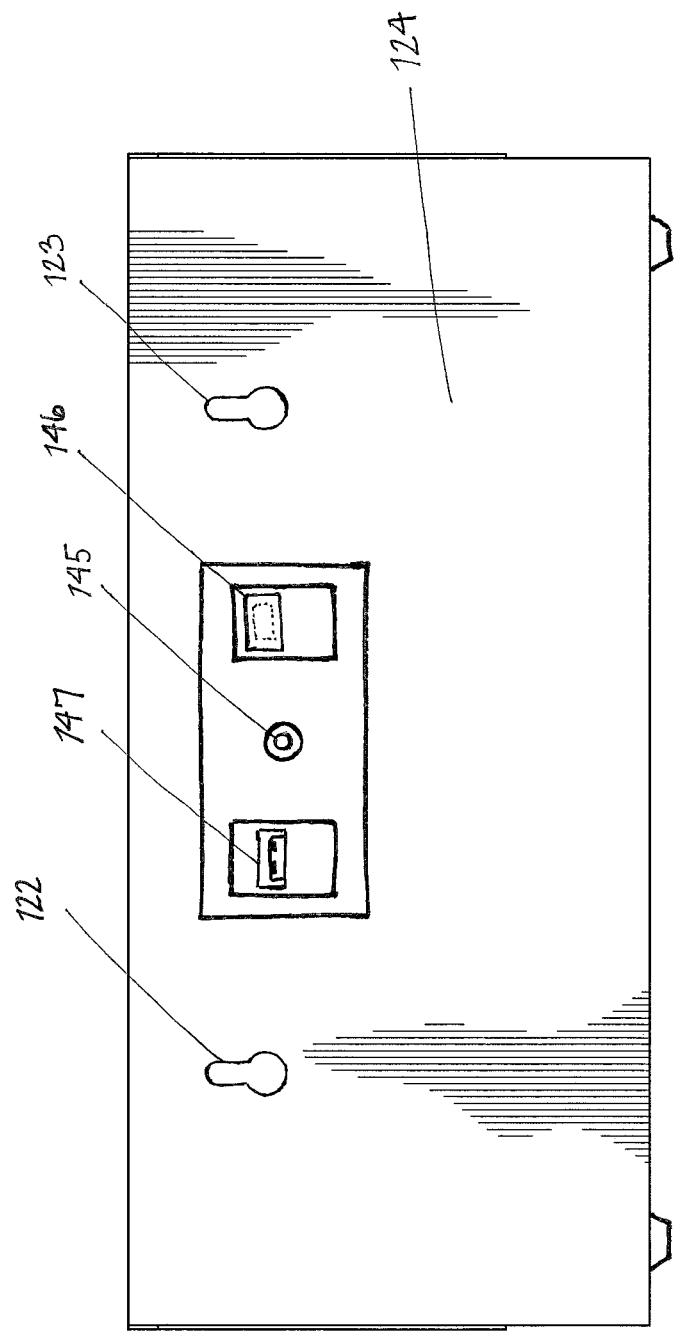
FIG. 42 is a rear elevation view of the terminal of FIG. 41.

Referring again to FIGS. 41-44, the terminal 120 is shown having a housing 121 for housing the components. The housing 121 may be made of any suitable material, including plastic, metal, or combinations thereof. According to a preferred embodiment, the terminal housing 121 may be constructed of precision-formed, powder-coated metal. The terminal 120 is configured with an anti-tampering mechanism, which, according to a preferred embodiment, comprises an internal tamper switch. The terminal 120 preferably is assembled with safety screws, and may be securely mounted on walls or desks for security purposes. As illustrated in FIG. 42, the terminal has mounting means comprising a pair of mounting holes 122,123 provided on the back panel 124 of the terminal 120.

The terminal 120 illustrated in FIGS. 41-44, is configured to support tri-factor authentication, consisting of biometric, PIN and/or credential enrolment and usage. The PIN, often referred to as a personal identification number, may be any suitable string of numbers, letters or characters, and may comprise a passcode or other reference. The terminal 120 is shown having a touch screen 128, which preferably is a high-resolution, color touchscreen. The terminal 120 is configured with software containing instructions to generate easy-to-use instructions and guidance displayed on the screen 128 for users, administrators and others using the system.

Figure 44:
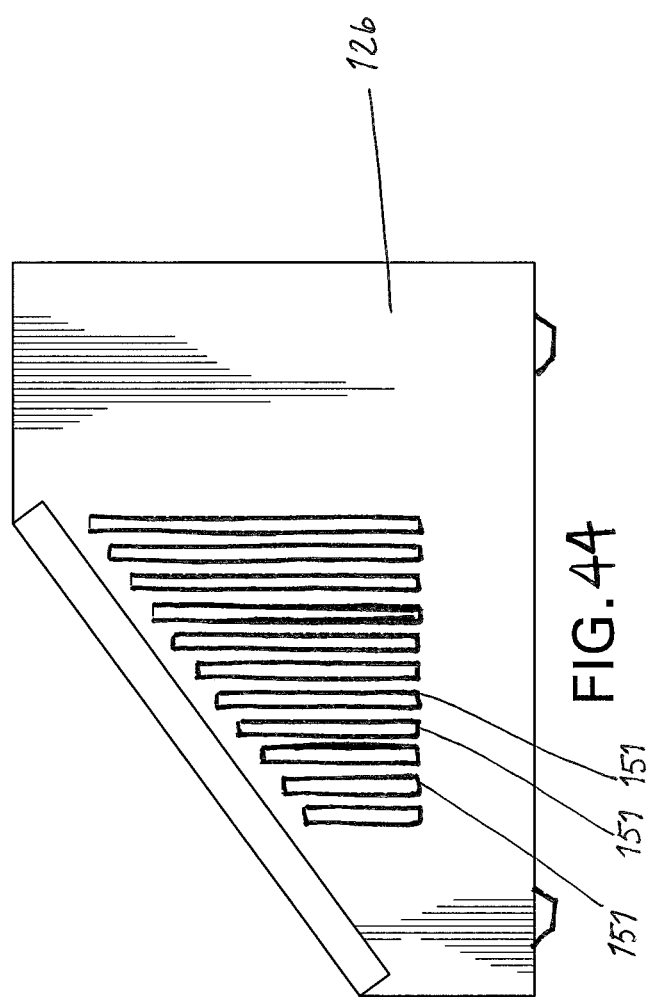
FIG. 44 is a right side elevation view of the terminal of FIG. 41.

As shown in FIGS. 41, 43, and 44, louvers 150,151 are cut into the side walls 125,126, respectively, to allow for sufficient passive air flow inside the terminal housing 121. According to one exemplary embodiment, the boot/storage device for the terminal 120 may utilize mSATA technology. A hardware processing unit, such as an internal processor housed within the housing 121, may utilize a quad core, e.g., running at 2.0 GHz or greater with fanless cooling. According to an exemplary embodiment, internal memory is provided, which, for example, may be 8 GB. An operating system is provided to manage the operations of the terminal 120. According to an exemplary embodiment, an operating system may be Microsoft's Windows 7 Embedded Standard (SP1 or greater) capable of operating in either 32-bit or 64-bit configurations. The terminal 120 preferably has one or more external connections, which, for example, are illustrated comprising a power cable port 145, a network jack 146 and an optional USB port 147. In the preferred embodiment illustrated, Wi-Fi, Bluetooth, NFC or other wireless connections are not supported for security purposes. However, according to some alternate embodiments, wireless communication hardware may be included as part of the terminal 120. In addition, the terminal 120 may be configured with other components, such as, for example, microprocessors, controllers, microcontrollers, and memory, including random access memory. A power supply may be provided to connect with the terminal power cable port 145. The power supply may provide a suitable voltage, current or source of power to operate the terminal 120 and its components.

A programmable key 18 is docked into the terminal 120 and locked in place at the key retention port 130 by the software instructing the key retention mechanism to actuate and retain the key 18 on the port 130, preferably, until programming has completed, thus ensuring proper operation of the programmable key. Alternatively, the software may be configured with other instructions for release of a key or to prevent locking of a key, such as, for example, where the key placed on the port 130 is low on charge (or fails to meet a charge threshold), or other condition. According to one preferred embodiment, the method of authentication may be carried out by having users authenticate themselves on the terminal 120 through one or more validation means and then, by means of the touchscreen interface, select which areas they require access to. According to preferred embodiments, the terminal is configured to display only authorized areas for that user. Once the user has passed the validation requirements, and has been validated through the validation means (e.g., biometric identification, credential recognition and/or PIN), the authorization data is downloaded to the programmable key 18, and then the key 18 is unlocked, allowing the user to remove the key from the key port 130 of the terminal 120.

According to one exemplary embodiment, the system may be configured so that after a certain (administrator configurable) amount of time has expired, the programmable key 18 is rendered inoperable and must be returned to the terminal 120 in order to receive new programming. According to one preferred system configuration, if a key 18 is returned to the terminal 120 before the authorized time has expired, the key 18 will then be rendered inoperable upon docking with the terminal 120. In this manner, any compatible programmable key 18 may be used with the terminal 120. The system, method, and devices, such as the terminal 120, implement provisioning of a key based on the profile of each individual user (who is validated) and not a specific key.

According to preferred embodiments, the system, method and device, such as the terminal 120 shown and described herein permits user administration to be configurable via independent client software that may be installed on a modern Windows PC. The PC preferably has network connectivity to a centralized repository or directly to the terminal 120 being configured. The system preferably provides for configuration of users through an interface. Preferably, the user interface provides graphical screen images that include depictions and text, on the terminal display 128 with instructions for entering information, and/or making selections. The interface is clear and intuitive, and preferably comprises a modern graphical interface. The interface may be customized for each administration/user requirement, and is powerful enough for granular specificity of each user's areas of control and access. The system may be configured through the implementation of client software that resides on a PC (or other computing component), that may be linked for communication (such as over a network), to address the terminal 120. The terminal 120 includes software which preferably may be configured with menus and graphical displays, so that information may be generated and displayed on the terminal display 128, and so that information input through the display 128 (e.g., touch screen input, or other input), the biometric reader 134, the electronic reader 140 and key itself via the key port 130, may be read, stored, processed, reported and/or communicated to the remotely situated PC or other computing component.

The terminal 120 may be configured with software, firmware or the like, which implements security policies. Security of the firmware and software preferably is implemented by configuring the security policies on the terminal 120. Examples of preferred security policies that may be utilized within the terminal 120 include the following: when first installed, configuration tools are not allowed to add "Optional Packages"; MSMQ is utilized for queuing events when network connectivity is unavailable; SQL Browser service is disabled; end users are encouraged to install their own end-point security software; terminals 120 may be joined to domains, if required.

According to preferred embodiments, the terminal 120 is configured to actively monitor the USB bus for changes, and if changes are detected, the terminal 120 may be configured to implement a response, such as, for example, sending an alert, shutting down the system or terminal 120, recording the change, or combinations of these. According to some alternate embodiments, additional security may be implemented by configuring notifications for events relating to a condition of the terminal 120, or a security condition, disabling USB devices, removal of external USB connectors from the terminal 120. The terminal 120 may be configured to provide a response to terminal activity, including activity that may relate to security or other concern. For example, alerts, such as, for example, security alerts, as well as health alerts, errors and unsuccessful events, may be centrally stored for implementation into existing $3^{rd}$ party platforms, and may be communicated from the terminal 120 to a remote component (e.g., a network PC) as they occur. According to preferred embodiments, the terminal 120 is configured with system software that requires the terminal 120 to auto-logon, as there is a user interface. The system, method and device, such as, the terminal 120, is configured to ensure that the system application is running. For example, if the system application operating on the terminal 120 were to crash, a software watchdog configured into the software of the terminal 120, will automatically re-boot the terminal 120 to ensure the desktop appearing on the terminal screen display 128 (e.g., from remaining information at the time of the crash) is not viewable to an end user. According to preferred embodiments, the security is further enhanced by the terminal 120 being configured so that the terminal start menu is disabled when the terminal 120 launches the operating system. In addition, according to preferred embodiments, within the desktop, right-click action is disabled.

According to preferred embodiments, the operating system is configured to disable or remove functions and features that would otherwise permit access and susceptibility to system changes. For example, as a further security measure, during initial configuration of each terminal 120, the following items from the OS, if they are present, preferably are removed, beginning with the "Application Compatibility" template: Browsers (e.g., Internet Explorer), Devices and Printers (e.g., Fax and Scan), Fonts (e.g., Japanese Fonts, Japanese Supplemental Fonts, Korean Fonts, Korean Supplemental Fonts, Middle East, South East and South Asian Fonts, Middle East, South East and South Asian Supplemental Fonts, Simplified Chinese Fonts, Simplified Chinese Supplemental Fonts, Traditional Chinese Fonts, Traditional Chinese Supplemental Fonts), Graphics and Multimedia (e.g., All Premium Codecs (these require special licenses), Media Player), International IME (e.g., IME Japanese Support, IME Korean Support, IME Simplified Chinese Support, IME Traditional Chinese Support), User Interface (e.g., DVD Maker), Help (e.g., Remote Assistance), Microsoft Speech API (e.g., Speech Chinese Simplified, Speech Chinese Traditional, Speech French, Speech German, Speech Japanese, Speech Spanish, Speech UK English, Tablet PC Support, Mobility Center and Slideshow, Photo Viewer).

The system, method and devices, such as, the terminal 120, may collect and store data, and may be configured to communicate and transmit information to a remote location. For example, the system and terminal 120 may be configured to provide or operate in conjunction with a centralized database (repository) for storing data consisting of, but not limited to, users, schedules, privileges, locks, keys, history, audit events and history events. One configuration provides a repository that may be located at the end-user's site, while another configuration provides for a third-party or terminal provider to host the information.

The system is configured to process and manipulate information to generate reports and evaluate the information. For example, reports may be customized within the management system. History events, lock audits, operator activity and other user centric reports may also be generated or made available. For example, reports may be generated and exported to Excel format. Customizable reports may be written directly against the repository for greater integration into existing environments. The system preferably may be updated to receive software upgrades, as required. The system preferably may be configured with active directory integration. For example, the system may be configured to run Active Directory Domain Services (AD DS), and to authenticate and authorize users and computers in a Windows domain type network by assigning and enforcing security policies for the computers and installing or updating software. The terminal 120 and system for authenticating users and regulating access to locks for electronic keys may be coordinates to operate with an Active Directory service. For example, when a user logs into the terminal 120, the terminal 120, where it is configured as part of a Windows domain, may check the submitted password (or other information, e.g., credential biometric identifier) and determine whether the user is a system administrator or other type of user (e.g., standard user). According to one example, third party software, such as SAP®, for example, may be supported for importing users as well as user authentication. Active Directory integration and $3^{rd}$ party fields within Active Directory (SAP, for example) may be supported for importing users as well as user authentication.

The system, method and device, such as the terminal 120, preferably do not require a network connection to operate. According to some embodiments, where the terminal 120 is configured to connect and operate on a network, the following additional features may be implemented, such as, Active Directory Integration (if applicable), Time Sync, Email Alerts, Database Backup, Enterprise System Administration, and Health Monitoring. According to a preferred configuration, examples of ports that may be configured are assigned to include the following:

| Ports | |
|---|---|
| SQL Operations | 1433 |
| System Logs | 137, 138, 139, 445 |
| Database backup | 137, 138, 139, 445 |
| Email Alerts | 25 (default value - user configurable) |
| Remote Refresh | 8000 |
| Windows Update | 8530 - (customizable using GPO) |

Figure 47:
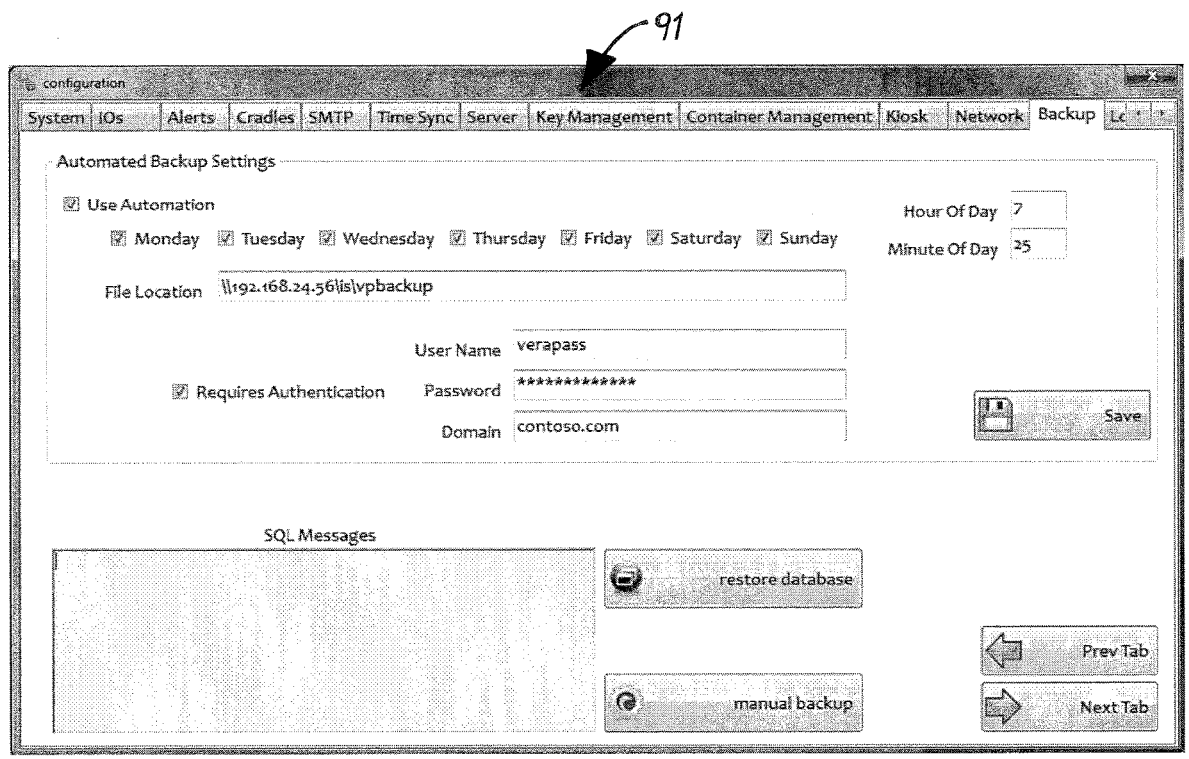
FIG. 47 is an exemplary screen shot illustrating a backup settings management panel.

The system, method and device preferably are configured to generate a backup of the information and terminal settings. For example, backup plans are customizable within the terminal 120. The database may be backed up locally, and the file may also be moved to a file server location. User name, password, domain, backup location, time of backup and days to run are configurable within the management system. A terminal 120 as well as a computing component in communication with a terminal 120 may exchange information, including where the terminal 120 provides backups to the remote computing component (e.g., a remote PC). Referring to FIG. 47, an exemplary screen shot 91 illustrating a backup settings window is shown, indicating the times to back up the files, the file storage location, and the login information. Automated backup settings are shown in FIG. 47.

The screen shot 91 of FIG. 47 may be generated with software provided on a computing component that is linked or associated to communicate with the terminal 120. The tabs appearing on the screen shot 91 shown in FIG. 47 provide preferred options for managing the system. The management of the system preferably includes the abilities to manage users, what users may access, for how long, what factor or factors are required in order to verify a user.

As discussed, the terminal 120 (FIGS. 41-44) is configured to activate, control and download data from electronically programmable keys 18 which are mechanically locked/unlocked to the terminal 120 by a unique key retention mechanism which minimizes or eliminates the possibility of a key being removed from the terminal 120 before programming has completed. The key retention mechanism preferably is provided at the key retention port 130, and secures the key 18 thereto. The programmable keys 18 are then used to activate, control and download data from electronically programmable lock cores, such as, for example, the lock cores 14 shown and described herein.

The preferred programmable electronic key 18 fits into terminal 120 and specifically into the key retention port 130. The key 18 may be charged or receive power whenever it is in place within the terminal 120 key port 130. According to some embodiments, keys 18 may be placed on a key bank, which may be provided separate from the terminal 120, and retains a plurality of keys 18 and charges then simultaneously. A rechargeable battery within the key 18 assures that the key 18 is always fully charged when it is positioned on the key bank. Preferably the terminal 120 may determine that a key 18 does not have a suitable charge and may therefore cease commencement of programming the key 18, in which case, the user may return the key for charging to a charging bank or unit, and may select another key for use. According to some embodiments, the terminal 120 may utilize power to power the key so that the key 18 may be programed for the user. According to some alternate embodiments, the terminal 120 may be configured to determine the suitability of the key charge for intended use or uses. For example, the terminal 120 may be configured to refuse initialization of a key 18 that does not have a suitable charge, or a minimum charge level, or, alternatively, the key 18 may be charged at any charge level.

Authorized users, who may be customers and/or authorized employees of a company or supplier, must present their previously enrolled biometric identifier, typically a fingerprint, in order to activate and use the key 18 provided at the terminal 120. The terminal 120 preferably is configured with an input mechanism for inputting information, including making selections. The input mechanism is shown comprising a screen display 128, which may be a touch screen, or the terminal 120, according to some embodiments, may receive inputs from an input device (e.g., mouse, pointer, stylus). The user may be required to make an input in order to activate the key 18. The terminal 120 preferably includes an electronic reader 140, and accordingly, the terminal 120 may require an input to be received from the electronic reader 140 in order to activate the key 18. According to a preferred embodiment, the factors for key provisioning may require a user biometric identifier at the biometric sensor 134 to make a biometric identification of the user, make an input on the display screen 128, and make an input provided at the electronic reader 140.

Once activated, the key 18 may be removed from the key retention port 130 of the terminal 120 by the user (or by an authorized employee) in order to gain access to the secured containment (such as a container, cabinet, or other secured area or item) to which that user is authorized to have access. Preferably, the key 18 remains programmed for a predetermined amount of time and is rendered inactive after returned to a key retention area, such as the key retention block where keys are housed for charging. Alternatively, the key 18, when expired or inactive, may be returned to the terminal 120 for reprogramming for that user, or for an additional user. According to some embodiments, the key 18 may be deactivated after use for one or more use accessions (e.g., where a key may be used one time to open a first cabinet, and another time for a second cabinet, and thereafter is deactivated).

When the key 18 is rendered inactive, it is rendered inactive for that particular user. For the user to reactivate the key 18, the user must place the key 18 back into the key retention port 130 of the terminal 120 and reenter the factor requirements, including the user's biometric identifier, card and/or screen inputs, for identification of the customer by the software. The software permits access only by a specific user to a secured container or other item based on one or more, and preferably a combination, of that user's biometric identifier, the user's electronic credential, and a screen input. The software does not permit access to a secured item or container by a user using the programmable electronic key 18 based on what the user might have in the user's possession, such as a key fob or card, or what the customer might know, such as a personal identification number code. According to preferred embodiments, the key fob, card, personal identification number or other factor, may be utilized in conjunction with the biometric identifier. As discussed herein in connection with the terminal 20, while fingerprint is the preferred biometric identifier, hand geometry, facial recognition, eye iris characteristics or DNA characteristics may also be used in connection with the terminal 120.

Regarding the terminal 120, the user may conduct enrollment of the user's fingers as discussed herein in connection with the reader 134 of the terminal 120.

According to some preferred embodiments, the user is a company employee who has access to company vehicles. In order to obtain access to the vehicle, the user must obtain the vehicle key (card or other item required to start and operate the assigned vehicle). The vehicle key may be maintained is a secured container or location which is secured with an electronic key 18 and a programmable lock 14, and the user may gain access to vehicle key by first activating an electronic key 18 through the terminal 120 which will open an electronic lock 14 that secures the vehicle key in a location. The user may be identified as a driver, and user permissions for the vehicle key access (through the lock 14), as well as access to other areas and items secured with other electronic locks may be programmed on to that user key 18.

For example, in accordance with the embodiment, the user obtains a key 18 from a key storage location, such as a key bank, and the user therefore, inserts the key 18 into the key retention port 130. The user preferably presents the user's fingerprint to the sensor 134 of terminal 120, and places the electronic key 18 in the key port 130 of the terminal 120, and presents the user credential to the terminal reader 140, enters a personal identification access (PIA) string on the terminal screen 128, or presents the user's fingerprint to the sensor 134 and does both (i.e., presents the user credential to the terminal reader 140, and enters a PIN). Although the PIN is referred to herein, the PIN may be a personal identification access string (PIA-string) that includes numbers, letters and characters, or alternatively, may comprise another input that the user provides. In the embodiment discussed above, where the user is renting a container, the user takes the electronic key 18 and accesses a container using the appropriate electronic key 18. After opening the container and re-docking electronic key 18 at terminal 120, the container is considered to be rented.

Users and customers may edit and save their information, such as when a user's or customer's address changes. The changes may require the fingerprint or other biometric identifier for that user be presented to the terminal 120, as well as an electronic credential that may be read with the reader 140, and a PIN that may be entered.

To decommission a container, as discussed above, a user or customer may be required to present his or her finger for verification of the customer identity, as well as in connection with the electronically readable credential and/or PIN. Suspension of a container may be implemented as described herein. To put the container back into an active state, a user, such as, a supplier representative who is verified by one or more, or a combination of all factors, including as a fingerprint identity verified representative, who is in possession of a credential that may be read by the reader 140, and who enters an appropriate input on the verification screen of the display 128. In addition, co-ownership of c container and container access may be carried out by adding a co-owner, as discussed herein, wherein a user is verified, and factor verification (e.g., of one or more of fingerprint identification verification, credential verification, and input verification) is performed again, as set forth above.

The terminal 120 preferably includes software that is configured to access and obtain inputs from a credential provided to the employee or user that the user presents to the reader 140 of the terminal 120. For example, an electronically readable card, such as a key fob, magnetically readable card, RF readable card, or other detectible item, may be provided to a user, and may be required to be presented to the terminal 120 in conjunction with the user biometric information in order to verify a user. In addition, preferably, the software also is configured to access and obtain inputs from a personal identification access string, such as a PIN (or PIA), and the user may be required to input a suitable input, such as, for example, a PIN (or PIA). As used herein, the PIN may be a string of inputs, such as characters. For example, although referred to as a PIN, it is understood that the PIN may be characters or strings that contain components other than numbers. In those implementations, the display screen may be provided to generate a keyboard or indicia for selecting the characters to be input.

According to a preferred embodiment, the system is configured to identify a user by a fingerprint identification at the terminal 120, as discussed herein. According to preferred embodiments, the terminal 120 includes an electronic reader 140 that is configured to read a credential. The credential preferably may be associated with a user, and therefore, user biometric data information. A PIN or access identification input (PIA) also may be required in order to obtain verification. For example, in the event that a user would provide the user identification credential to another, and provide the user's access code or PIN (or PIA), (which, for example, a user may do intentionally or unintentionally where it is stolen from the user), that other who is in possession of the user credential and user access PIN (PIA), would not be able to gain access. The unauthorized individual however, although possessing the credential and access PIN, does not have the user biometric information and therefore is denied access.

In addition, the credential may provide further information about the user, and the system may store and retain the history of the terminal usage, including attempted access, attempts to provision a key for a lock not authorized, inputs that identify a user PIN or user credential at a terminal.

Embodiments of the system, method and device are configured to provision different keys for different users, where the different users have different levels of authority (e.g., authorization access), along with the capability to require multiple credentials for assigning electromechanical lock cores based in the individual user's unique profile. The terminal 120 may be configured to implement the provisioning of keys for the unique individual user profile, as well as triggering actuations and events based on the usage of the terminal 120, keys 18 and lock cores 14. For example, according to some embodiments, the terminal 120 may be provided with a traditional relay card so that dry contact open/close relay outputs may be programmed within associated software, such as, for example, management software, to trigger based on an event at the terminal 120. According to one exemplary embodiment, for example, the terminal 120 may be programmed to open or close a specific relay each time a key 18 is programmed that will trip a camera system to implement an action, such as, to tag recorded video or to trigger an access control system to open a particular door or tie into any third party system that can operate a dry contact.

According to some embodiments, the terminal 120 may be configured with software to implement pro-active exception reporting. Each terminal 120 may be provided with software that contains instructions to record and store event histories. The histories preferably may be stored on the terminal 120 (e.g., on a storage element, such as, for example, a hard drive or flash drive). Event histories also may be stored at a remote location, such as, for example, a corporate repository. The system may be configured to utilize terminals 120 which are configured to communicate information (including histories) to a remote computing component (such as a remotely situated server). The terminal data, such as, event history, is readily available and may be mined from the terminal 120 on an as needed basis. According to another configuration, the system may be configured to have the terminal 120 push all data, or certain of the pre-defined data elements, to a remote component, such as, for example, the corporate server computer. The system may provide user configurable selection options for determining which information is desired to be communicated from the terminal 120, including the frequency of the information, real-time (e.g., as the data is obtained), delayed (e.g., once a day, or once an hour), or event-driven (e.g., where a user response or past or present action triggers an alert). For example, user-configurable exception reports may be communicated, for example, by being pushed to an email distribution list on a near real-time basis (for example, when a key is returned to the terminal 120 and/or at a specific time of day). Some examples of exception reports may include keys not returned to the terminal 120, cabinets not locked (proper electronic lock cylinder required), key spent too long of time at a container or not at a container long enough, locks not touched (no key presented into lock), attempted opening of containers not assigned to the key (or user), as well as other actions of interest that may be coordinated in connection with a key and lock access information.

The system, method and device may be configured to implement surveys. According to some embodiments, the surveys may be customizable and pushed down to specific user groups or to an entire user group, and may be updated and changed within the management software by people with the authority to do so. The survey results may be compared with requirements of the survey presenter (who may be the owner of the terminal system, an organization or company, employer or other relation to the surveyed user) in order to determine whether the survey results fall within a particular parameter of the survey presenter. Some examples of activity that the system may implement in conjunction with survey results may include, simply recording the answers (the data) for later mining (use) and program the key as usual; not program a key and return the user to the start of the process (e.g., via a the terminal menu screen) and let the user know that the user's answers fell outside of the required answers; program a key but send an alert out, for example, to the user's supervisor or to a distribution list if the answer is a particular response or falls outside of the parameters; or program the key as normal because all answers fall within the requirements. Other examples of actions that may be implemented include if the survey is ignored for one or other predetermined amount of time the system may be instructed not to program a key for that user because the user did not answer, and the system may further be configured to send an alert. Another action in response to user survey inputs may be for the terminal to continue as usual with or without the survey being completed.

The terminal 120 may be provided with software configured with instructions to generate inquiries or survey questions to a user. The software may be manipulated through the terminal 120 or through the use of a remotely situated computing component, such as a server, that communicates with the terminal 120 to manage the terminal 120. The management of the terminal 120 may involve arranging the information to be displayed and collected, as well as retrieving information from the terminal 120. The terminal 120 may be provided with user permissions and associations for access to one or more locations, containers, locks or other items. The user permissions may be provided directly on the terminal 120 or according to some other embodiments, may be communicated to the terminal 120 from another computing component (e.g., such as a remote server). The terminal 120 preferably is configured to identify a user through the factor identification (e.g., biometric identification, credential and/or PIN), and, when the terminal 120 has identified a user, the user association data may be used to implement further steps to permit the user to have access to program a key, to deny programming of a key, or to limit programming of a key. According to some preferred embodiments, upon identification of a user, the user association information is implemented to generate options for that user. In some embodiments, the options include a survey which may require the user to perform a task (which may be monitored), require the user to respond to one or more inquiries, or require some other input or operation from the user. For example, an identified user may be assigned a user group or designation, such as a driver group, and the terminal 120 may be configured to query the driver group users (upon identification) as to a condition of a vehicle (e.g., whether it has a full tank of gas, is clean, or is loaded with inventory). The terminal 120 also may be configured to identify user data, and, upon identification of a user, may check for outstanding conditions for that user. The terminal 120 may identify a license expiration, and require the condition be remediated before the identified user is provided with access to a programmed key. The terminal 120 may generate an input screen that is linked to the user license data, and may provide the user with the ability to enter into the screen, updated license information. This may be done as a condition to provide the user with a programmed key, or may be done as a condition to provide the user key with certain access levels (e.g., such as access to the vehicle key or key locker).

The system, method and device may be utilized in connection with a variety of organizations and users. For example, the system, method and device may be configured for use with traditional retail type customers, including, anchor stores, large/small chain stores, boutiques, convenient, fast food type stores and the like. The system, method and device may be utilized for pharmacy or retail drug stores including pharmacy chain stores. Organizations that utilize the electronic keys and lock system may include logistics firms and industrial type companies. Governmental organizations also may utilize the system, method and device to provide secure access for different users having different access permissions. The organizations may implement the system where access to a container or other item is regulated and where information in regard to the access events, or as a prerequisite to access permissions (or denials), is obtained. The information may be coupled with usage data, such as, for example, where the key usage, such as, key and lock accessions, time of accession, durations, and the like, may be utilized and coordinated to make determinations for associated alerts or other actuations, including regulations of the key and/or lock permissions and attributes (or further regulations of a key already programmed for access).

According to some embodiments, the terminal 120 may be managed by the terminal owner or operating organization to present a survey to a user who is presenting a key to the terminal for lock access programming. According to some embodiments, the terminal may be programmed with an option to go to or not go to a survey, as the terminal owner or operating organization desires. Preferred embodiments provide a survey that may include queries that include multiple choice responses as well as yes/no questions. The terminal preferably may be configured to provide the survey queries, as the terminal owner or operating organization desires. A terminal interface is provided for providing programming, including queries that are stored and displayed when a user accesses the terminal to program or actuate a key. The survey mechanism of the terminal preferably includes software with instructions for providing the survey queries, and for coupling the responses with an action. The survey data may be mined for actual installs of the system, a lock cylinder or key actuation. For example, responses to a survey may be ascertained and evaluated by comparison to a threshold or predetermined response value, and the value may be used to actuate a trigger or other action. The action may include regulating a key access (e.g., to one or more lock cylinders), or regulating a portion or other limitation or condition of that access.

EXAMPLE 24

One example of a survey involves a company querying an employee who is programming a key.

One exemplary survey is set forth below:

Question 1: Did you complete the pre-opening routine as detailed in Company Handbook? (see FIG. 54)

Yes or no (yes continues to next question, no does not program key—tells them why and returns to main menu)

Question 2: The store is clean, neat, orderly and ready to open

Strongly agree
Agree
Disagree
Strongly disagree
(See FIG. 55)
Question 3: Do you have a valid driver's license?
Yes or no (same as above yes or no)
(See FIG. 56)

EXAMPLE 25

Retailers

In retail applications, the terminal, such as, for example, the terminals 20,120 shown and described herein, may be placed in a suitable location where personnel may access keys and program the keys using the user's biometric identifier and one or more other credentials (e.g., a PIN or electronic card). The retail establishment may utilize electronic lock cores to secure access to locations, items, hardware, storage and inventory locations. For example, the electronic lock cylinders may be used in conjunction with one or more electronic keys to regulate access to office doors, display cases, storage lockers/cabinets, IT closets/rooms/racks, filing cabinets, loading docks, personnel lockers, cash rooms, and other locations and structures.

EXAMPLE 26

The system is implemented in a jewelry store. The electronic locks may be installed to control access to jewelry cases. One or more terminals may be located within the jewelry store. The users may have shifts where the user is present at designated time intervals. For example, a user employee's shift times may be coordinated with the user access to the jewelry cases. For example, where the user has activated a key, the key may access the jewelry case for the duration of the user's shift. In addition, the key may be programmed, when actuated, to expire at the conclusion of the shift, thereby preventing access to the jewelry case after the shift time. Alternatively, according to some other embodiments, the user key, may be deactivated for a jewelry case at the termination of the user's shift, but may remain active for one or more other uses, e.g., operation of security system or closure, such as an alarm or roll-up doors. The system may be used to track accesses by individuals having access to the jewelry cases, and other uses where the key provides access through an electronic lock for that user. The terminals may be configured to obtain data and conduct product acceptance analytics. The key programming may be coordinated with access operations such as safes, roll-up doors, or bars, door locking or alarm systems. The terminal may be provided on site, at each jewelry store location for programming keys that different employees use. The users of the keys also may be provided with an electronic credential which the user presents to the terminal (reader) for verification. The biometric identification of a user may be one factor for verification, while an electronic credential may be another. A further PIN or code may be required by the user. The terminal may be configured to require an input from the user (e.g., on the touch screen), and the receipt of the proper input provides a further verification. According to preferred embodiments the personnel may be required to provide a biometric identification and one or more or both, an electronic credential or PIN (access code). The user key may be programmed to open or operate those electronic cylinders to which the user is authorized to access. In the example where use of a terminal is in the jewelry store, monitoring inputs may be done by uploading the access information stored in the terminal at the physical terminal, or may be done through a communication link from the terminal to a remote computing component. The terminal also may be provided to upload information at a specific time. According to preferred embodiments, the key may retain the information, even when it is no longer active for a particular user. In this manner, the key, when placed in the terminal (even by another user who has selected that key from the key holding location, e.g., a key bank, charger, etc.), is read by the terminal, so that the information from the prior user (including, cylinders/locks accessed, or that were attempted to access, dates and times of access, as well as, operations of doors and safes (i.e., opening, closing), may be retained. In instances where the jewelry store is a single chain store, a plurality of terminals (at least one at each store) may be provided and the terminals may communicate information to a central repository (which may be done through a communication linkage, or by uploading the terminal information).

EXAMPLE 27

Convenience Stores

The system may be implemented in a convenience store operation, where the key may be programmed to regulate user access to applications such as, for example, cash lockers, cigarette stamps, checkout counters, fuel islands, industrial process equipment, electrical/mechanical boxes, man doors, IT racks, etc.

EXAMPLE 28

Pharmacies

The system may be implemented in a pharmacy, where the key may be programmed to regulate user access to areas such as, for example, storage lockers, man doors, checkout counters, IT closets and racks, etc. The eCylinder or electronic lock may be provided where a user key action is required to unlock or otherwise conduct an operation (actuating an alarm, operating a switch for a door closure, and the like).

EXAMPLE 29

The system, method and device may be used to provide regulation of perimeter doors of a building, such as a warehouse, store, restaurant, gas station, or other establishment. For example, some users may have access to a cash register by the programming of the user key upon verification of the user's biometric information, and PIN or electronic credential (or all three) at the time the user is verified at the terminal. Another user may be verified, but the verification may only provide that user with access to a storage closet for supplies, and not the cash register.

EXAMPLE 30

In this example, a terminal is provided and a user desires to verify the user in order to have access to locations and items that the user, who is an employee, requires for performing the user's duties. In this situation, the terminal is programmed with software containing instructions to present a survey to the user. The survey preferably appears on the terminal display. In this example, the survey is on the display touch screen. Survey questions may be tailored by the terminal owner or operating company. In this case a survey is presented on the screen of the terminal for the user to respond to the following queries.

1. Have you completed safety checklist per regulation 16-325?
2. Do you have your safety glasses?
3. Are your tools calibrated per regulation 18-456?

In these queries, the user has two selection options for each question, "yes" or "no". The system is configured so that if the safety checklist is not completed, per regulation 16-325, then the user key will not be programmed. The terminal records the responses and compares them to the passing responses. In this example, the passing responses are affirmative responses (i.e., "yes") to each response. With the responses in place, the terminal owner or company may be assured that the user has provided the proper procedure accountability for the safety and tool calibration procedures.

EXAMPLE 31

This example is similar to Example 30 immediately above, however, the survey provides queries for the user to respond with inputs from a selection menu. The menu provides the user with the opportunity to respond to specific questions about equipment, a condition of a vehicle, or other item of the safety checklist. According to another example, the user tools calibration menu may identify one or more specific tools that the user identifies as having been calibrated.

Further examples are illustrated in connection with screen shots appearing on a screen of a computing component display (e.g., in the case of the management screen shot 91 of FIG. 47) and/or a terminal screen display 128. Referring to the screen shots depicted in FIG. 47, and in FIGS. 48-50, the management system is shown by representing exemplary configurations of screen displays. FIG. 47 illustrates a menu of a screen shot 91 that may regulate the system and provide operation options for the terminal, such as the terminals 20, 120, and which may be implemented on a computing component, such as, for example, a remotely linked computer that may be configured to provide information that the terminal 20,120 may download or access through a communications link, to regulate user permissions and accesses to electronic cylinders, when programming keys that are presented to the terminal 20,120 for provisioning. The screen shots illustrated in FIGS. 47-50 illustrate a number of examples of implementations of the system. According to a preferred embodiment, a computer is utilized to generate menus that appear on the screen display using software that includes instructions for presenting the menus to a user. As discussed herein, the screen shot 91 may be used to configure the options for user interaction and requirements at a terminal 120, which may include authentication evaluation, information intake from the user (e.g., surveys), and configuring the permissions and requirements for user access.

Figure 48:
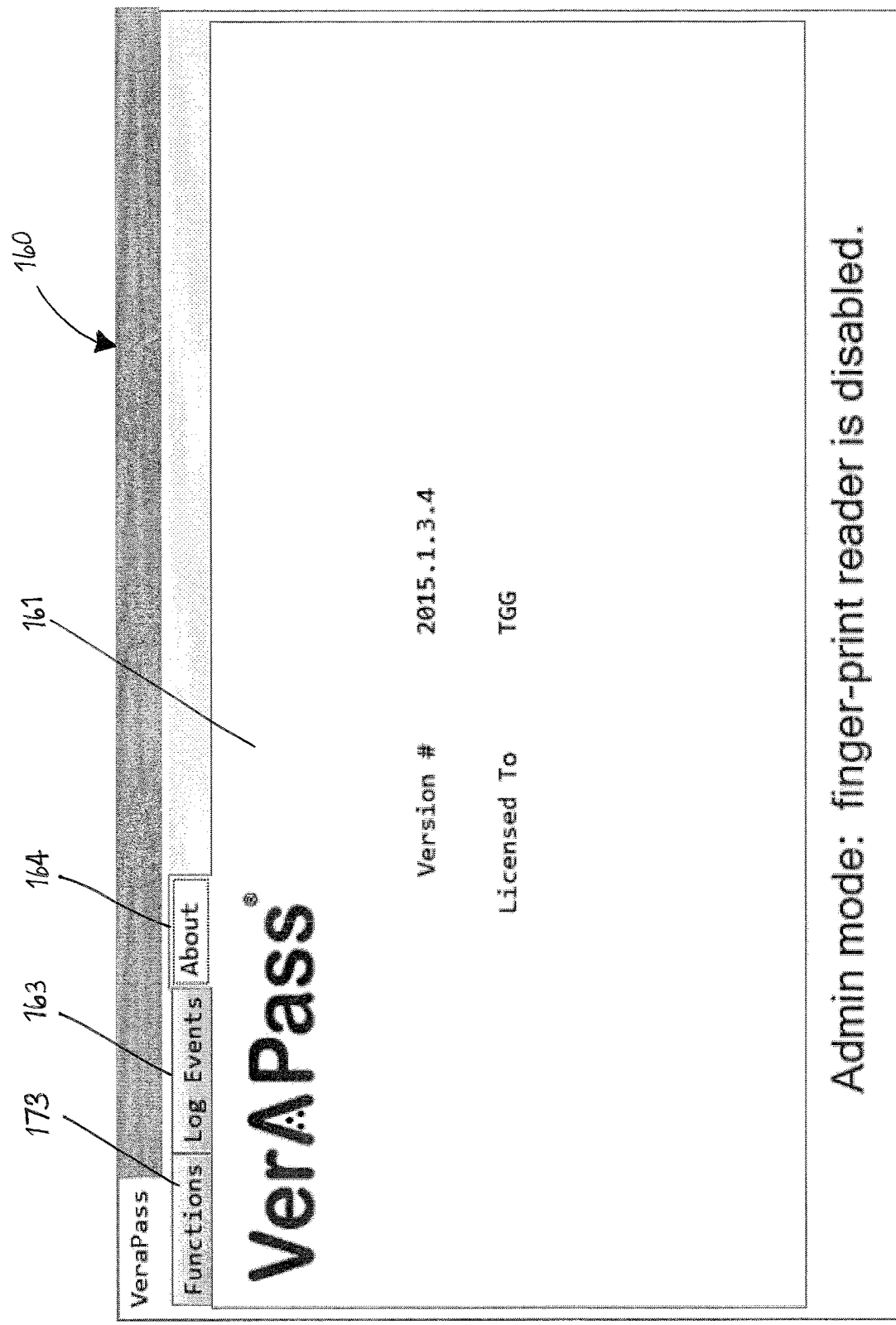
FIGS. 48-58 are screen shots which show depictions of screen shot images appearing on a screen display of a terminal implementing a management system according to the invention.
Figure 49:
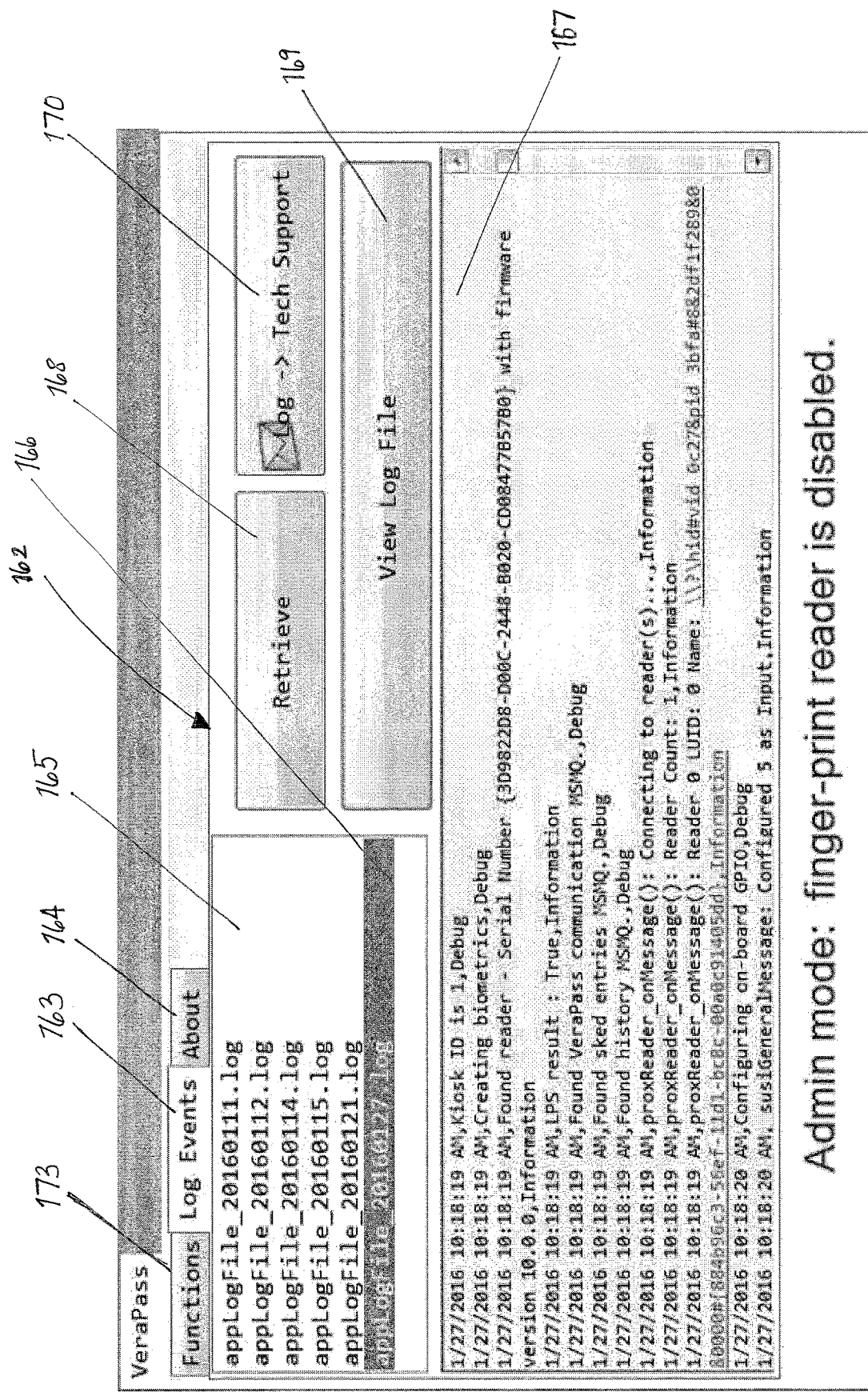
Figure 50:
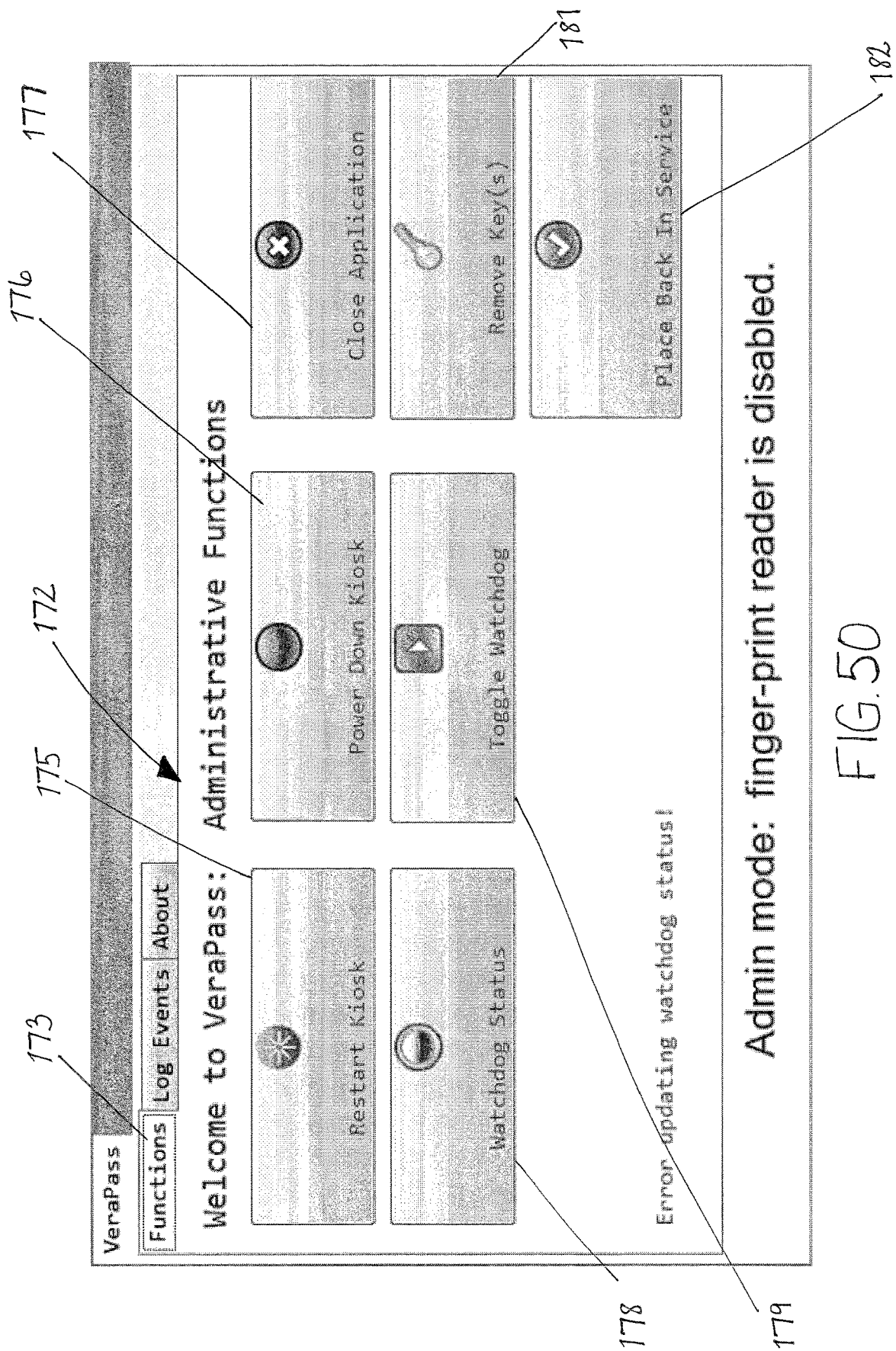

Referring to FIG. 48, the screen display illustrates a screen shot 160 that is generated to be displayed on the screen 128 of the terminal 120. The terminal 120 is placed in administrator or admin mode. In this configuration, the fingerprint reader 134 is deactivated or disabled. The "about" tab is selected and showing the about screen 161 indicating the version of the software or the terminal operating system, and providing the license information. Referring to FIG. 49, the screen shot 162 is shown where the tab labeled "Log Events" 163 (adjacent the "about" tab 164, see FIG. 48) has been selected. The log of events illustrates a box 165 containing a plurality of event logs, each of which is labeled with a file name, which in this example, includes the date. For illustration, the event log of Jan. 27, 2016 is selected, which is "appLogFile_20160127.log" 166, and which displays in a window 167 to provide a record of the events. In addition, options, which include respective selection buttons, are provided for retrieving the log 168, viewing the log 169, and communicating the log to tech support 170. In addition to the about screen 161 and log screen 162, FIG. 50 illustrates a screen shot showing a functions screen 172. The functions screen 172 provides selection buttons for operating the terminal 20,120, and is illustrated as a selection through a "functions" tab option 173 on the menu. The functions screen 172 provides a plurality of selection buttons for options to allow administrative functions to be implemented on the terminal 120. Examples of options for operating the kiosk or terminal 120, may include restarting the kiosk (restart kiosk button 175), powering down the kiosk (power down kiosk button 176), closing the application (close application button 177), operating a watchdog status (watchdog status button 178), toggling watchdog (toggle watchdog button 179), remove key(s) operation (remove key(s) button 181), and placing the terminal back in service (place back in service button 182). Additional operation options and buttons may be provided to control functions and features of the terminal 120, such as, for example, uploading of files or information.

Figure 51:
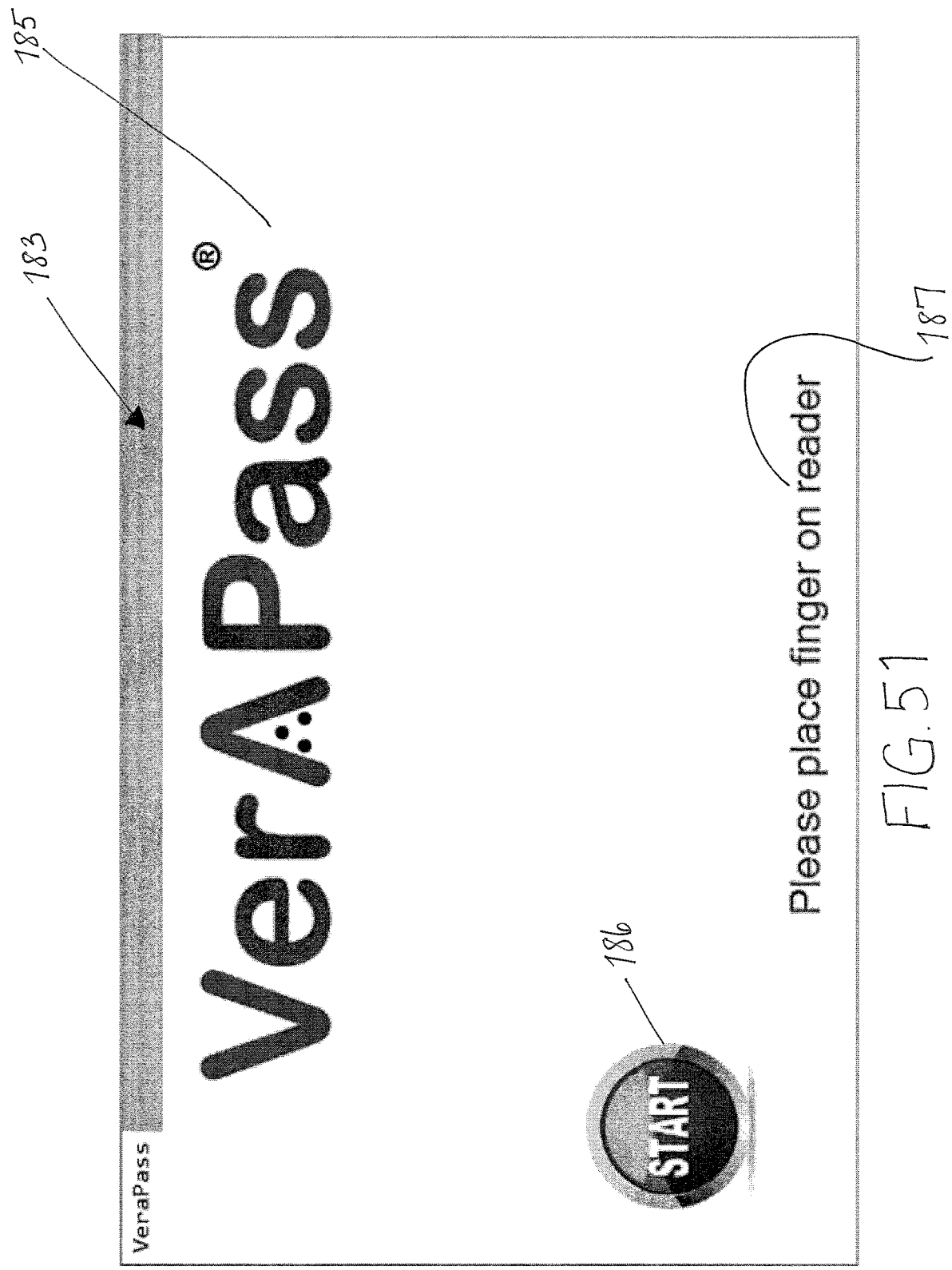
Figure 52:
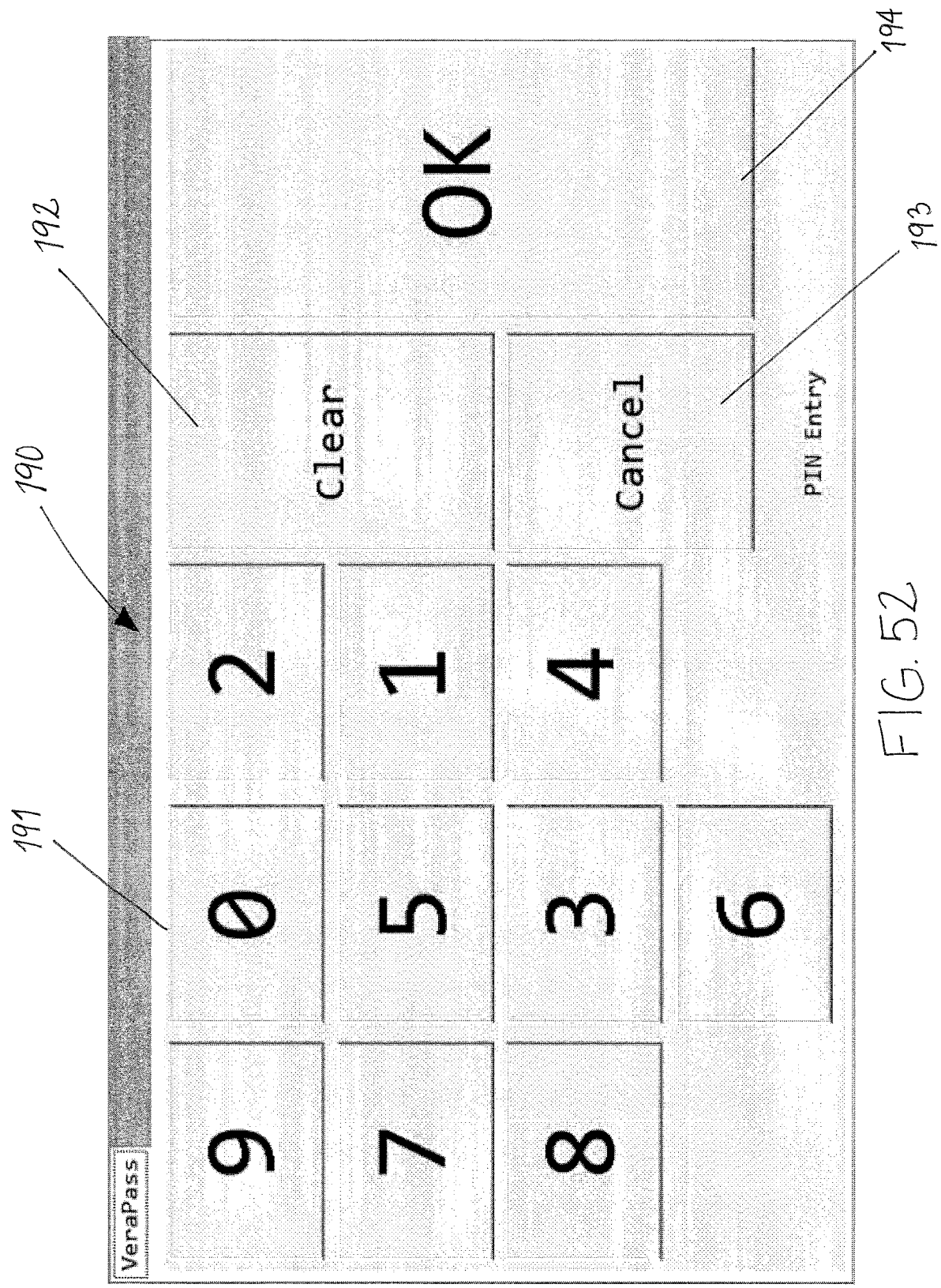
Figure 53:
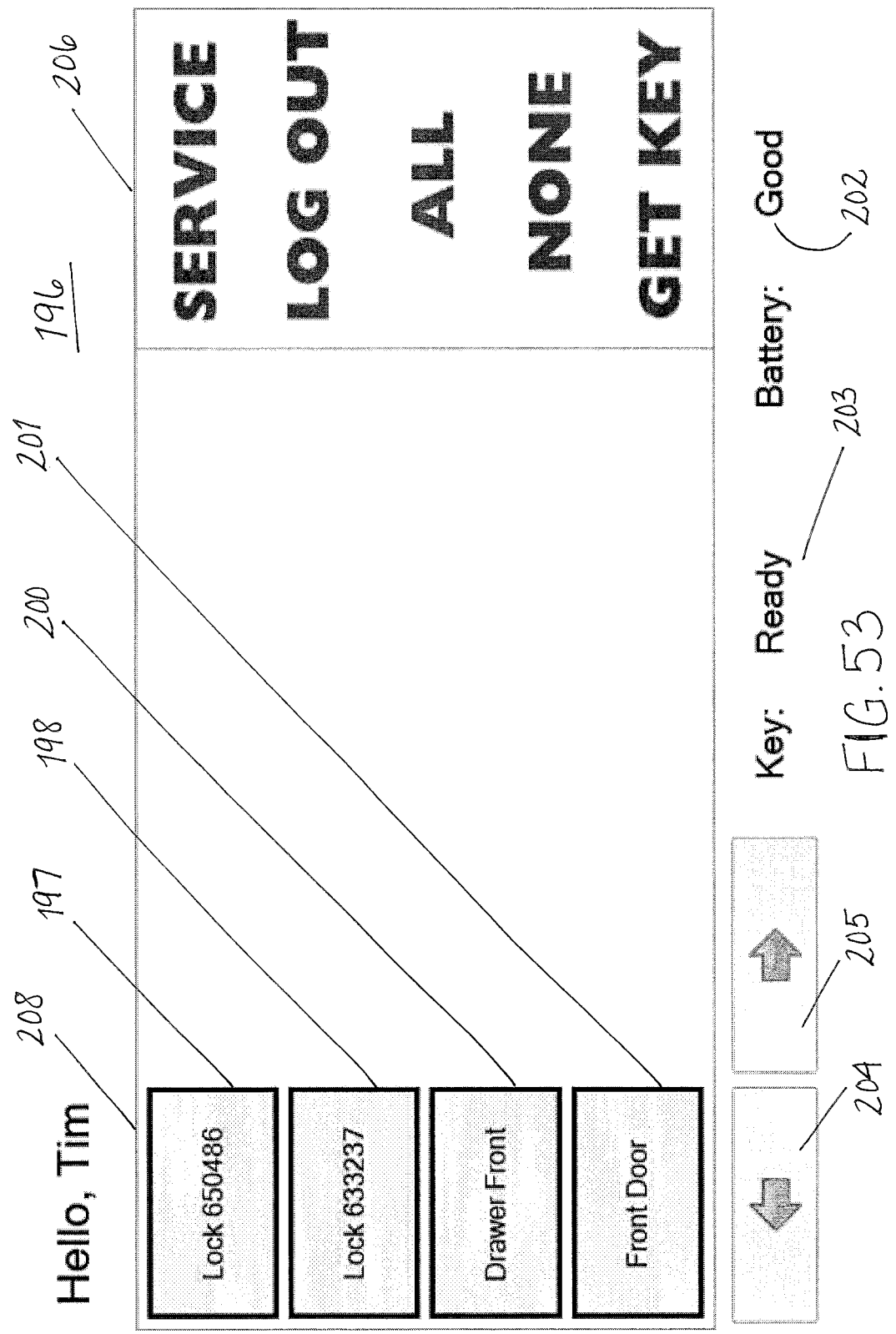

The user interface may be provided to generate displays of text and images on the terminal screen display 128 which are presented to users and operators of the terminal. In addition to the administrative functions that are configured to provide selection options for operation of the terminal 120, the user may be provided with instructions for utilizing the terminal 120 in connection with one or more electronic keys 18. As illustrated in FIG. 51, a screen shot 183 is shown on which the system name or logo 185 (or other information) may be provided. The screen shot 183 may be configured to appear as a home screen for the terminal 120. The screen shot 183 also is shown with an actuation button, which is a "start" button 186, and an operating instruction 187 displayed on the screen 183. The operating instruction may change as the user operates the terminal 120. The first operating instruction 187 requests that the user place the user's finger on the reader 134. Once the user has placed the user's finger on the reader 134, and the terminal 120 processes the input of the read, the display screen 128 of the terminal 120 may present further instructions, or may continue the procedure. According to some embodiments, the terminal 120 is configured to display another menu on the display screen 128. The screen may present a display of an image (including graphics, text or combinations thereof) directed to the user, which may ask for the user's credential, such as, for example, an electronic credential that the user presents to the electronic reader 140 of the terminal 120. Alternatively, or in addition to the electronic credential requirement, the terminal 120 may be configured to display a request or screen where the user may enter an input, such as a PIN or other character string (e.g., a PIA). As shown in FIG. 52, an screen shot 190 shows an example of an entry screen displayed on the terminal 120 having a keypad, which, according to some preferred embodiments, is displayed on the touch screen 128 of the terminal 120. The keypad 191 is illustrated according to an exemplary embodiment comprising ten digits, a clear button 192, a cancel button 193, and an "OK" or "enter" button 194. Upon a successful biometric match, and combination of PIN or electronic credential (or a match of all three factors), the inputs are recognized to be associated with a user through the verification of the factors. The user permissions are associated with the identified user through the software configured on the terminal 120. The user that has been verified in this example is named Tim. As shown in the screen shot 196 of FIG. 53, the user Tim has been identified through the biometric identification, electronic credential and/or PIN. In the screen shot 196 illustrated in FIG. 53, the user access privileges are displayed and listed on the left side of the screen. The user privileges may be displayed, which in this example, include two locks that are identified by lock number (or electronic cylinder number) 197,198, and a drawer and a door identified by an identifying name and/or location, which in this example are drawer front 200 and front door 201. Preferred implementations provide an indicator of the battery status of the key, which, in this example, is a written charge status indication, e.g., "good", 202. A key status "ready" 203 is also provided to show the status of a key 18 that is inserted into the terminal key receptacle 130. Selection buttons shown comprising arrows 204,205 may be actuated to scroll through the screen menu and make selections, such as, for example, any of the menu options listed in the selection menu 206 on the right side of the screen. According to the exemplary embodiment illustrated, the menu selections may include service, log out, all, none, and get key. The selection arrows 204,205 may be used to navigate through the selections of the menu 206, or to select the components from the access list 208 on the left of the screen 196.

According to preferred embodiments, the system is configured to provide a survey that requires user inputs to be entered. One example of a survey is illustrated through the screen shots shown in FIGS. 54-56. The survey may be configured as described herein, and may be prepared using the system tools options, such as, for example, those provided in connection with a management screen shown in the screen shot 91 of FIG. 47, by selecting an appropriate tab to produce a survey. In the example illustrated as the screen shot 211 in FIG. 54, a survey is generated and presented to the user on the terminal display screen 128. The survey preferably is associated to display itself when a user assigned to a category of users designated to respond to the survey queries is identified. In instances where the user has already fulfilled a survey requirement from a previous log on, or identification, the survey may be configured not to appear. However, in some instances, the survey is configured to generate and require responses for each user access. In the example depicted in FIGS. 54-56, a screen shot 211 is generated to appear on the terminal screen display 128, which presents Question #1 of a three question survey that is intended for the user, and which requires the user's inputs. The screen display 128 shows a screen shot 211 that presents a question inquiring of the user whether the user completed a pre-opening routine 212. There are options for responding that include a button for "yes" a button for "no", and a check mark 218 and an "x" 219. The options for responding preferably are displayed to correspond with locations on the terminal touch screen display 128, which record inputs of the user when touched in those locations. The check mark or "x" may be used at the terminal touch screen 128 to provide the user input or response, where depressing or selecting the "x" may highlight the "no" indicator 214, and where depressing or selecting the check mark may highlight the "yes" indicator 215. Arrow buttons 216,217 also are provided and allow the user to move to the next or to a prior screen or question. Alternately, according to some embodiments, the arrow buttons 216,217 may provide the user with the ability to navigate through a menu.

Figure 54:
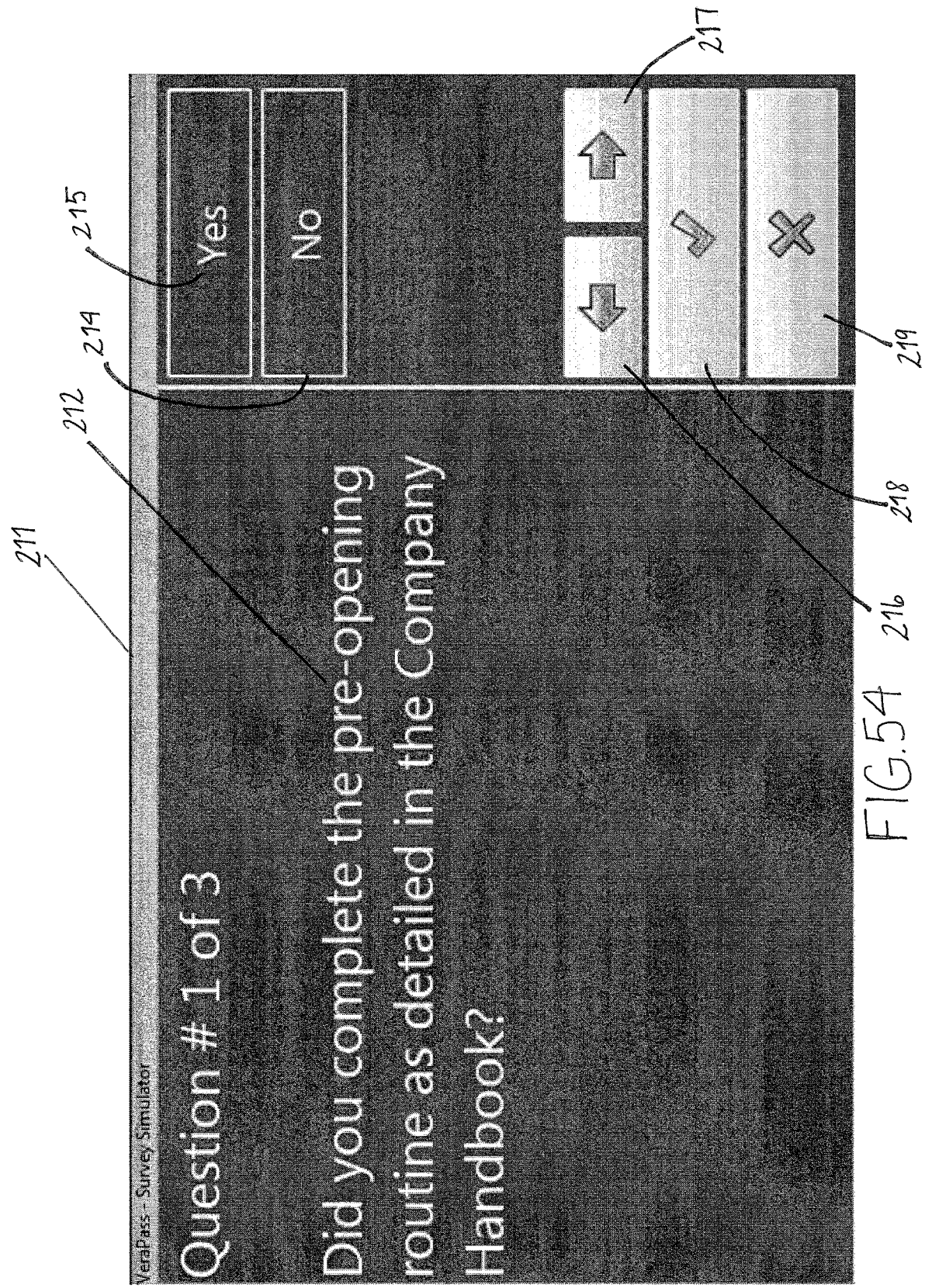
Figure 55:
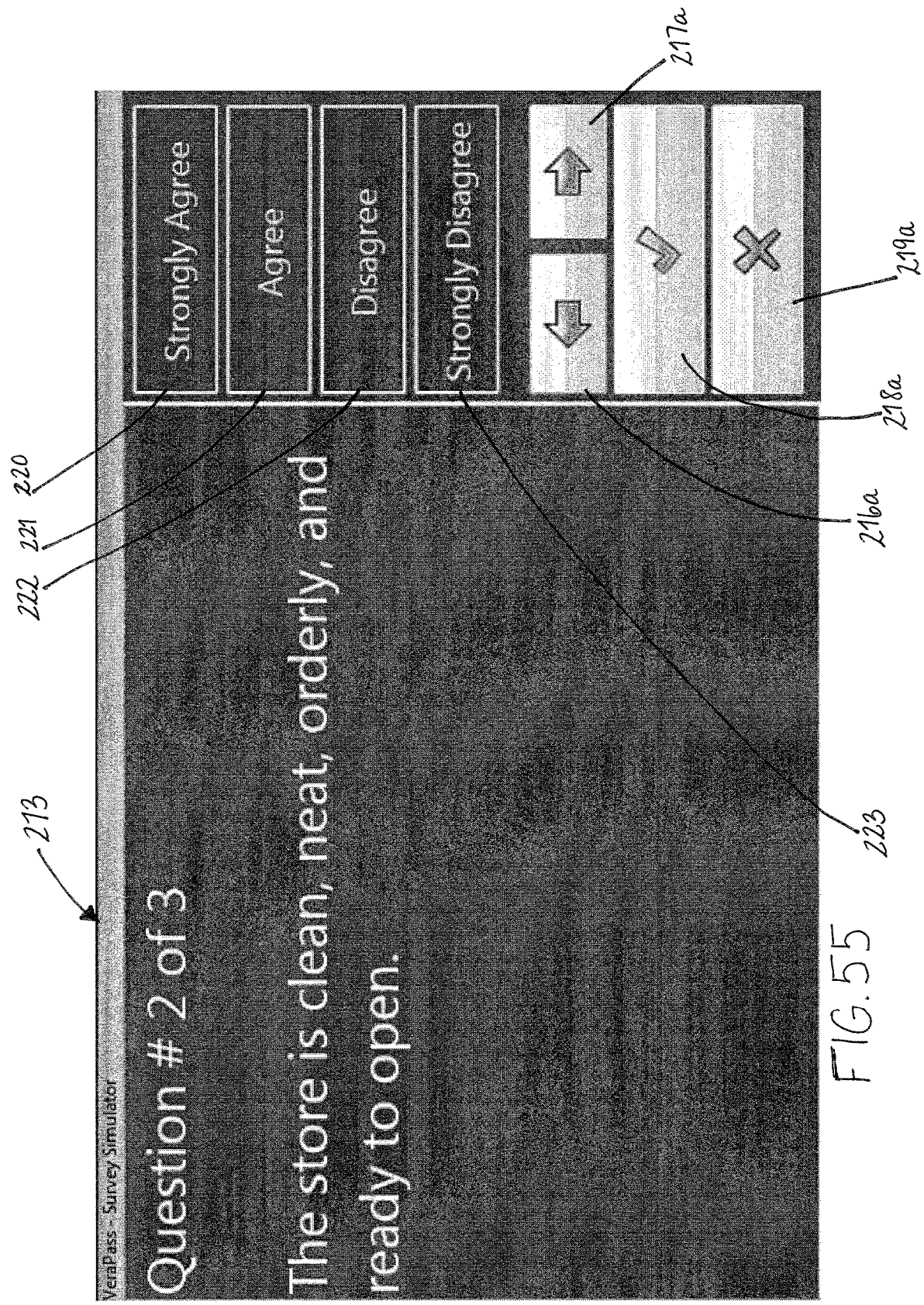

Referring to FIG. 55, as shown on the screen shot 213, Question #2 of three is presented, and, instead of the yes/no response called for by Question 1 (FIG. 54), four options for a response are available for the user to select, including "Strongly Agree" (button 220), Agree (button 221), Disagree (button 222), and Strongly Disagree (button 223). Arrows 216a,217a may be used to navigate through the selection options to highlight an appropriate response that the user desires to make, and when highlighted, the check mark 218a may be depressed or selected to confirm and enter the selection. The "x" 219a also may be used for an alternate option. In this instance, the survey continues to a third question.

Figure 56:
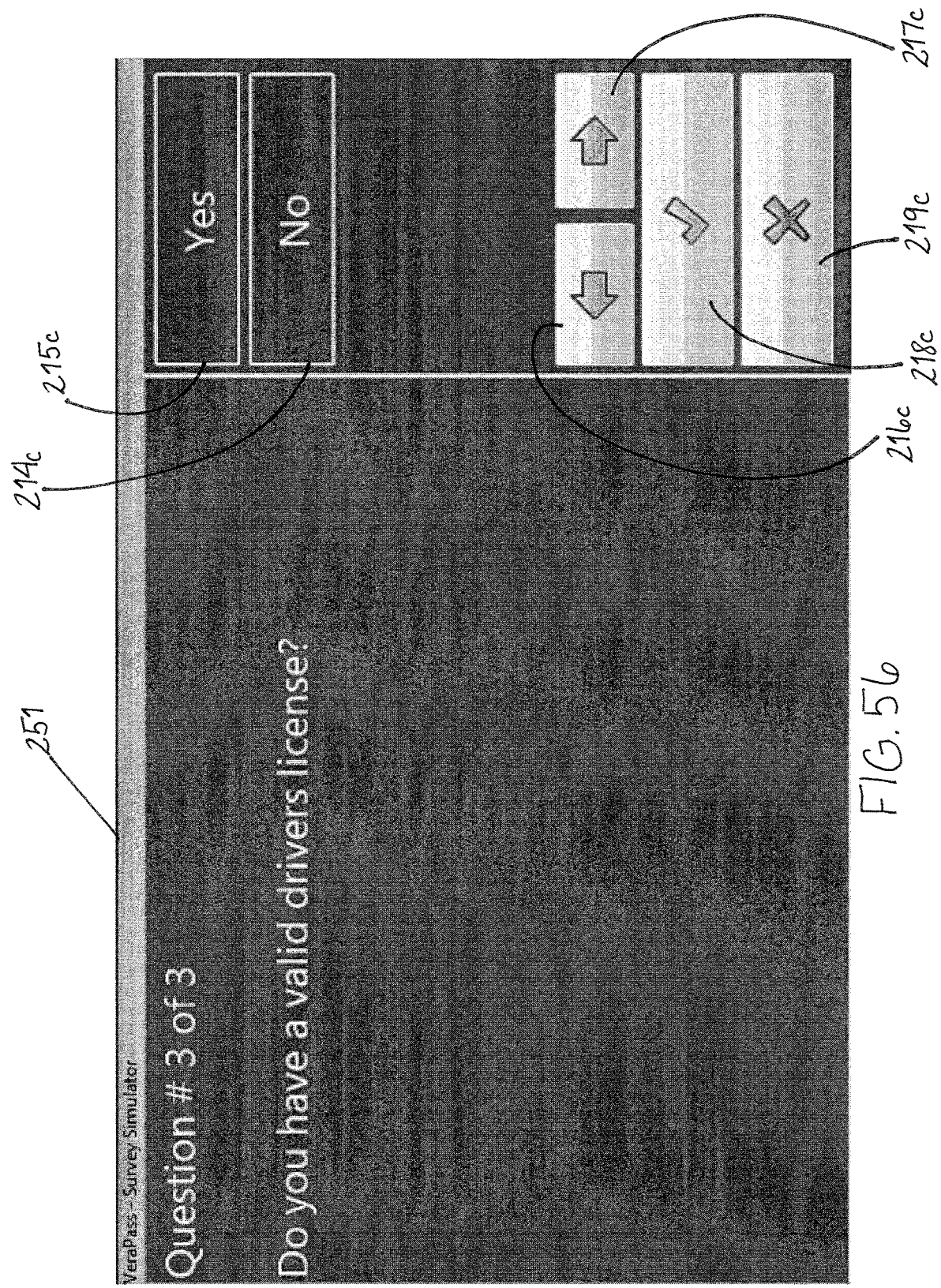

Referring to FIG. 56, as shown on screen shot 251, Question #3 of three is presented, and provides selections options similar to the screen shot 211 of FIG. 54. A yes/no response called for by Question 3 is presented, with a selection option for "yes" 215c and for "no" 214c. Arrows 216c,217c may be used to navigate through the selection options to highlight an appropriate response that the user desires to make, and when highlighted, the check mark 218c may be depressed or selected to confirm and enter the selection. The "x" 219c also may be used for an alternate option. In this instance, the survey is completed with the response to the third question.

Figure 9:
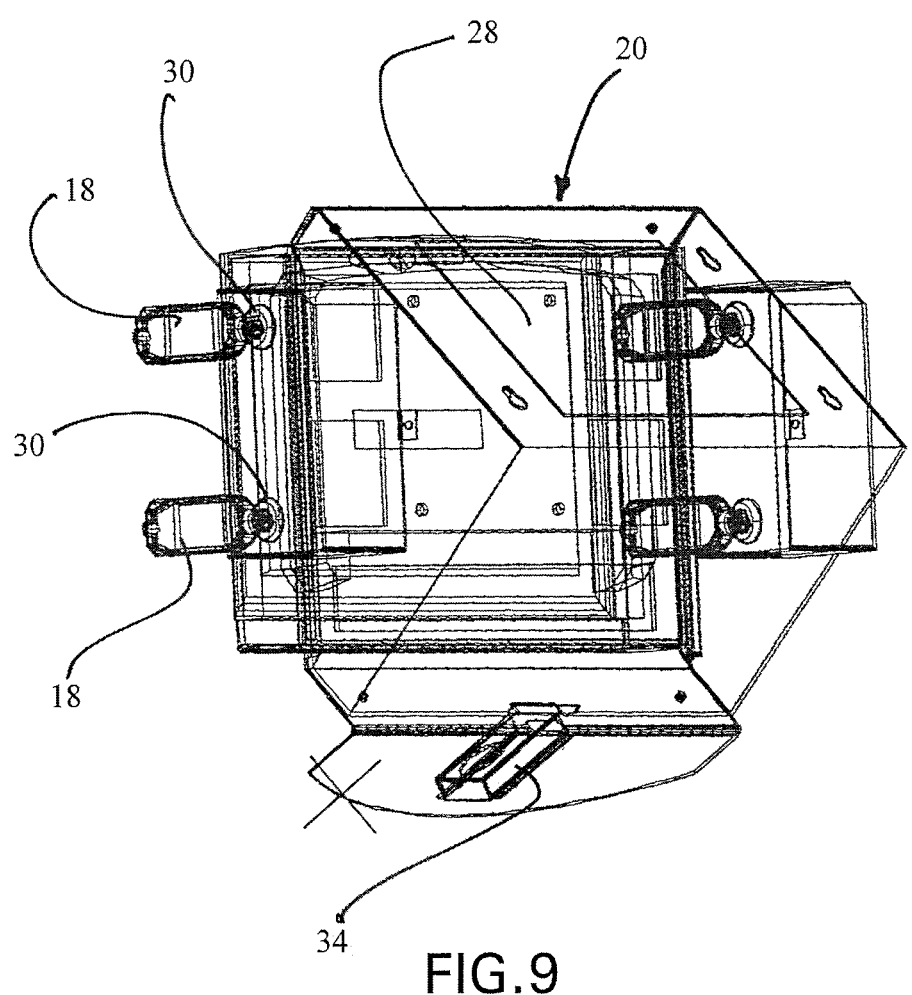
FIG. 9 is a schematic isometric view of a terminal similar to that illustrated in FIG. 4, but with four electronic keys in place and with a fingerprint reader portion of the terminal clearly shown.
Figure 57:
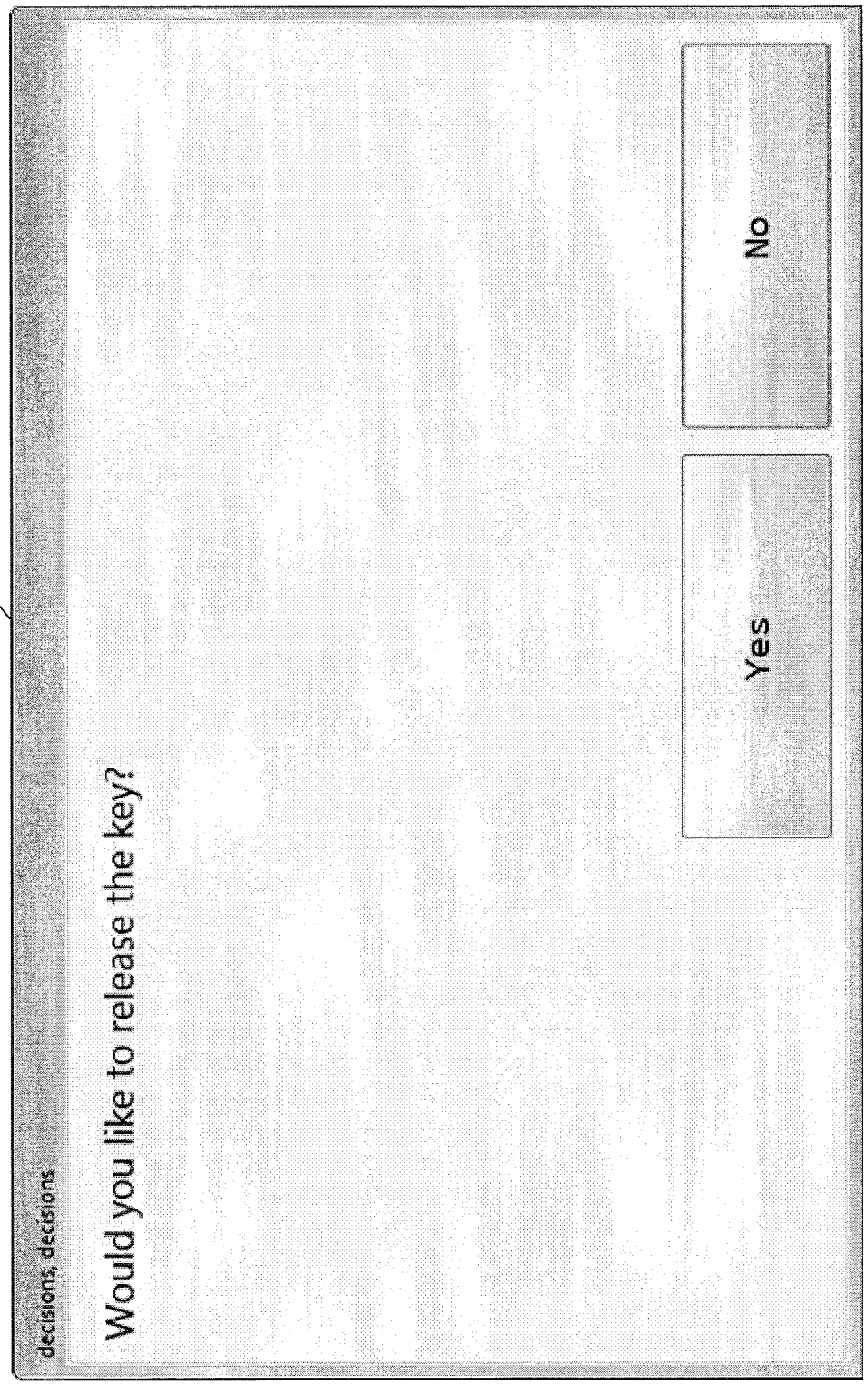

Once the user has successfully verified the user's identity (through the biometric identification, or through the biometric identification and one or more other factors), the key may be made available to the user. The key may be programmed with the user access permissions. According to some preferred embodiments, the key is locked with the terminal retaining mechanism and is not released until the programming has completed, or where no programming is to occur by virtue of the user failing to be identified, or failing to respond or provide an appropriate response to a survey or survey query, until the user opportunity to verify or respond has concluded. FIG. 57 shows a screen shot 230 which provides the user with an option of whether to release the key (in this screen shot 230 by selecting "yes" or "no". The user may opt to release the key, or, if the user requires something further, the user may leave the key in place and proceed with further programming options. (For example, in the instance where, as in FIG. 9, the terminal 20 has an option for multiple keys, the key may remain and another key may be inserted into another key retaining port.)

Figure 58:
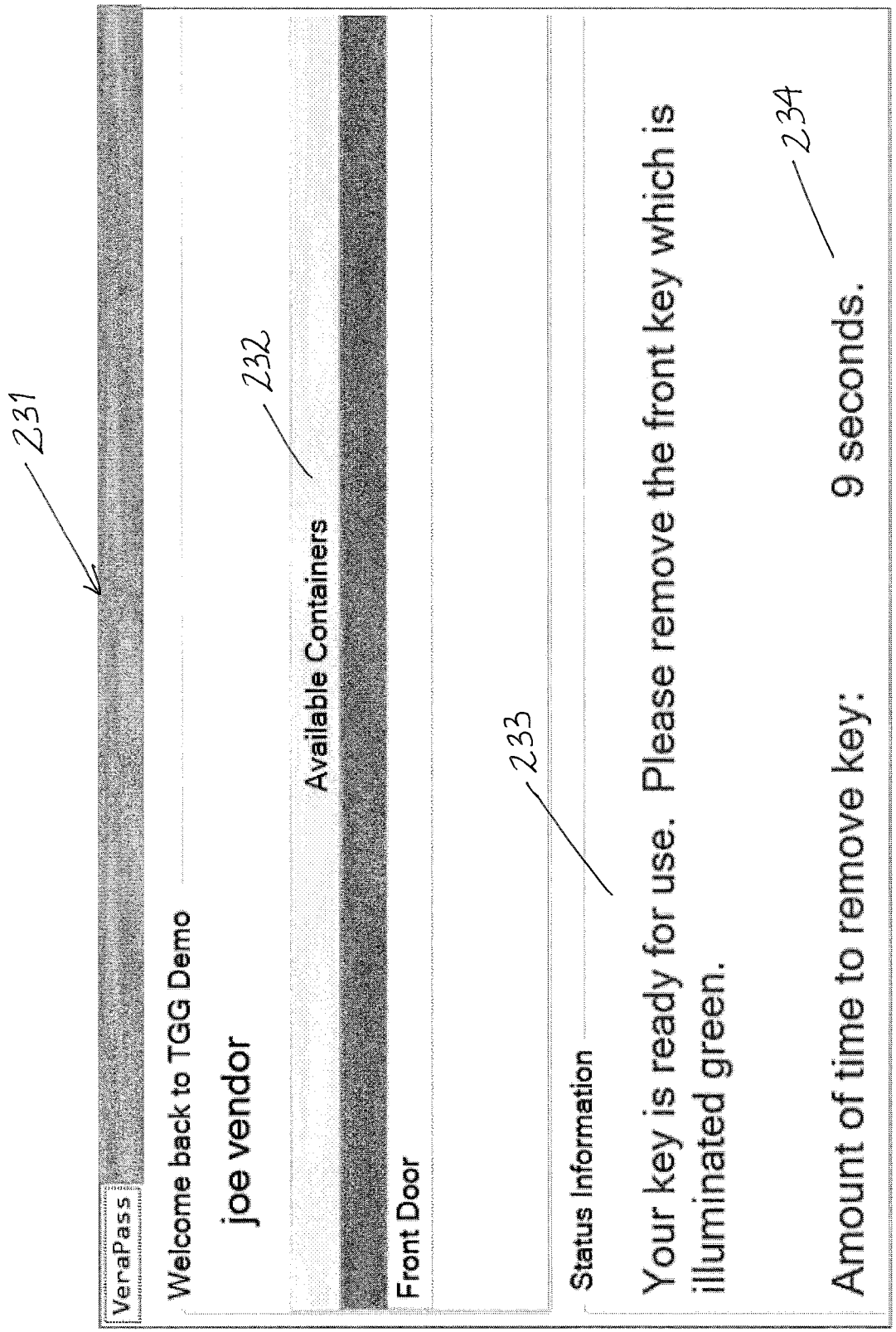

In the example shown in FIG. 57, a screen shot 230 is shown where the user is presented with a selection whether the user wants to release the key. In this example, the user selects "yes" to release the key, and the terminal 120 generates on the terminal display screen 128 another screen shot 231, as shown in FIG. 58. In this example, the screen shot 231 of FIG. 58 shows the identification of the available containers that the user may access in the "Available Containers" list 232. The screen display also provides a status information window 233 indicating the status of the key, which in this example, indicates that the key is ready for use, and instructs the user to remove the key. In addition, the system and terminal 20,120 may be configured with a mechanism that will provide a time limit for a user to remove a key from the terminal 120 once the user has completed the verification and any other requirements for programming the key, and the user has selected (if the option is present) for the terminal 120 to release the key. The time limit may count down a number of seconds, such as 10, and display the counter 234. In the event the user is distracted or called away from the terminal prior to removal of the key, and the key is not removed within the time limit, the system may implement a number of responses, including blanking the key, deactivating the key, actuating the locking mechanism to lock the key for a period in case the user returns within that period, or take some other response.

Figure 59:
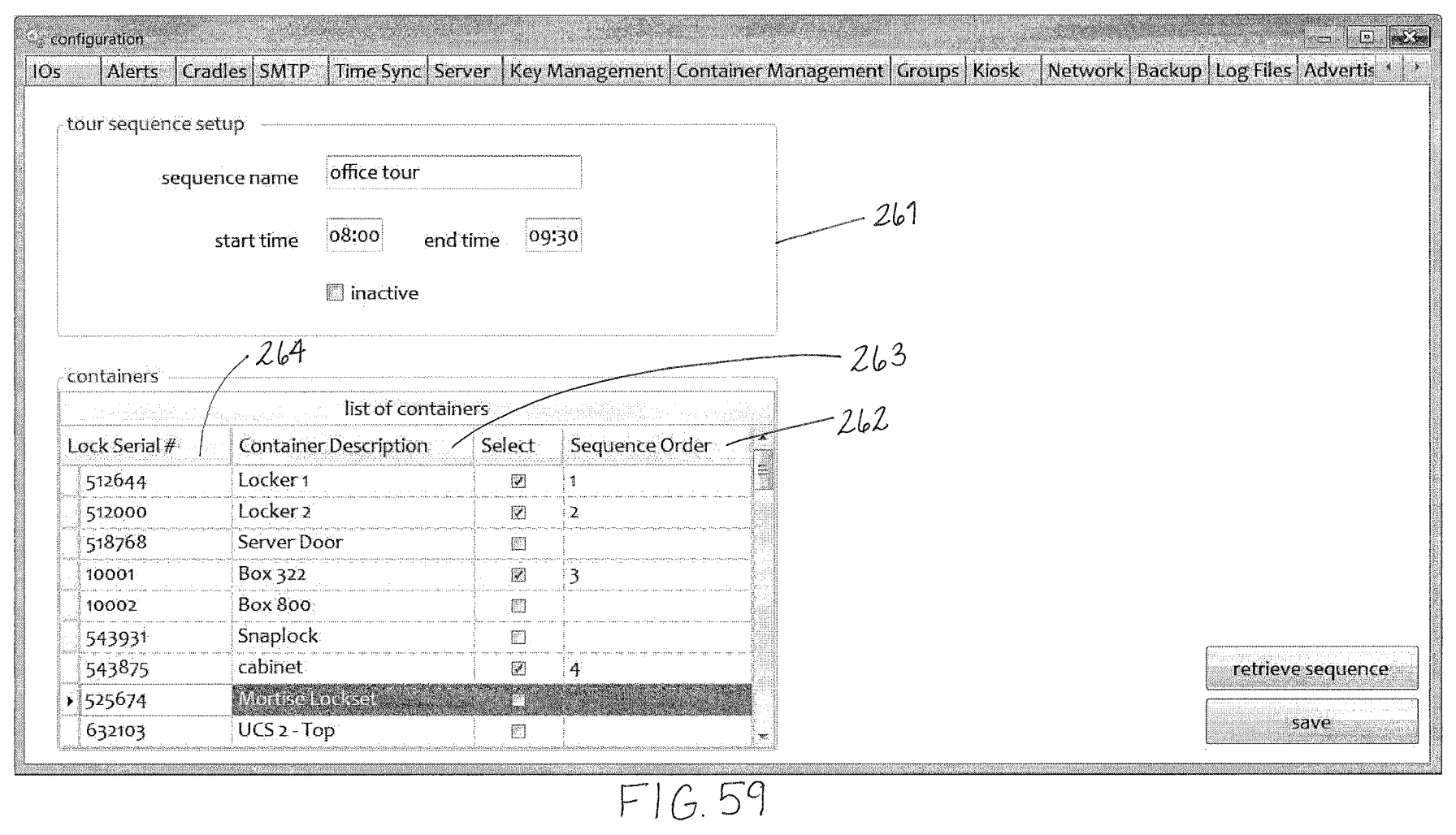

According to some embodiments, the system may be configured with instructions for process notifications. In an exemplary implementation, the terminal 120 is configured with software containing instructions to receive an input from a key. The key may be used to access one or more key receptacles or key ports, which may be an eCylinder. For example, the key may be used to access a number of ports, such as, for example, eCylinders of locks. Preferably, the key records the access thereof by recording access information which identifies characteristics of the eCylinder to which the key engaged. The key may engage a key port, such as, for example, an eCylinder, and actuate the cylinder to provide access or to close access, or, in other instances, the key may be denied an operation (e.g., denied access, or denied closing). The key accessions are done at particular cylinders and the key retains the cylinders into which the key was inserted. The key also may record the cylinder identity, as well as sequence information identifying the sequence of the key locations, such as which eCylinders were accessed and in what order. According to some embodiments, a time also is associated with the key accesses, so that when a key accesses an eCylinder, the time at which the key accesses the cylinder also may be recorded and associated with the cylinder. The system preferably maintains a record of key attempts to access a cylinder, including whether the access was successful, such as, for example, a successful actuation (e.g., opening or closing of a lock, actuation of a switch). The terminal 120 may include software that is configured with instructions for designating key access sequences, based on, for example, eCylinder sequential accessions, time-based accessions, or combination of these. As illustrated in accordance with an exemplary embodiment in FIG. 59, a screen shot 260 is shown depicting a management configuration screen display, which provides options for designating a sequence order in which a key is to access a plurality of eCylinders (such as those of eLocks). The sequence depicted is named "office tour" which is designated in the sequence box 261, along with a start time and end time, and a further selection option for whether the sequence is active or inactive (checked box). A sequence order 262 is designated for a number of keys that are selected, which in this example, are identified by their respective description (e.g., container description 263), and a lock serial number 264. The key sequence may be provided for a number of containers, or groups of containers. In addition, alerts may be selected to correspond with key operations that fail to follow the sequence order. A key may record the access points, such as, for example, eCylinders that were engaged with the key. The information may include the identification of the eCylinder (e.g., serial or identification number), which may correspond with or include the eCylinder location, the time of access (which may be an actual time, such as, EST, GMT, etc., or a relative time), and date of access. The key preferably records the sequence of eCylinders accessed, and an actuation status, which may include whether the eCylinder was opened, closed, locked, unlocked, actuated, deactivated, etc. Upon carrying out a cylinder accession sequence with the key, the key is docked at a key retention port of the hardware, such as a key retention component. According to an exemplary embodiment, the key is inserted into the key retention port 130 of the terminal 120. The terminal 120 is configured to obtain the information from the key and preferably store and/or process the information. The terminal 120 software preferably is configured with a designated access sequence that designates particular key access points, such as particular eCylinders at their sequence of access. The terminal 120 having obtained the access and sequence information from the key, is configured with software containing instructions to process the key access information. The key access information is compared with the designated sequence for cylinder access. If the access sequence of the key access matches the designated sequence, then a record of the confirming activity may be made, or one or more other actions, such as recording the information or confirmation in a database, or preparing the information for forwarding to a repository, or forwarding the information to a repository. In instances where the terminal 120 is not in communication with another computing unit, or is not configured to communicate, then the information may be obtained from the terminal 120 at any time. In instances where the terminal 120 is configured to communicate (e.g., over a network), to a remotely situated computing component, such as, for example, a management server, then the terminal 120 may be programmed to periodically, or automatically upon confirming the sequence, communicate the information or the status of the key accesses (e.g., passing sequence access or status) to a remotely situated component.

The terminal 120 preferably is configured to identify instances of key operations where the key may be used out of conformance with a designated sequence, or where the key is not used within a particular time interval, or both. For example, a designated sequence of eCylinders may be established. A user may activate a key by the verification procedures discussed herein. The user may then use the key to access key ports, such as, for example, eCylinders. The key preferably records the accesses, which, for example, may be the identification of the eCylinders engaged by the key. The key is then docked at the terminal 120 key retention port 130. According to some preferred embodiments, once the key is activated based on the user being successfully verified, the key access may be timed so that the key has a limited time within which to access the locks or to complete a lock sequence access. Where the user fails to complete the lock sequence access within the specified time, the key may be rendered inactive, or an alert may be issued from the terminal 120 (e.g., where the terminal 120 expects the key to be returned within a particular time period, and where the key has not been returned). The alert may be issued over a communication network, such as, for example, to a remotely situated computing component.

The key preferably records the accesses, which, for example, may be the identification of the eCylinders engaged by the key, and preferably the sequence information and timing also is recorded. The key is then docked at the terminal 120 key retention port 130, and the information is obtained from the key. Where the key sequence information does not correspond with the designated eCylinder access sequence, the terminal 120 may be configured to undertake an action. The action may include communicating an alert, actuating a lock to block or restrict access to a particular area, location, cabinet, or item, actuate an alarm, make a call for assistance or aid, send an electronic signal message, such as an email, page or the like. The terminal 120 also may be configured with instructions to actuate a dry contact, which may actuate a relay or other mechanism. The other mechanism may be an existing component, such as, for example, an alarm system. The system may be configured to manage operations of one or more alerting components, such as the trigger of an alarm system, a locking mechanism for a lock whose access is not regulated by the key or eCylinder.

An example of the system is embodied in an implementation where a user is an employee of a company. The company has a facility and the user is charged with the responsibility of opening the facility. The user opens the facility in the morning (and may also close the facility at the end of the day). The user must first access the entry door, which is regulated with a lock. The user may use any means to gain access to the facility. According to some embodiments, the user may unlock a panel providing access to a terminal 120, which the user may operate to verify the user, activate a key, and obtain further access to the premises or other locations. In this example, once the user gains access through the door (or panel), the user activates a key at the terminal 120. The key may be obtained from a key retention bank with one or more keys. The user then inserts the key into the key retention port 130 of the terminal 120. Upon successful verification of the user at the terminal 120 using the methods depicted and described herein, the user key is provisioned and actuated with appropriate codes corresponding with the eCylinders that the user is to access. The terminal 120 is configured with a designated sequence for the user to follow. According to preferred implementations, the designated sequence has been previously communicated to the user. The user therefore embarks on the opening sequence by accessing or opening locks (which may be actuating eCylinders) in the designated sequence. The key records the time at which the key was authorized at the terminal 120 (which may be the time of removal of the key from the terminal key retention port 130, which may be required to be removed within a set time of actuation). In this exemplary implementation, the user opens locks (which are eCylinder locks). The user, after completion of the access sequence, returns to a terminal 120, where the user inserts the key into the key retention port 130. The terminal 120 to which the key is actuated and/or returned may be a single terminal provided at the facility, a specially designated terminal at the facility, or any one terminal of a plurality of terminals at the facility. When the key is inserted at the terminal 120 after having performed the lock access sequence, the key information, including the eCylinder identification, time of identification, and sequence of access, is obtained from the key. The information, and preferably the access sequence is compared with the designated sequence. Where the key sequence conforms with the designated sequence, indicating that the access sequence has been carried out, the terminal 120 may record the status, and confirm compliance. According to some embodiments, the terminal 120 may be installed or configured with a temporary window, which delays activation of the sequence remedies to provide a period so that users may familiarize themselves with the proper key and sequence usage. The key access and sequence order may be implemented to confirm compliance with particular actions that the company or its employees or other personnel are required to carry out. According to some preferred embodiments, the key sequence may include eCylinders which are associated with one or more locks, or actuation components, that signify that an action has taken place. Where compliance reporting is required, such as, for example, accounting for activities or sequences of activities, the system may be configured to store the key access and usage information and generate reports that identify compliance, or, a level of compliance.

Therefore, in accordance with the example, where the employee completes the access sequence by using the key in a designated eCylinders in accordance with the designated sequence order, the system identifies that activity as compliance. The compliance is recorded for that time, which in this example, is the opening of the facility. According to embodiments, the employee may carry out a designated sequence of eCylinder accesses to close the facility, and like the opening of the facility, information may be retained and used to confirm compliance.

The following is an exemplary depiction of the system, where the terminal is used in conjunction with a locker mode implementation. In this example, a key is docked in a key receptacle associated with the terminal, and upon receiving the key in the receptacle, the key is electronically connected to the terminal processor to be read. If the key is not a first time used key or blanked key, then the key audit information exists on a key. The full history, such as, for example, who used the key, what lock or locks was the key used, including successful uses and/or attempted/failed uses, where and when the key was used, is downloaded from the key, and preferably is stored at the kiosk (e.g., if a touch screen kiosk, such as terminal 120 is used), and/or, according to some embodiments, may be pushed to a central repository. According to embodiments, the key, after having the key history information downloaded therefrom, is then blanked. Once the pre-enrolled user verifies/identifies themselves through one or more factors (or a combination of factors according to preferred implementations, such as, e.g., pin code, card and/or biometric identifier—such as fingerprint, face, hand, iris, DNA, etc.) at the terminal using the associated biometric reader, credential reader, input component (e.g., touchscreen), a plurality of selections may be presented. For example, the touchscreen may provide touch point selections on the touchscreen for a single eLock (customizable name) or group of eCylinders (eLocks/electro mechanical lock cylinders or combination of, that may be grouped in a single selection point with a customizable name, together) represented by one touch point on the screen for the user to select. Once the user selects which locks, or group of locks or other (trip relay, turn on lights, etc.) via an individual touch point, the key (preferably positioned in an associated key receptacle) is programmed to operate only those selected e locks, and preferably, only for a predetermined amount of time or corresponding schedule, as previously designated (as previously programmed by the administrator or system management). In this example, once the key has been provided with the codes for the corresponding designated eCylinders and schedules, the user removes the key from the key receptacle and moves forward accordingly to use the key. According to some embodiments, the key may remain retained in the receptacle until the programming is completed (or other sequence is completed, such as downloading of the key history, blanking the key, or other operation). According to some embodiments, the eCylinder codes may remain on the key after the key is blanked, but are not available to the user unless that user is authorized. This implementation may provide time savings where a number of eCylinder codes are to be loaded on a key. This example of a locker mode implementation may utilize one or more features described herein in connection with other examples and depictions.

Figure 60:
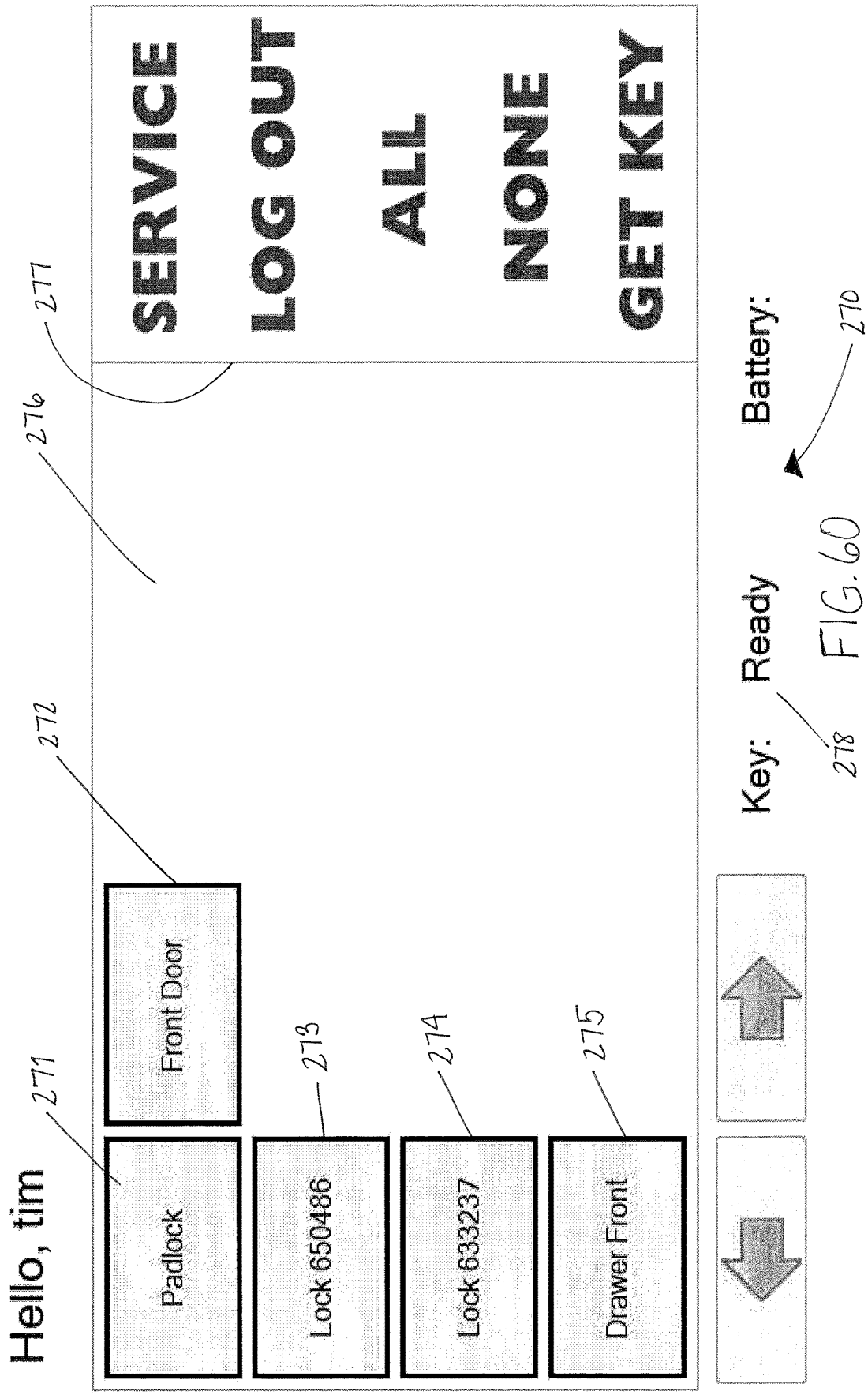
FIG. 60 is an exemplary depiction of a screen shot of an implementation of the system showing a locker mode configuration where a plurality of eCylinders associated with locks are depicted on the screen and displayed for selection by a user.

Referring to FIG. 60, a screen shot 270 is shown depicting a locker mode implementation, where the screen shot 270 appears on a touch screen display, which preferably may be generated on a touch screen display 128 of terminal 120. The screen shot shows selection button or icon provided for one or more locks and/or groups of locks. For example, a lock or group of locks that may be selected by the user in order to have the corresponding codes for those locks (or eCylinders) provided on the user key. In this example, a "Padlock" selection 271 is shown and represents a particular lock (although it may represent a group of locks). Other selections appearing on the screen shot 280 include "Front Door" 272, "Lock 650486" 273, "Lock 633237" 274, and "Drawer Front" 275. In the example illustrated, the user may select one or more (or all) of the user permitted lock selections displayed or highlighted in the selection area box 276 of the screen 270. Once the selections are made, the key which is to be programmed is provided with the codes for the corresponding eLocks/eCylinders. A selection menu on the right 277, as discussed previously in connection with other screen menu depictions, provides options for the user to select, including to select all or none, service, logout, or get key. A designation of key status 278 that includes battery status and key ready status also is shown on the screen 270.

The following is an exemplary depiction of the system, where the terminal is used in conjunction with a route mode implementation. In this example, when a key is docked in a key receptacle associated with a computing component, such as the terminal, the history, such as, for example, who used the key, what lock or locks was the key used, including successful uses and/or attempted/failed uses, where and when the key was used, is downloaded from the key, and preferably is stored at the kiosk (e.g., if a touch screen kiosk, such as terminal 120 is used), and/or, according to some embodiments, may be pushed to a central repository. According to embodiments, the key, after having the key history information downloaded therefrom, is then blanked to remove or remove access to the lock code information (that may have been previously provided on the key). Once the pre-enrolled user verifies/identifies themselves through one or more factors (or a combination of factors according to preferred implementations, such as, e.g., pin code, card and/or biometric identifier—such as fingerprint, face, hand, iris, DNA, etc.) at the terminal using the associated biometric reader, credential reader, input component (e.g., touchscreen), the key is programmed to operate all eCylinders (which preferably in this example are eCylinders of eLocks) for the predetermined amount of time or corresponding schedule that the user was pre-programmed to access (e.g., through a management designation that was previously configured for this operation, e.g., by programming the terminal). Once the key is programmed with the appropriate codes (and optionally released if a key retention mechanism has been actuated), the user removes the key and moves forward accordingly. In this implementation, the user is not required to make a selection of individual or group of eCylinders, and the user verification/identification provides an association with the lock codes that the user will need based on the user activities and operations to be carried out. For example, the user route where the user has been assigned specific duties that involve access to specific eCylinders (e.g., specific eLocks) are provided on the user key. Other features described and depicted herein may be utilized in conjunction with this implementation.

Figure 61:
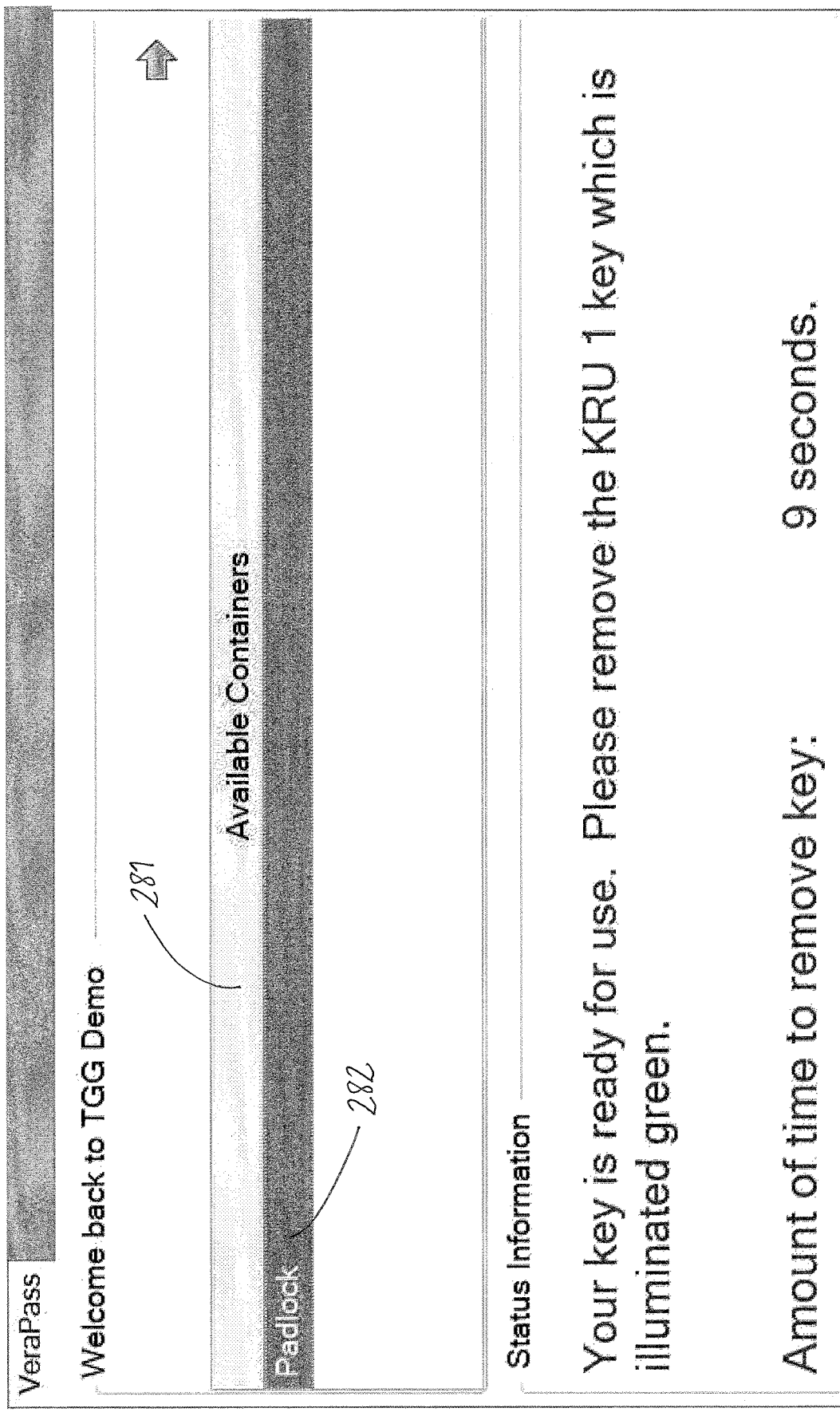
FIG. 61 is an exemplary depiction of a screen shot of an implementation of the system showing a route mode configuration where a selection representing a lock or group of locks is depicted on the screen and displayed for selection by a user.

Referring to FIG. 61, a screen shot 280 is shown depicting a route mode implementation, which may be generated on a touch display screen, such as, the touch display screen 128 of terminal 120, provides an available containers listing 281 identified as "Padlock" 282. Padlock 282 in the example illustrated, preferably represents a single lock, or more preferably, a group of locks that is confirmed at the terminal for the identified user, indicating the lock/eCylinder or grouping of locks/eCylinders that the user may access. In the example depicted by the screen shot of FIG. 61. In this example, the Padlock 282 represents the access group or cylinder that the identified/verified user may access.

In addition, features shown and described herein in connection with some embodiments, such as, the terminal 20 or terminal 120, may be implemented separately or together in conjunction with implementations of the method, system and devices.

While the system, method and apparatus of the invention have been disclosed in detail, and the preferred embodiments and best mode for practice of the invention have been similarly disclosed, the scope of exclusive rights to which the invention is entitled is defined by the claims appended hereto and by equivalents that perform substantially the same function in substantially the same way to achieve the same result.

What is claimed is:

1. A device for authenticating user access to a secured item that is secured by an electronic lock, the device comprising:
 a) a housing;
 b) a hardware processor;
 c) software configured with instructions for receiving and processing inputs;
 d) storage media, said software being stored thereon;
 e) communications components configured to transmit and receive communications over a network;
 f) a biometric reader coupled together with the processor and software to provide biometric inputs;
 g) an electronic reader;
 h) a touch screen configured to receive inputs; and
 i) a key port configured to receive an electronic key;
 j) wherein said software includes instructions for comparing inputs from at least one of said biometric reader, said electronic reader and said screen, to determine whether the at least one biometric input, electronic reader input, and said screen input verifies a condition for providing access to a lock; and
 k) wherein said software is programmed with instructions not to verify the condition when a survey input matches a predetermined response;
 l) said biometric reader, said electronic reader and said touch screen being coupled with said processor to provide inputs, and wherein said software includes instructions for comparing (i) at least one input from said at least one of said biometric reader, said card reader, and said screen, and, in addition to the said at least one input from said at least one of said biometric reader, said card reader, and said screen, (ii) said survey input, to determine whether the inputs authorize a condition.

2. The device of claim 1, including a key retention mechanism, wherein said key retention mechanism mechanically locks the key and releases the key.

3. The device of claim 2, wherein said key retention mechanism locks said key to said key port during the time when said key is being programmed.

4. The device of claim 1, wherein said condition is authorization to activate a lock for programming, and wherein said device provides an internal code to a user identified as authorized to access the lock by encoding the internal code into an electronic key usable by the identified authorized user.

5. The device of claim 1, wherein said device is configured to provision an electronic key to access an electronic lock; wherein said device is configured to generate a survey on said screen; wherein said survey inputs are made through said screen; wherein said software includes instructions for receiving survey inputs, and wherein said survey inputs are required in order to provision said electronic key.

6. The device of claim 1, wherein said device is configured to provision an electronic key to access an electronic lock, and wherein said provisioning comprises programming said key with at least one lock code that opens an electronic lock; wherein said device is configured to generate a survey on said screen; wherein said survey inputs are made through said screen; wherein said software includes instructions for receiving survey inputs, and wherein said survey inputs are required in order to provision said electronic key.

7. The device of claim 6, wherein said electronic reader is configured to read an electronic item.

8. The device of claim 1, wherein said device is configured to program a key with one or more lock codes for actuating one or more electronic locks, and wherein said device programs the key when the condition is verified.

9. The device of claim 1, wherein said software includes instructions for comparing an input from at least one of said biometric reader, said electronic reader, and said screen, and determining whether the input from said at least one of said biometric reader, said electronic reader, and said screen, together with said survey input, verifies a condition for providing access to a lock; and wherein said device is configured to program a key with one or more lock codes for actuating one or more electronic locks, and wherein said device programs the key when the condition is verified.

10. The device of claim 1, wherein said device is configured to provision an electronic key to access an electronic lock; wherein said device is configured to generate a survey on said screen; wherein said survey inputs are made through said screen; wherein said software includes instructions for receiving survey inputs, and wherein said survey inputs are required to verify said condition.

11. The device of claim 1, wherein said predetermined response comprises one or the other of an input selected from a choice of two inputs.

12. The device of claim 1, wherein said predetermined response comprises at least one input selected from a choice of a plurality of inputs.

13. The device of claim 12, wherein said software is further configured with instructions to verify a survey input by comparing the survey input with a reference database.

14. The device of claim 13, wherein said reference database is accessible through a network connection.

15. The device of claim 12, including an electronically programmable lock, an electronic key that is insertable into the electronically programmable lock for recording an internal code needed to actuate the electronically programmable lock, wherein the key port receives the electronic key, and wherein said software instructs said hardware processor to receive and retain the internal code in association with the identification of the electronically programmable lock to which the code pertains; wherein the biometric reader electronically biometrically identifies a potential user seeking to actuate the electronically programmable lock; wherein the electronic reader electronically identifies a credential for the user seeking to actuate the electronically programmable lock; wherein the touch screen receives an input made by the user seeking to actuate the electronically programmable lock; wherein the software includes instructions for and instructs said hardware processor to compare the identified potential user to a previously generated list of biometrically identified users authorized to actuate the electronically programmable lock to determine whether the identified potential user is authorized to actuate the electronically programmable lock; wherein the software includes instructions for and instructs said hardware processor to compare the identified credential to a previously generated credential of identified users authorized to actuate the electronically programmable lock to determine whether the identified potential user is authorized to actuate the electronically programmable lock; and wherein the software includes instructions for and instructs said hardware processor to compare the input made on the touch screen by the user to a previously generated list of user PIN's of identified users authorized to actuate the electronically programmable lock to determine whether the identified potential user is authorized to actuate the electronically programmable lock.

16. A device for authenticating user access to a secured item that is secured by an electronic lock, the device comprising:
a) a housing;
b) a hardware processor;
c) software configured with instructions for receiving and processing inputs;
d) storage media, said software being stored thereon;
e) communications components configured to transmit and receive communications over a network;
f) a biometric reader coupled together with the processor and software to provide biometric inputs;
g) an electronic reader;
h) a touch screen configured to receive inputs; and
i) a key port configured to receive an electronic key
j) wherein said software includes instructions for comparing inputs from at least one of said biometric reader, said electronic reader and said screen, to determine whether the at least one biometric input, electronic reader input, and said screen input verifies a condition for providing access to a lock; and
k) wherein said software is programmed with instructions not to verify the condition when a survey input is not properly identified;
l) said biometric reader, said electronic reader and said touch screen being coupled with said processor to provide inputs, and wherein said software includes instructions for comparing (i) at least one input from said at least one of said biometric reader, said card reader, and said screen, and, in addition to the said at least one input from said at least one of said biometric reader, said card reader, and said screen, (ii) said survey input, to determine whether the inputs fail to authorize a condition.

17. The device of claim 16, wherein said condition is authorization to activate a lock for programming, and wherein said device provides an internal code to a user identified as authorized to access the lock by encoding the internal code into an electronic key usable by the identified authorized user.

18. The device of claim 16, wherein said device is configured to provision an electronic key to access an electronic lock, and wherein said provisioning comprises programming said key with at least one lock code that opens an electronic lock; wherein said device is configured to generate a survey on said screen; wherein said survey inputs are made through said screen; wherein said software includes instructions for receiving survey inputs, and wherein said survey inputs are required in order to provision said electronic key.

* * * * *